(12) United States Patent
Kato et al.

(10) Patent No.: US 8,320,228 B2
(45) Date of Patent: Nov. 27, 2012

(54) NEAR-FIELD OPTICAL HEAD HAVING TAPERED HOLE FOR GUIDING LIGHT BEAM

(75) Inventors: Kenji Kato, Chiba (JP); Takashi Niwa, Chiba (JP); Susumu Ichihara, Chiba (JP); Norio Chiba, Chiba (JP); Manabu Oumi, Chiba (JP); Nobuyuki Kasama, Chiba (JP); Yasuyuki Mitsuoka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/584,049

(22) Filed: Aug. 28, 2009

(65) Prior Publication Data

US 2010/0128578 A1    May 27, 2010

Related U.S. Application Data

(63) Continuation of application No. 09/582,903, filed as application No. PCT/JP99/06150 on Nov. 4, 1999, now Pat. No. 7,599,277.

(30) Foreign Application Priority Data

| Nov. 9, 1998 | (JP) | ................................. 10/317671 |
| Nov. 20, 1998 | (JP) | ................................. 10/331694 |
| Jan. 14, 1999 | (JP) | ................................... 11/8082 |
| Jul. 26, 1999 | (JP) | ................................. 11/210973 |

(51) Int. Cl.
   *G11B 7/00* (2006.01)
(52) U.S. Cl. .............................. 369/112.27; 369/112.09
(58) Field of Classification Search ............. 360/112.27, 360/112.09, 112.14, 112.21, 13.33, 13.13, 360/13.12, 13.32, 14, 59; 385/129, 31, 88–94; 850/30; 250/201.3
See application file for complete search history.

(56) References Cited

U.S. PATENT DOCUMENTS

| 4,684,206 | A | * | 8/1987 | Bednorz et al. | ............... 385/129 |
| 4,725,727 | A | * | 2/1988 | Harder et al. | ............ 250/227.28 |
| 4,732,599 | A | * | 3/1988 | Bennion | ..................... 65/30.13 |
| 5,105,408 | A | * | 4/1992 | Lee et al. | ................... 369/44.15 |
| 5,197,050 | A | * | 3/1993 | Murakami et al. | ......... 369/13.13 |
| 5,278,929 | A | * | 1/1994 | Tanisawa et al. | ............... 385/93 |
| 5,294,790 | A | * | 3/1994 | Ohta et al. | .................... 250/216 |
| 5,351,229 | A | * | 9/1994 | Brezoczky et al. | ............. 369/99 |
| 5,362,963 | A | * | 11/1994 | Kopelman et al. | .............. 850/31 |
| 5,410,151 | A | * | 4/1995 | Buckland | ................ 250/227.26 |
| 5,570,336 | A | * | 10/1996 | Inui et al. | ...................... 369/126 |
| 5,627,815 | A | * | 5/1997 | Koyanagi et al. | ............. 369/126 |
| 5,664,036 | A | * | 9/1997 | Islam | .............................. 385/31 |
| 5,689,480 | A | * | 11/1997 | Kino | ............................... 369/14 |
| 5,734,632 | A | * | 3/1998 | Ito et al. | ..................... 369/44.23 |
| 5,767,891 | A | * | 6/1998 | Hirokane et al. | ............. 347/258 |
| 5,770,856 | A | * | 6/1998 | Fillard et al. | .................. 250/234 |
| 5,796,706 | A | * | 8/1998 | Shintani et al. | ............... 369/126 |
| 5,827,100 | A | * | 10/1998 | Kim | ................................. 445/24 |
| 5,844,251 | A | * | 12/1998 | MacDonald et al. | ........... 257/10 |

(Continued)

*Primary Examiner* — Tan X Dinh
(74) *Attorney, Agent, or Firm* — Adams & Wilks

(57) ABSTRACT

A near-field optical head has a planar substrate having a first surface, a second surface disposed opposite to the first surface, and an inverted pyramidal hole extending through the first and second surfaces. The inverted pyramidal hole has at least one fine aperture formed at an apex thereof and disposed in the first surface and having at least one curved slant surface. An optical waveguide extends into the inverted pyramidal hole of the planar substrate for propagating light along an optical path. A mirror is disposed in the optical waveguide for bending in the direction of the fine aperture the optical path of the light propagated through the optical waveguide.

16 Claims, 42 Drawing Sheets

U.S. PATENT DOCUMENTS

| | | | | |
|---|---|---|---|---|
| 5,969,821 A | * | 10/1999 | Muramatsu et al. | 356/613 |
| 6,159,385 A | * | 12/2000 | Yao et al. | 216/2 |
| 6,185,051 B1 | * | 2/2001 | Chen et al. | 359/709 |
| 6,212,047 B1 | * | 4/2001 | Payne et al. | 360/318.1 |
| 6,304,527 B1 | * | 10/2001 | Ito et al. | 369/44.23 |
| 6,376,827 B1 | * | 4/2002 | Kasama et al. | 250/216 |
| 6,389,210 B1 | * | 5/2002 | Mukasa et al. | 385/131 |
| 6,441,359 B1 | * | 8/2002 | Cozier et al. | 250/216 |
| 6,448,543 B1 | * | 9/2002 | Mitsuoka et al. | 250/201.3 |
| 6,473,384 B1 | * | 10/2002 | Oumi et al. | 369/112.01 |
| 6,528,780 B1 | * | 3/2003 | Mitsuoka et al. | 250/216 |
| 6,567,373 B1 | * | 5/2003 | Kato et al. | 369/300 |
| 6,631,227 B2 | * | 10/2003 | Kasama et al. | 385/36 |
| 6,700,838 B1 | * | 3/2004 | McDaniel | 369/13.13 |
| 6,724,718 B1 | * | 4/2004 | Shinohara et al. | 369/300 |
| 6,731,462 B1 | * | 5/2004 | Furuichi et al. | 360/234.6 |
| 6,738,338 B1 | * | 5/2004 | Maeda et al. | 369/112.01 |
| 6,744,030 B2 | * | 6/2004 | Mitsuoka et al. | 250/201.3 |
| 6,834,537 B1 | * | 12/2004 | Niwa et al. | 73/105 |
| 7,034,277 B2 | * | 4/2006 | Oumi et al. | 250/216 |
| 7,054,255 B2 | * | 5/2006 | Kasama et al. | 369/112.27 |
| 7,150,185 B2 | * | 12/2006 | Niwa et al. | 73/105 |
| 2003/0142597 A1 | * | 7/2003 | Park et al. | 369/44.23 |

* cited by examiner

F I G. 1
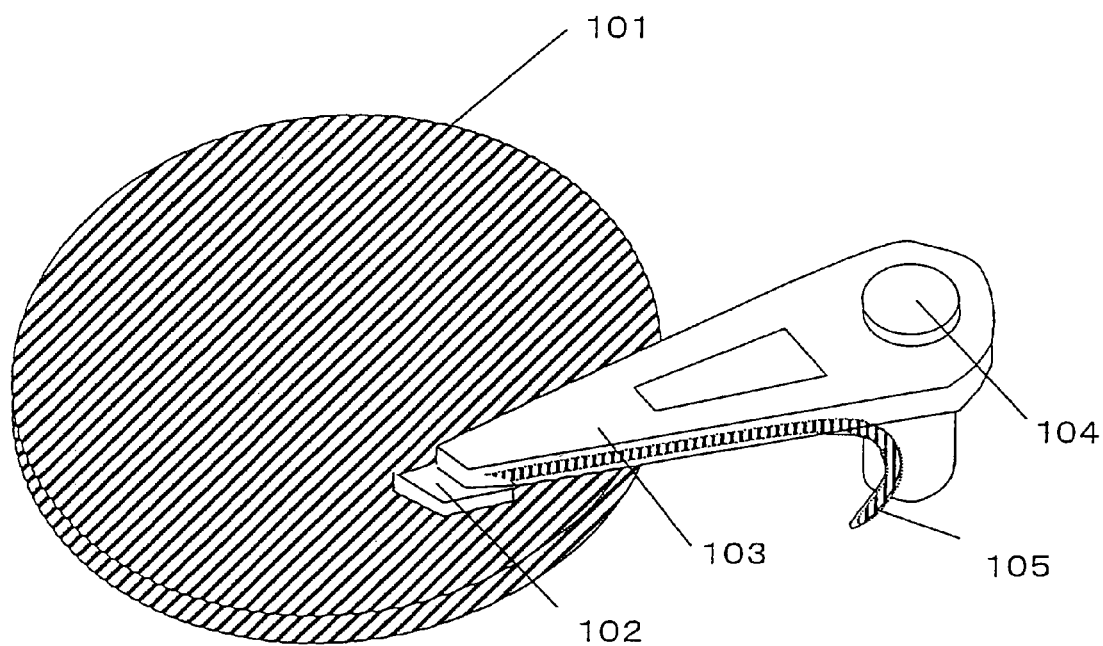

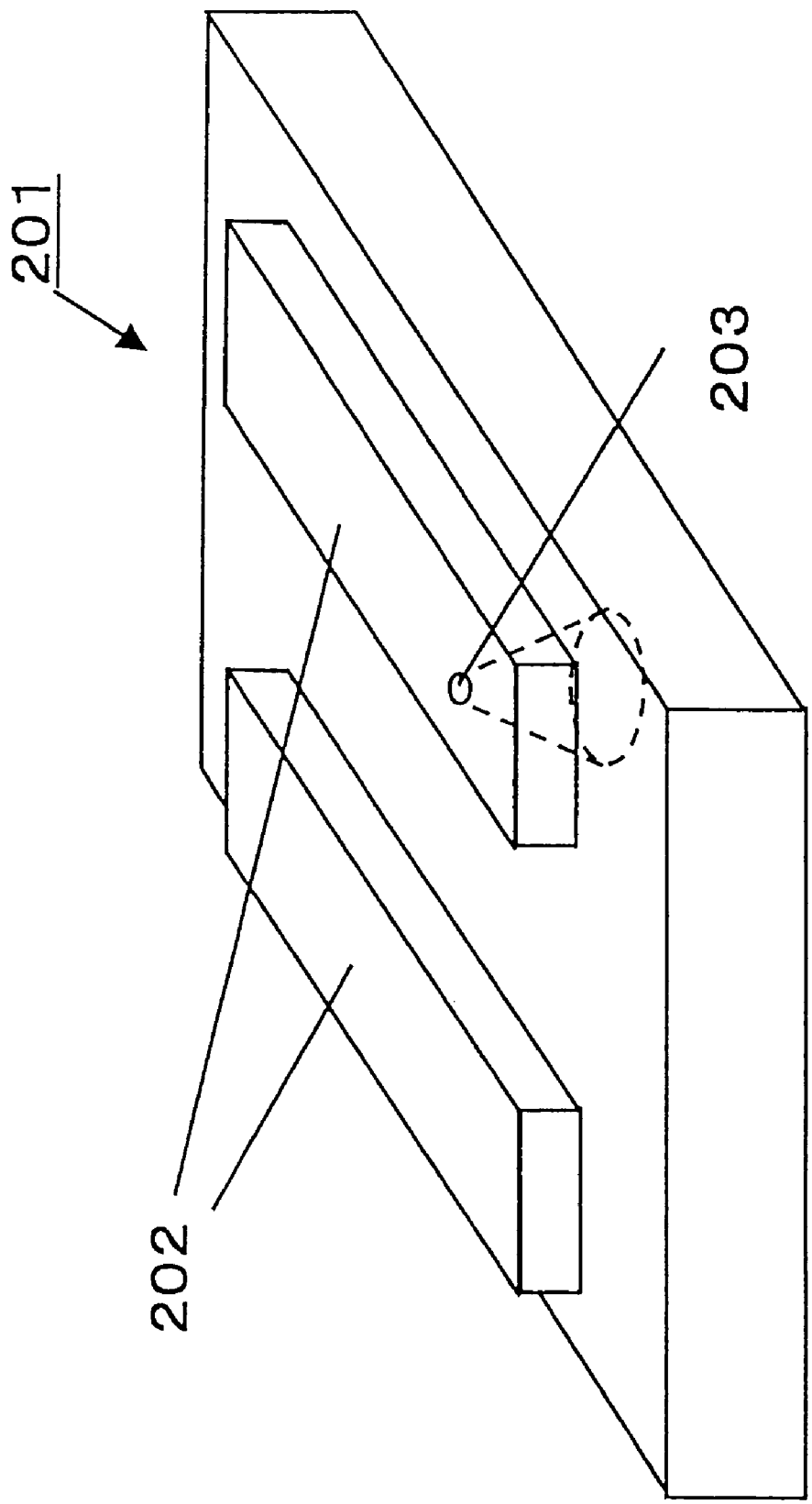

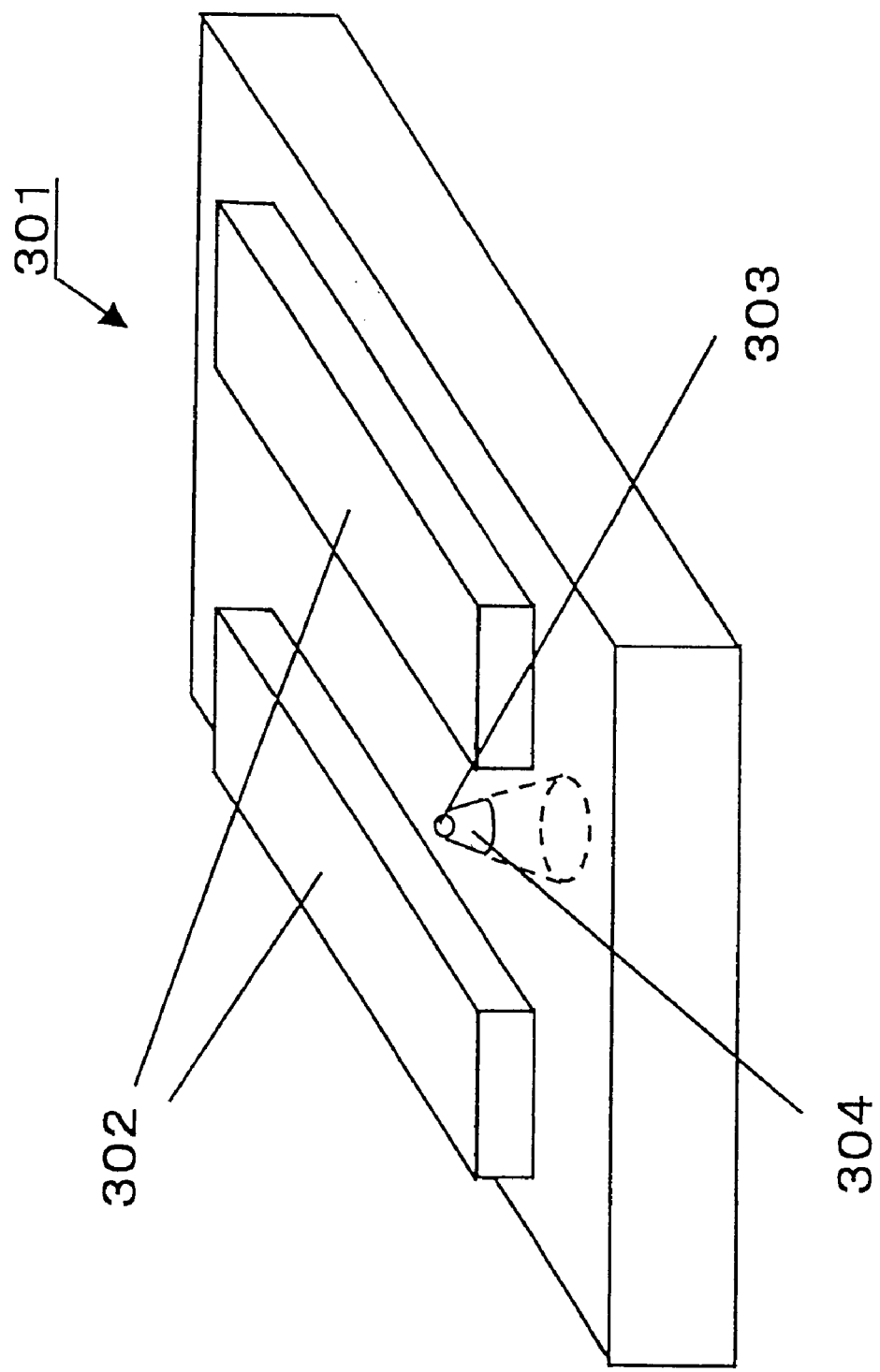

FIG. 6A    FIG. 6B
S101 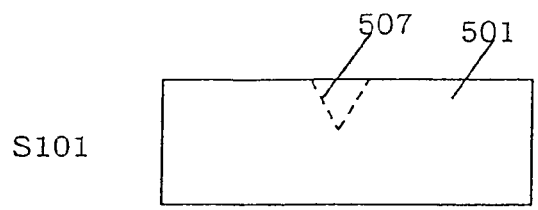 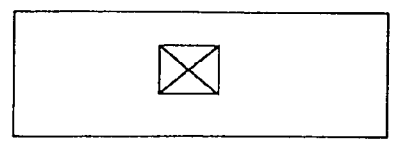
S102 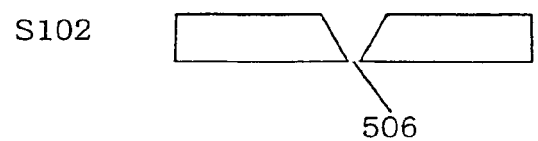 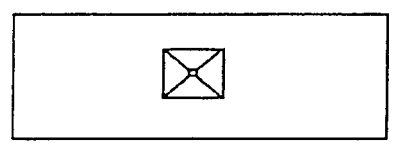
S103 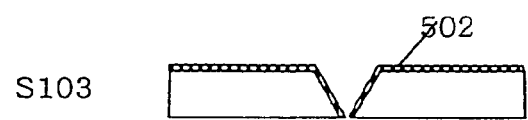 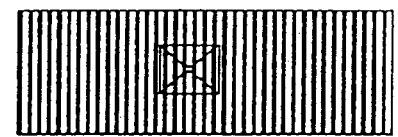
S104 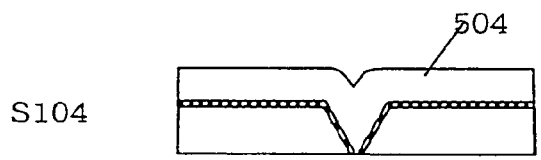 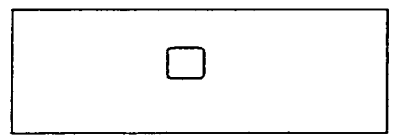
S105 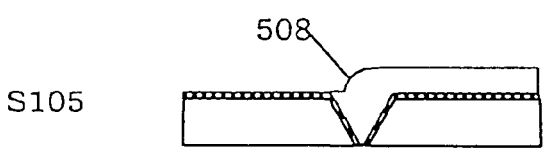 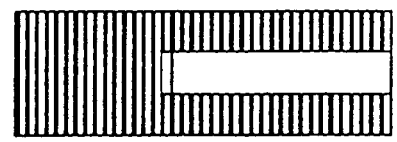
S106 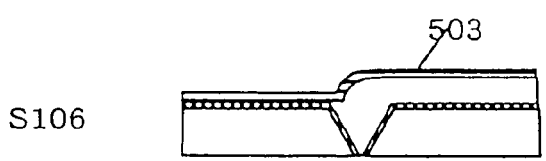 

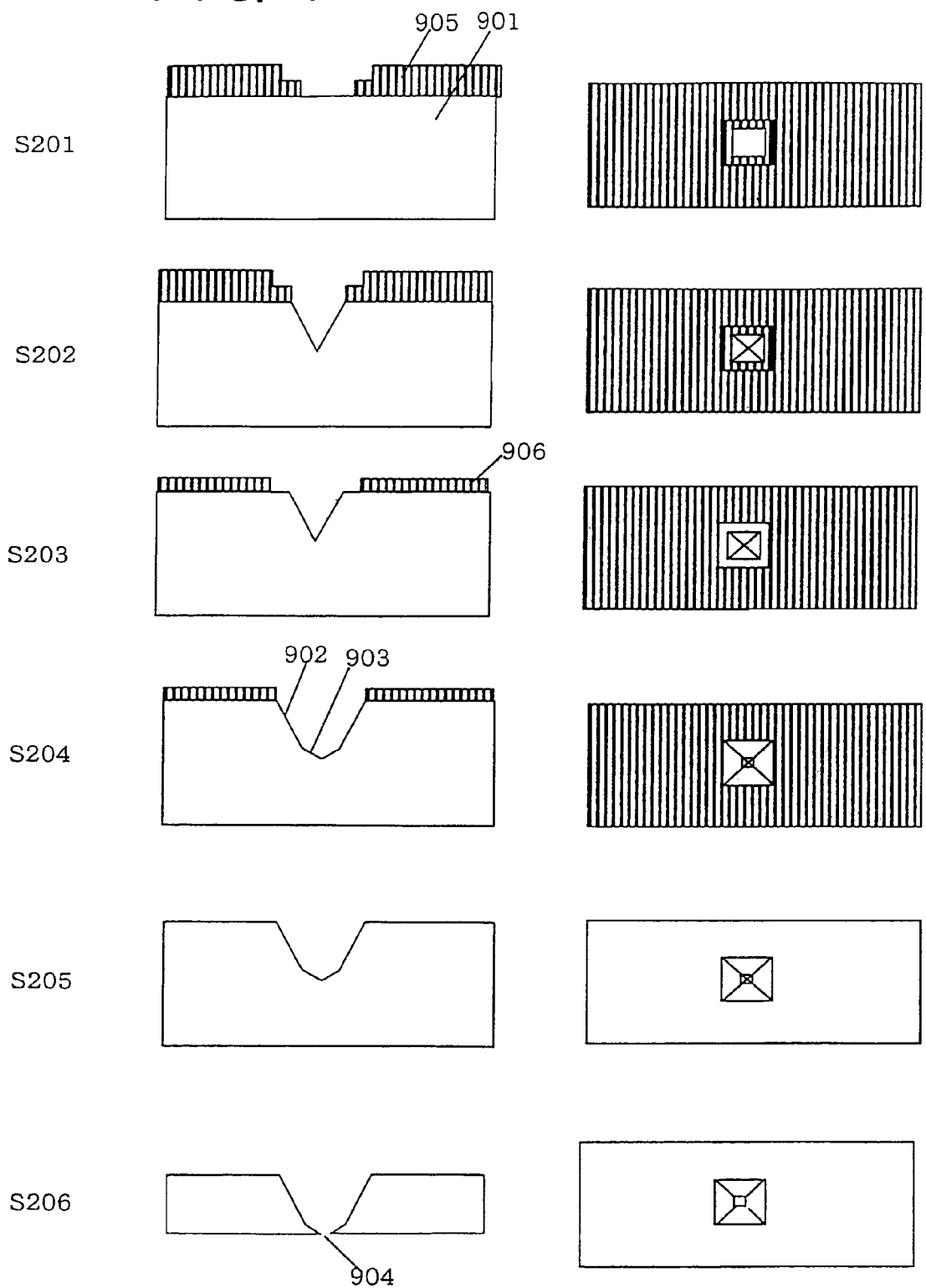

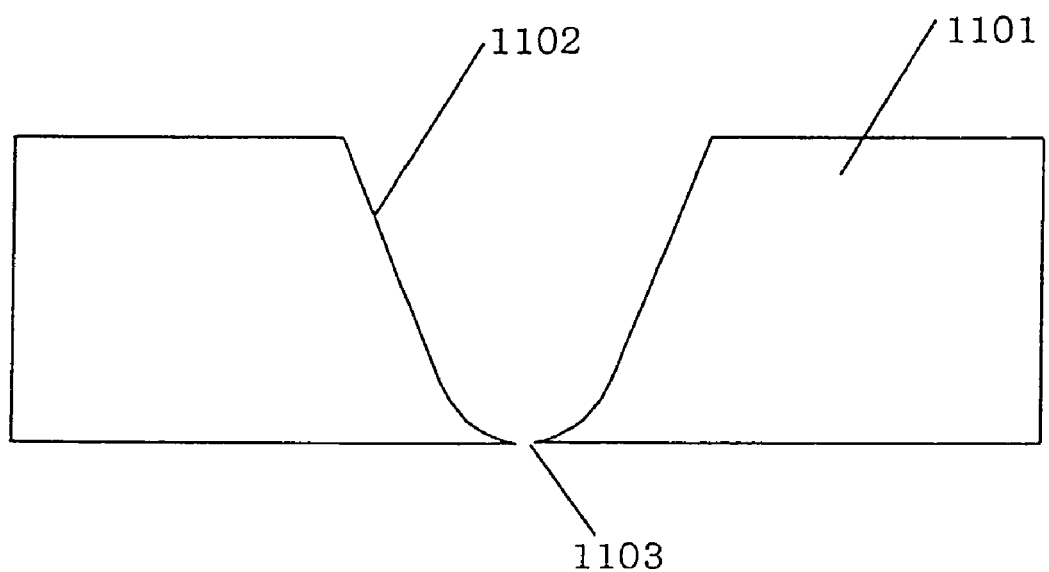
F I G. 1 1

F I G. 1 9
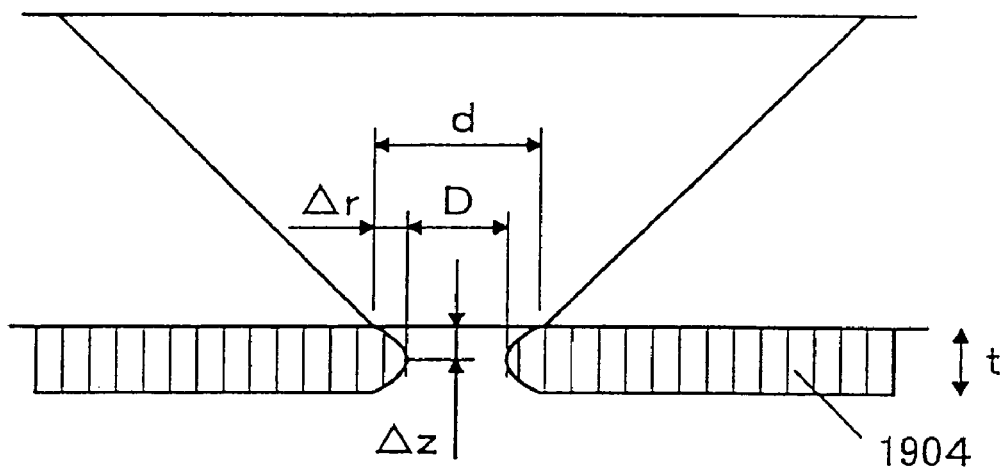
F I G. 2 0
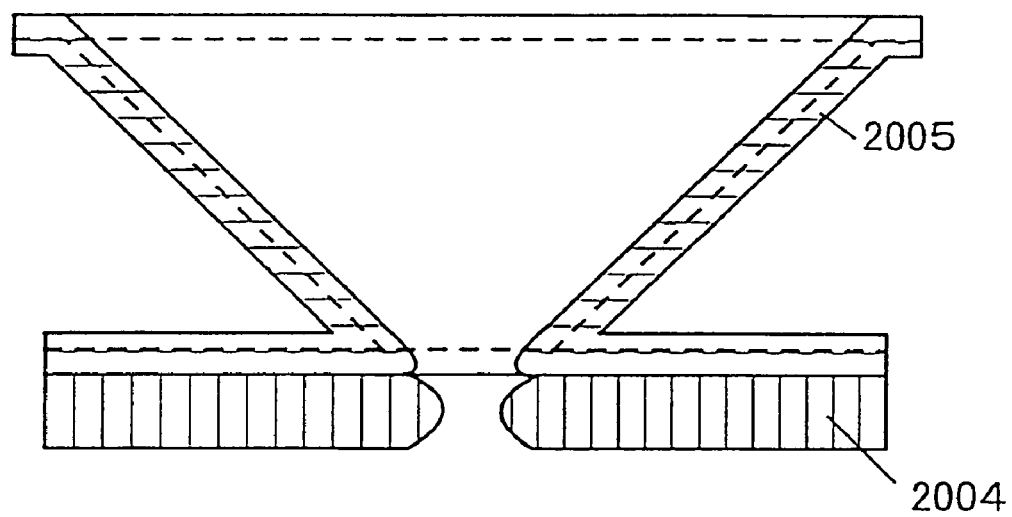

FIG. 37
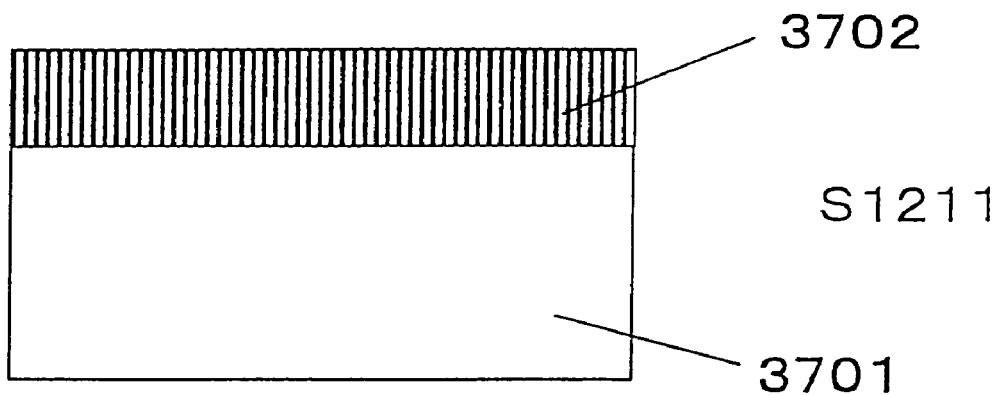
S1211
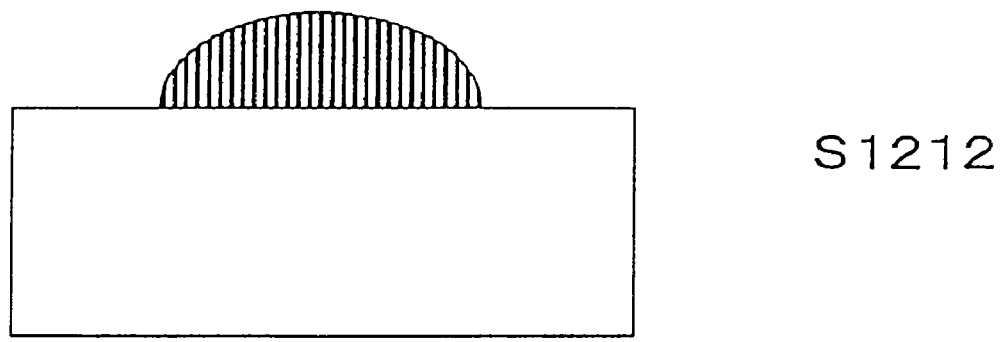
S1212
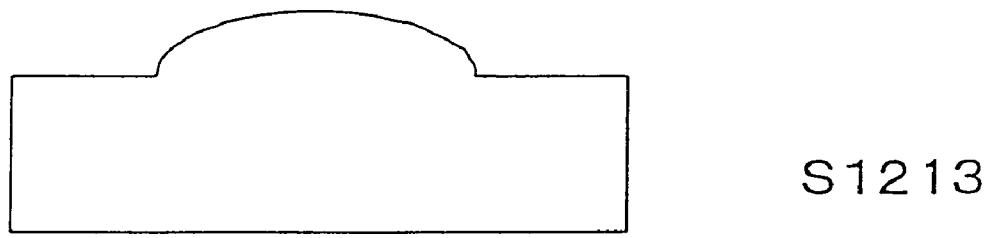
S1213

F I G. 4 1
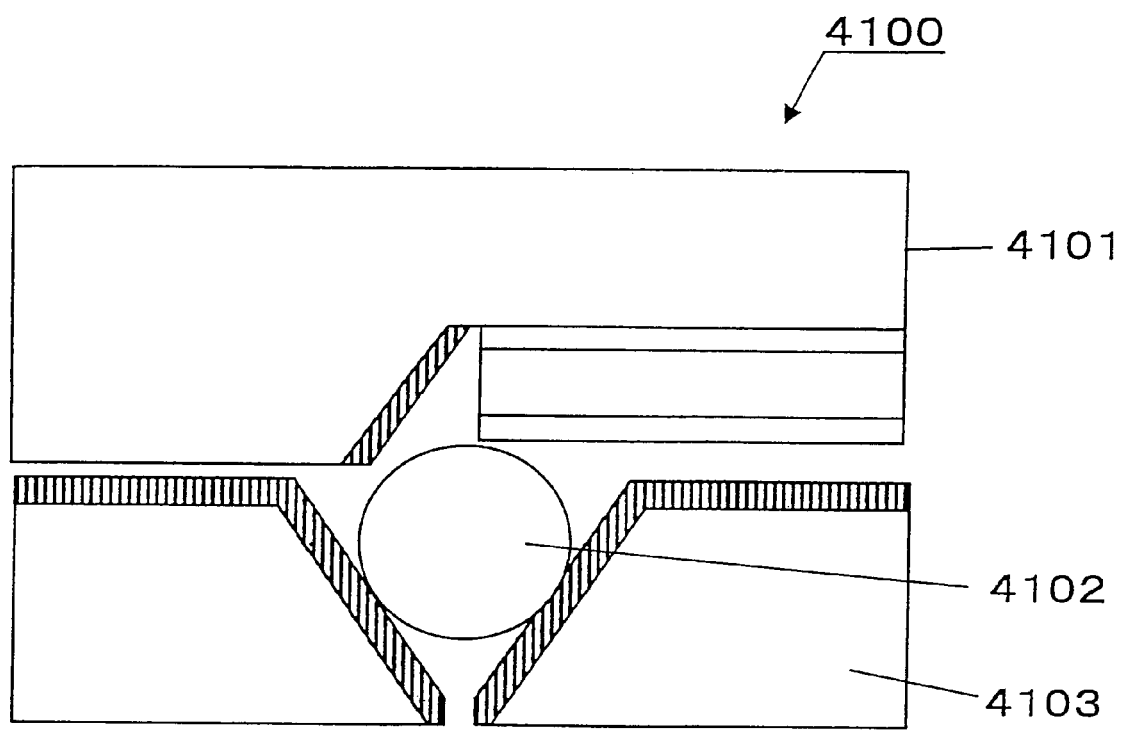

NEAR-FIELD OPTICAL HEAD HAVING TAPERED HOLE FOR GUIDING LIGHT BEAM

CROSS-REFERENCE TO RELATED APPLICATIONS

This application is a continuation of U.S. patent application Ser. No. 09/582,903, filed Aug. 11, 2000, now U.S. Pat. No. 7,599,277 which is a U.S. national stage application of International Application Ser. No. PCT/JP99/06150, filed Nov. 4, 1999, claiming a priority date of Nov. 9, 1998, and published in a non-English language.

TECHNICAL FIELD

The present invention relates to a near-field optical head for an information recording and reading-out apparatus which can record and read-out information with high density by reading-out structural or optical information formed in very small area and recording information to very small area by utilization of near-field light caused by optical interaction in the very small area.

BACKGROUND OF THE INVENTION

The information recording and reading-out apparatuses using light is advancing toward increase of capacity and decrease of size, requiring recording bit density increase. As a countermeasure there are studies using violet semiconductor lasers or SIL (Solid Immersion Lens). With these technologies, expectable improvement is at most nearly several times the current recording density because of a problem with diffraction limit of light. Contrary to this, there is an expectation for an information recording and reading-out method utilizing near-field light as a technology dealing with optical information in very small area exceeding the light diffraction limit.

This technology utilizes near-field light caused due to the interaction between a very small area and an optical aperture formed in a size less than a wavelength of light in a near-field optical head. This makes it possible to deal with optical information in the region of less than a light wavelength as a limit in the conventional optical system. The optical information reading-out methods include a method of illuminating scattering light onto a media surface to convert a greater part of near-field light localized at a very small mark into propagation light through the interaction with the very small aperture (collection mode), and a method of illuminating near-field light produced through an very small aperture onto a media surface thereby detecting, by a separately provided detector, scattering light converted through an interaction with a microscopic concave-convex having information recorded on a media surface (illumination mode). Recording is made by illuminating the near-field light produced from the very small aperture to a media surface thereby changing the form of a very small area on the media (heat mode record) or by changing the refractivity or transmissivity in a very small area (photon mode record). By using these near-field optical heads having the optical very small aperture exceeding a light diffraction limit, recording bit density increase can be achieved exceeding beyond the conventional optical information recording and reading-out apparatuses.

In such situations, generally the recording and reading-out apparatuses utilizing near-field light are almost similar in structure to the magnetic disk apparatus, and employ a near-field optical head in place of a magnetic head. The near-field optical head with an optical very small aperture mounted at a tip of a suspension arm is floated to a given height by a flying head technology and accessed to an arbitrary data mark existing on the disk. In order to follow up the near-field optical head to high-speed rotation of the disk, a flexture function is provided to stabilize the position coping with winding on the disk.

In the near-field optical head thus constructed, the method of supplying light to the aperture adopts means of connecting an optical fiber from above directly to the head or directly illuminating a laser provided above a head onto the head.

Also, in place of the near-field optical head, an optical fiber probe or cantilever-type optical probe sharpened at an aperture part formed by an optical fiber represented in a near-field optical microscope is used to achieve information recording and reading-out through an interaction by a tunnel current or interatomic force caused between a probe and a media surface of a scanning probe microscope while keeping a relative position to the media.

Meanwhile, there is a proposal of using a planar probe having an inverted pyramid structured aperture formed in a silicon substrate by anisotropic etching. Light is incident from above and then reflected upon the inverted conical pyramid thereby causing near-field light through the aperture present at an apex thereof. This prove does not have a sharpened tip as mentioned above and hence can be used as an optical head suited for high speed recording and reading-out.

However, if light is incident with a structure connected an optical fiber from above, an optical fiber structure is in connection between the head and the arm to thereby preventing the head from moving freely. Thus, the head is difficult to control in position relative to disk motion. Further, the head structured in large size makes it impossible to maintain a distance between the disk and the aperture. This results in a situation that the output SN ratio from optical information depicted on the disk is lowered thus making it difficult to read and write signals. Meanwhile, the greater part of light attenuates before reaching the aperture thus making it difficult to produce sufficient near-field light from the aperture for implementing reading-out at high speed. Furthermore, the structure having the upwardly extending fibers increases the size of apparatus itself making difficult to reduce the size and thickness thereof. Also, the optical fibers are inserted in and positioned one by one on the head thus being short in mass producibility.

Meanwhile, where illuminating a signal by a laser arranged above the head directly onto the head, there is a need of coping with high speed movement of the head to synchronize light to be incident thereon. There is a necessity of separately providing a structure that moves responsive to movement of the head thus encountering difficulty. Also, the separate provision of such a structure increases the size of the apparatus itself and the size reduction of the reading-out and recording apparatus is difficult.

Furthermore, where keeping constant a distance to a media through the interaction with a media surface by use of an optical fiber probe having optical fiber sharpened at its tip or a cantilever-type optical probe sharpened at its tip, scanning should be made while controlling a distance to the media at all times. This requires a feedback apparatus therefor and making difficult to reduce the size of the recording and reading-out apparatus. Furthermore, there is also a problem in high speed scanning because of a limitation of response speed of the feedback system. Also, the tip-sharpened probe is not sufficient in mechanical strength and hence not suited for being arrayed. Also, the intensity of near-field light from the aperture is not sufficient due to light loss at a fiber tip. Also, the probe is manually fabricated one by one and lack in mass producibility.

Meanwhile, the planar probe requires light to be incident from above thus posing a problem with apparatus size increase and mass producibility or a problem with reduction in flexture function as encountered in the above problem.

Furthermore, the probe aperture must be formed in a size smaller than a wavelength of propagation light (laser light, etc.) in order to produce near-field light or scatter near-field light. it is however difficult to fabricate such a size (10 nanometers to 200 nano-meters) of an aperture to an objective shape and size with accuracy and reproducibility.

For example, in the planar probe, etching is usually conducted for making in a silicon substrate a very small aperture suited for producing or scattering near-field light. There are cases of encountering problems concerning silicon substrate quality or etch solution concentration nonuniformity.

In concerned with silicon substrate quality in the former case, the periodic existence of silicon crystalline surfaces are premised for a method of forming a taper by anisotropic etching to open a hole penetrating the silicon substrate or a method of causing an aperture to appear by isotropically etching (etch-back) at an backside of the silicon substrate forming a taper. This results in unetching in a direction or at a rate as intended in areas containing crystalline defects or impurities, causing errors in the shape or size of a finally available aperture.

Meanwhile, the problem with etch solution concentration nonuniformity in the latter case means that there is more or less nonuniformity of concentration in an etch solution and such concentration nonuniformity causes an area that etching advances at a high rate and that advances at a low rate on a silicon substrate, i.e. there appear areas different in etch rate resulting in causing errors in the shape or size of a finally obtained aperture. Such a problem cannot be neglected particularly for a case where a multiplicity of planar probes are to be formed on a silicon wafer, thus posing a cause of incurring reduction of yield.

Accordingly, it is an object of the present invention to provide, in a near-field optical head having a very small aperture for producing near-field light, a near-field optical head which is capable of producing near-field light sufficiently greater than the aperture and obtaining reading-out and recording with resolution, compact in structure and excellent in mass producibility and arraying with two dimensional arrangement, capable of stably recording and reading-out due to movement following a media without hindering a flexure function, capable of recording and reading-out at high speed and being reduced in size and thickness.

SUMMARY OF THE INVENTION

In order to achieve the above object, a near-field optical head of the present invention is characterized by comprising: a planar substrate formed penetrating through with an inverted conical or pyramidal hole having an apex thereof made as the very small aperture; an optical waveguide formed on a surface opposite to a surface of the planar substrate forming the very small aperture; and a light reflection film formed in the optical waveguide to bend an optical path.

Accordingly, once reflection of light upon the light reflection layer makes it possible to focus the light to a vicinity of the very small aperture. This can increase the intensity of near field light produced from the aperture and provide a near field optical head high in mechanical strength, compact in structure and excellent in mass producibility.

Also, the near field optical head according to the invention is characterized in that the optical waveguide is also formed at an inside of the inverted conical or pyramidal hole.

Accordingly, the optical waveguide can be arranged close to the very small aperture, increasing the energy density of light illuminated to the very small aperture and the intensity of near field light to be produced from the aperture. Thus, a near field optical head is provided which is high in mechanical strength, compact in structure but excellent in mass producibility.

Also, the near field optical head according to the invention is characterized in that the optical waveguide is formed also on an inner side of the inverted conical or pyramidal hole.

Accordingly, the optical waveguide can be arranged nearby the very small aperture, increasing the energy density of light illuminated to the very small aperture and the intensity of near field light to be produced through the aperture. Thus, a near field optical head is provided which is high in mechanical strength, compact in structure and excellent in mass producibility.

Also, the near field optical head according to the invention is characterized in that the inverted conical or pyramidal hole is formed by a plurality of slant surfaces different in slant degree. Furthermore, a feature is provided in that the plurality of slant surfaces a slant surface having a slant degree smaller than a mean slant degree of the plurality of slant surfaces exists in a vicinity of the very small aperture.

Accordingly, the structure having a moderate slant surface in the vicinity of the very small aperture can reduce the loss of light propagation in the vicinity of the aperture and increase the intensity of near field light to be produced from the aperture. Thus, a near field optical head can be provided which is high in mechanical strength, compact in structure, excellent in mass producibility.

Also, the characterizing that in the plurality of slant surfaces at least one slant surface has an angle of smaller than 55 degrees with respect to the surface forming the very small aperture can reduce the loss of light propagation in the vicinity of the very small aperture and increase the intensity of near field light to be produced from the aperture.

Also, the near field optical head according to the invention is characterized in that the inverted conical or pyramidal hole has at least one of slant surface in a curved surface form. Otherwise, a feature is provided in that in a vicinity of the very small aperture, at least one of the slant surface in a curved surface form decreases in slant degree as the aperture is approached.

Accordingly, the structure having a slant surface in the vicinity of the very small aperture can reduce the loss of light propagation in the vicinity of the aperture and increase the intensity of near field light to be produced from the aperture. Thus, a near field optical head can be provided which is high in mechanical strength, compact in structure and excellent in mass producibility.

Also, the near field optical head according to the invention is characterized in that the light reflection layer or the optical waveguide has a focusing function to the very small aperture or a light collimating function from the very small aperture (light scattered upon detecting near field light).

Accordingly, light can be focused to the very small aperture by an effect of focusing function structured in the light reflection layer or optical waveguide, increasing the intensity of near field light to be produced from the aperture. Thus, a near field optical head is provided which is high in mechanical strength, compact in structure and excellent in mass producibility.

Also, the near field optical head is characterized to be provided which can efficiently propagate the light detected from the very small aperture by an effect of optical collimating function structured in the light reflection layer or optical waveguide.

Also, the near field optical head according to the invention is characterized in that the optical waveguide is structured by a combination of a clad and a core.

Accordingly, a near field optical head is provided high in light propagation efficiency by structuring the optical waveguide with a core and a clad that are different in refractivity.

Also, the near field optical head according to the invention is characterized in that the planar substrate has a plurality of the very small apertures, the optical waveguide and the light reflection layer being formed on the surface opposite to the surface forming the very small aperture to guide light generated from at least one of light source to the plurality of very small apertures.

Accordingly, where using the near field optical head of the invention as an optical memory head, high-speed recording and reading-out of information is feasible and a sufficient amount of light can be supplied to a media without performing high-speed scanning of the probe. Thus, a near field optical head can be provided which is compact in structure but excellent in mass producibility. Furthermore, an increased amount of near field light can be produced from the aperture thus making it possible to input and output signals with high S/N ratio and manufacture a reliable apparatus.

Next, in manufacturing a near field optical head having a planar substrate formed penetrating through with an inverted conical or pyramidal hole having an apex thereof made as the very small aperture, an optical waveguide formed on a surface opposite to a surface forming the very small aperture, and a light reflection layer formed in the optical waveguide to bend an optical path, a method for manufacturing a near field optical head is characterized in that: the optical waveguide is formed laid on the planar substrate. Also, the optical waveguide is characterized to be formed bonded on the planar substrate.

Also, a method for manufacturing a near field optical head is characterized by including: a process of forming an inverted conical or pyramidal hole penetrating through the planar substrate to have an apex made as the very small aperture; a process of laying an optical waveguide on a surface opposite to a surface forming the very small aperture; a process of forming a light reflection layer in the optical waveguide in a manner bending an optical path.

Otherwise, an optical waveguide is characterized to be formed by a process of being bonded to a surface opposed to a surface forming the very small aperture in place of the process of laying an optical waveguide on the surface opposed to the surface forming the very small aperture.

Accordingly, the manufacturing method like this enables manufacture by a semiconductor manufacturing process using a photolithography technology. Thus, a near field optical head is provided which is high in mechanical strength, compact in structure and excellent in mass producibility. Also, a near field optical head and near field optical head array are provided arrayed with a plurality of apertures formed on a same substrate.

Also, a method for manufacturing a near field optical head according to the present invention is characterized by including: a process of forming an inverted conical or pyramidal hole penetrating through the planar substrate to have an apex made as a first very small aperture; a process of forming a light reflection layer on a taper of the inverted cone or pyramidal hole, and forming a second very small aperture having a size defined by a thickness of the light reflection layer and smaller than the first very small aperture.

Accordingly, forming a comparatively large very small aperture (first very small aperture) on a planar substrate such as a silicon substrate reduces variation in very small aperture due to etching or the like. Even for a very small aperture with variation, the film forming comparatively easy in control on the inverted conical or pyramidal taper defines a size of an actually-effective very small aperture (second very small aperture), hence providing a planar probe with yield.

Also, a method for manufacturing a near field optical head according to the present invention is characterized by including: a process of forming an inverted conical or pyramidal hole penetrating through the planar substrate to have an apex made as a first very small aperture; a process of forming a light reflection layer having a partly different thickness on a taper of the inverted conical or pyramidal hole, and forming a second very small aperture having a shape defined by the thickness of the light reflection layer and different in shape from a shape of the first very small aperture.

Accordingly, forming a comparatively large very small aperture (first very small aperture) on a planar substrate such as a silicon substrate reduces variation in very small aperture due to etching or the like. Even for a very small aperture with variation, the film forming comparatively easy in control on the inverted conical or pyramidal taper defines a size of an actually-effective very small aperture (second very small aperture), hence providing a planar probe with yield.

Also, a method for manufacturing a near field optical head of the present invention is characterized by including: a process of forming an inverted conical or pyramidal hole penetrating through the planar substrate to have an apex made as a first very small aperture; a process of forming in the planar substrate a light reflection film on a surface including the first very small aperture, and forming a second very small aperture having a size defined by a thickness of the light reflection film and smaller than the first very small aperture.

Accordingly, forming a comparatively large very small aperture (first very small aperture) on a planar substrate such as a silicon substrate reduces variation in very small aperture due to etching or the like. Even for a very small aperture with variation, the film forming comparatively easy in control on a backside of the planar substrate (on a surface including the first very small aperture) defines a size of an actually-effective very small aperture (second very small aperture), hence providing a planar probe with yield.

Also, a method for manufacturing a near field optical head according to the present invention is characterized by including: a process of forming an inverted conical or pyramidal hole penetrating through the planar substrate to have an apex made as a first very small aperture; a process of forming an oxide film on a surface of the planar substrate including a taper of the inverted conical or pyramidal hole, and forming a second very small aperture having a size defined by a thickness of the oxide film and smaller than the first very small aperture.

Also, a method is characterized by including: a process of forming an inverted conical or pyramidal hole penetrating through the planar substrate to have an apex made as a first very small aperture; a process of performing ion implant to a surface of the planar substrate including a taper of the inverted conical or pyramidal hole, and forming a second very small aperture having a size defined by a thickness expanded due to the ion implant and smaller than the first very small aperture.

Accordingly, a very small aperture (first very small aperture) is formed greater than a target size or shape in a planar substrate such as a silicon substrate to perform thermal oxidation or ion implant on or to a surface including the very small aperture taper whereby an expanded part defines a size and shape of a very small aperture (second very small aperture) to actually produce near field light. This accordingly solves the problem with deviation in microscopically forming an aperture in a silicon substrate through etching or the like by thermal oxidation or ion implant comparatively easy to control. Thus, a planar probe can be obtained with yield.

Also, in order to achieve the above object, a near field optical head according to the present invention comprises: a planar substrate formed through with an inverted conical or pyramidal hole to have an apex thereof made as a very small aperture; an optical waveguide laid on an opposite surface of the planar substrate to a surface forming the very small aperture and on an inside of the inverted conical or pyramidal hole; a tip sharpened microscopic protrusion formed by one part of the optical waveguide and protruding from the very small aperture of the planar substrate.

Also, a light reflection layer for reflecting light is formed on a periphery of the optical waveguide in an area excepting the protrusion.

Accordingly, the structure of the optical waveguide makes it possible to supply an increased amount of light to the protrusion to produce near field light. Further, the reflection of light by the light reflection layer can supply an increased amount of light toward a tip (protrusion) of the optical waveguide. Consequently, the near field light caused at the microscopic protrusion formed at the tip can be increased in intensity. Thus, a near field optical head is provided which is high in mechanical strength, compact in structure but excellent in mass producibility.

Also, in the near field optical head according to the invention, the microscopic protrusion is characterized in an square pyramid form.

Accordingly, at the tip the region that the optical waveguide width is smaller in dimension than a wavelength of light is made narrow thereby increasing the intensity of near field light produced from the protrusion and enabling observation with a resolution corresponding to a radius of curvature at the tip of the sharpened protrusion.

Also, a near field optical head according to the invention, the inverted conical or pyramid hole is characterized to be formed by a plurality of slant surfaces different in slant degree.

Accordingly, by making the optical waveguide in a structure having a moderate curved surface form, the loss of light propagation can be totally reduced at the curved surface thus increasing the intensity of near field light created from the protrusion.

Also, a near field optical head according to the invention, the optical waveguide is characterized to be formed by a combination of a core and a clad.

Accordingly, by structuring the optical waveguide with different refractivities of a core and a clad, a near field optical head can be provided which is high in light propagation efficiency.

Also, in the near field optical head according to the invention, the planar substrate is characterized having a plurality of microscopic protrusion, and the optical waveguide and the light reflection layer being formed to guide light emitted from at least one light source toward the plurality of microscopic protrusion.

Accordingly, by making a structure having the optical waveguide and light reflection layer, light can be propagated with efficiency to the microscopic protrusion located at a tip of the optical waveguide. Further, by making a structure narrowed in the region that the optical waveguide width at the protrusion is smaller in dimension than a wavelength of light, the near field light produced from the protrusion can be increased in intensity. Thus, a near field optical head is provided that observation is possible with a resolution corresponding to a radius of curvature at the tip of the sharpened protrusion. Also, a near field optical head is provided which is high in mechanical strength, compact in structure and excellent in mass producibility. Two-dimensionally scanning such a probe makes it possible to process totally at high speed an near field optical image with resolution. Also, making in array provides an optical probe capable of recording and reading-out information at high speed without requiring high speed scanning.

Next, in a method for manufacturing a near field optical head is characterized by including: a process of forming an inverted conical or pyramidal hole in a planar substrate; a process of laying an optical waveguide on the planar substrate including an inside of the inverted conical or pyramidal hole; a process of forming a microscopic protrusion for light detection or illumination on an opposite surface of the planar substrate to the inverted conical or pyramidal hole; and a process of forming a light reflection layer in a manner bending an optical path.

Also, in manufacturing a near field optical head comprising a planar substrate formed through with an inverted conical or pyramidal hole to have an apex thereof made as a very small aperture, an optical waveguide laid on an opposite surface of the planar substrate to a surface forming the very small aperture and on an inside of the inverted conical or pyramidal hole, a tip sharpened microscopic protrusion formed by one part of the optical waveguide and protruding from the very small aperture of the planar substrate, a method for manufacturing a near field optical head is characterized in that: the optical waveguide and the light reflection layer are formed by laying on the planar substrate.

Accordingly, such a manufacturing method enables manufacture by a semiconductor manufacturing process using photolithography technique thus providing a near field optical head compact in structure, well in reproducibility and excellent in mass producibility. Also, a near field optical head can be provided which is arrayed forming a plurality of apertures on a same substrate.

Furthermore, in order to achieve the above object, a near field optical head for recording and/or reading-out information of a recording media utilizing near field light, a near field optical head is characterized by comprising: an optical waveguide comprising a first clad formed through with at least one inverted conical or pyramidal hole to have an apex thereof made as a very small aperture, a core formed in a depth direction along a side surface of the inverted conical or pyramidal hole, and a second clad formed in a manner cooperating with the first clad to clamp the core; and a first reflection film formed on one end surface of the optical waveguide.

Also, the light incident on the incident end of the core propagates through the core and then reflected by the first reflection film toward the very small aperture. The reflection light propagates through the core formed in the inverted conical or pyramidal hole and then emitted through the very small aperture thereby producing near field light in a vicinity of the very small aperture. In this manner, the structure using the optical waveguide in place of a conventional optical fiber enables to reduce size and weight.

Also, a second reflection film is characterized to be formed on an backside of the first clad and having a microscopic diameter hole in a position corresponding to the very small aperture.

Accordingly, the formation of the second reflection film eliminates leakage of core leak light to an outside of the optical waveguide thus effectively narrowing a light illumination range on a recording surface of a recording medium.

Also, the one end surface of the optical waveguide is characterized to be made in a curved surface.

Accordingly, the curved surface at one end surface of the optical waveguide causes the first reflection film to acts as a concave mirror so that the laser light propagated through the core is focused by the first reflection film and reflected toward the very small aperture.

Also, in a near field optical head for recording and/or reading-out information of a recording media utilizing near field light, a near field optical head is characterized by comprising: an optical waveguide comprising a clad formed through with at least one inverted conical or pyramidal hole to have an apex thereof made as a very small aperture and a core formed in a depth direction along a side surface of the inverted conical or pyramidal hole; a reflection film formed on one end surface of the optical waveguide; a substrate bonded on the core and having a refractivity different from a refractivity of the core.

Accordingly, because the substrate is bonded on the core and has a reflectivity different from the reflectivity of the core, it serves as a clad for the optical waveguide.

Also, in a method for manufacturing a near field optical head for recording and/or reading-out information to and from recording medium utilizing near field light, a method for manufacturing a near field optical head is characterized by comprising: a first process of forming a first clad on a substrate; a second process of forming in the first clad at least one inverted conical or pyramidal hole such that an apex thereof is made as a very small aperture; a third process of forming a core in a depth direction along the first clad and the side surface of the inverted conical or pyramidal hole; a fourth process of forming a second clad in a manner of cooperating with the first clad to clamp the core; a fifth process of forming a reflection film on one end surface of an optical waveguide formed by the first clad, the core and the second clad; and a sixth process of removing the substrate.

Accordingly, in the first process a first clad is formed in the substrate. In the second process an inverted conical or pyramidal hole is formed in the first clad such that an apex thereof is made as a very small aperture. In the third process a core is formed in a depth direction along the first clad and along a side surface of the inverted conical or pyramidal hole. Furthermore, in the fourth process a second clad is formed in a manner cooperating with the first clad to clamp the core. In the fifth process a reflection film is formed on one end surface of the optical waveguide. In the final sixth process the substrate is removed thereby manufacturing a near field optical head having an optical waveguide.

Also, in order to achieve the above object, a near field optical head according to the present invention is characterized by comprising: a very small aperture formed at an apex of a taper formed by an optical propagation member having a tip sharpened toward a recording medium; a light introducing part for propagating light generally in a parallel direction with the recording medium; and a light reflection layer for reflecting light propagated through the light introducing part toward the very small aperture.

Accordingly, in the case that light is incident from above to a near field optical head, the near field optical head is introduced with light in a direction parallel to a recording medium thereby making it possible to reduce the size and thickness of the overall apparatus against the problem of increasing the apparatus structure. Furthermore, it is possible to follow up the winding on the recording medium and hence keep at all times a constant relative position to the recording medium. Consequently, stable near field light can be supplied at all times to the recording medium. Thus, a near field optical head can be manufactured which is high in reliability.

Furthermore, in the near field optical head according to the invention, the taper is characterized having at least one part structured by a combination of a plurality of tapers different in angle of apex spread. In particular, the plurality of tapers has, in a vicinity of the very small aperture, a taper having an angle of spread greater than a mean angle of spread of the plurality of tapers. Otherwise, the taper has a curved surfaced taper in at least one part thereof. In particular, at least one of the curved surfaced taper increases in angle of spread in the vicinity of the very small aperture as the aperture is approached.

Accordingly, although the intensity of light largely attenuates in a region where the light propagation member is smaller in width than a wavelength of light, the structure made narrow in this region makes it possible to produce an increased amount of near field light from the very small aperture. This results in dealing with signals high in S/N ratio in recording and reading-out information to and from a recording medium thus providing a near field optical head high in reliability. Also, even where the amount of light is less at the laser light source, high conversion efficiency to near field light enables supply of near field light required for a recording medium. Accordingly, power saving is feasible at the laser light source. Thus, an information reading-out and recording apparatus is provided which can be driven with low power consumption and at low voltage.

Otherwise, in the near field optical head according to the invention, the taper is characterized to be asymmetric in shape about a center axis of the taper passing the apex.

Accordingly, a distribution of near field light under the influence of the featured shape is illuminated to a recording medium thereby effectively determining an illumination range and enabling information recording and reading-out in a manner suited for purposes.

Also, in the near field optical head according to the invention, the light propagation member in at least one part is characterized to be of dielectric.

Accordingly, the refractivity of the light propagation member is greater than that of air. Where viewing the aperture from the propagation light, the apparent size of the aperture is in a size of times the refractivity. Where a wavelength in propagation be same, the transmissivity improves at the aperture. Otherwise, forming a refractivity distribution or curved surface form on the dielectric provides a function as a lens. By aligning its focus to the aperture, greater near field light can be produced.

Otherwise, the light propagation member in at least one part is characterized to be of air.

Because an aperture can be fabricated by opening a hole by etching, the process can be simplified with manufacture at low cost.

Also, in the near field optical head according to the invention, the taper in at least one part is characterized to be covered by metal.

Accordingly, the amount of propagation light to the aperture is increased due to reflection of light upon the taper metal thereby producing increased amount of near field light.

Also, in the near field optical head according to the invention, the taper in at least one part is characterized to be covered by dielectric. Otherwise, the taper in at least one part is characterized to be covered by dielectric having a refractivity smaller than a refractivity of dielectric constituting the light propagation member.

Accordingly, the amount of propagation light to the aperture is increased due to reflection of light upon the taper metal thereby producing increased amount of near field light.

Also, in the near field optical head according to the invention, a protrusion protruded from the very small aperture is characterized to be provided. Furthermore, the protrusion in at least one part is characterized to be dielectric.

Accordingly, the shape of the projection causes a featured spatial distribution of near field light so that an illumination range can be determined by utilizing the same.

Also, the protrusion at least in one part is characterized to be covered by metal.

Accordingly, the near field light caused on a recording medium surface can be scattered over a range dependent upon the protrusion shape thus effectively determining a scattering range.

Also, the protrusion is characterized to be in a conical or pyramidal form.

Accordingly, high resolution information recording and reading-out are possible by the near field light caused around the sharpened tip.

Also, in the near field optical head according to the invention, a relative position to the recording medium is characterized to be kept constant by a floating force undergone from a side of the recording medium and a load weight applied toward the recording medium. Furthermore, the floating force is characterized to be an air pressure caused due to high speed motion of the recording medium. Otherwise, the floating force is characterized to be due to a pressure of a liquid applied in a constant thickness on a surface of the recording medium.

Also, a relative position to the recording medium is characterized to be kept constant by controlling an electric interaction caused with the recording medium. Otherwise, a relative position to the recording medium is characterized to be kept constant by controlling an interatomic force interaction caused with the recording medium.

Accordingly, the spacing to a recording medium can be kept constant and in a fully proximate state while reading-out from the recording medium at high speed, thereby achieving high speed processing of microscopic bits. Furthermore, realized is size reduction of the apparatus structure.

Also, in the near field optical head according to the invention, a slider structure is characterized to be provided in a surface opposed to the recording medium.

Accordingly, stable floating of the near field optical head is obtained. Because constant supply of near field light is possible on a recording medium surface, an information recording and reading-out apparatus low in error rate but high in reliability can be manufactured.

Also, in the near field optical head according to the invention, the very small aperture is characterized to be formed in a slider surface. Furthermore, a spacing between the recording medium and the very small aperture is characterized to be nearly same as a spacing between the recording medium and the slider. Also, the taper and the slider structure are provided in proximity with. Otherwise, the slider structure is characterized to be arranged in a manner surrounding by 180 degrees over a periphery of the taper.

Accordingly, the structure that the damage due to contact with a recording medium is reduced while making close the distance between the very small aperture and the media makes it possible to manufacture a near field optical head which is hardly broken and strong, reliable and high in signal SN ratio.

Also, the slider structure in at least one part is characterized to be dielectric.

Otherwise, the slider structure in at least one part is characterized to be metal.

Accordingly, the slider in a surface can be worked smooth to a state almost free of concave-convex, allowing for proximity to a media with less contact therewith. Also, adoption in a silicon process is possible thus improving mass producibility.

Furthermore, in the near field optical head according to the invention, the light reflection layer in at least one part is metal. Furthermore, the light reflection layer is characterized to have a focusing function to focus the light reflected toward the very small aperture. Additionally, the light reflection layer is characterized by a light reflecting surface having a concave surface structure. Alternatively, the light reflection layer of the near field optical head is characterized by a light reflecting surface having a grating structure.

Accordingly, the light propagated parallel with a recording medium can be reflected toward the aperture. The illumination from above makes it possible to produce an increased amount of near field light from the aperture due to an effect of reflection upon the taper. Also, the provision of the focusing function increases the collection of light to the aperture, thus producing increased amount of near field light.

Also, in the near field optical head according to the invention, the light reflection layer is characterized to be formed by working one part of the light introducing part and laying on a worked surface thereof.

Accordingly, because of the process allowing for manufacture by a micro-machining process using silicon or the like, the structure is suited for mass production and can be manufactured at low cost. Also, because of working a fiber or optical waveguide itself, there is less propagation loss. such as loss due to refractivity change, thus improving supply amount of light to the aperture.

Also, in the near field optical head according to the invention, the light reflection layer is characterized to be formed by laying on a slant surface formed at a constant angle as determined by a planar orientation due to chemical etching. Furthermore, the slant surface having a constant angle as determined by a planar orientation is characterized to be in a (111) plane formed in (100) planed single crystal silicon. Otherwise, the light reflection layer is characterized to have a reflecting direction of light of approximately 70 degrees with respect to a propagation direction in the light introducing part.

Accordingly, the micro-machining process manufacture provides a constant angle thereby supplying a constant amount of light at all times to the aperture. Also, the light propagated through the light introducing part reaches the aperture through once reflection. Thus, the amount of attenuation light due to reflection can be reduced as compared to the case of reaching the aperture through twice or trice reflections. Also, The adaptation to a silicon process enables to manufacture a near field optical head excellent in size reduction/mass producibility.

Also, in the near field optical head according to the invention, the light introducing part in at least one part is characterized to be dielectric. Otherwise, the light introducing part in at least one part is characterized to be air.

Accordingly, the loss in propagation is reduced to extremely low and the light from the laser light source can be sufficiently supplied to the light reflection layer.

Furthermore, the light introducing part in at least one part is characterized to be an optical fiber. Also, the light introducing part in at least one part is characterized to include a combination of a core relatively high in refractivity and a clad relatively low in refractivity.

Accordingly, the light from the laser light source can be supplied positively to the light reflection layer in a very small area without being scattered and attenuated. Also, it is possible to set an arbitrary illumination spot and positively supply light to the aperture.

Furthermore, in the near field optical head according to the invention, the light introducing part in at least one part is characterized to, have a focusing function to focus light to be propagated to the very small aperture. Otherwise, the light introducing part is characterized to have a vertical surface to a light propagation direction having at least one part made in a convex form. Also, the light introducing part in at least one part is characterized to have a grating structure. Also, the light introducing part in at least one part is characterized to have a gradient of refractivity having a refractivity different stepwise.

Accordingly, by setting the focusing function to make a microscopic spot aligned to the aperture, an increased amount of near field light can be produced from the aperture. Thus, a near field optical head can be formed that is high in signal SN ratio.

Furthermore, in the near field optical head according to the invention, the taper in at least one part is characterized to be provided with a focus functioning member having a focusing function to focus light to the very small aperture. Otherwise, a focus functioning member having a focusing function to focus light to the very small aperture is characterized to be provided in at least one part of an optical path between the light reflection layer and the taper. Also, a focus functioning member having a focusing function to focus light to the very small aperture is characterized to be provided in at least one part of the light reflection layer. Also, a focus functioning member having a focusing function to focus light to the very small aperture is characterized to be provided in at least one part of the light introducing part.

Accordingly, against a problem that microscopic movement in the head causes a focus point to deviate from the aperture resulting in increased variation in recording and reading-out signals in the case where light is illuminated to the aperture from above the near field optical head, the provision of the focusing function within the near field optical head provides focus setting to the aperture thus allowing for recording and reading-out in a state of always focusing to the aperture irrespectively of head movement. Thus, because a sufficient amount of near field light can be produced at all times, an information recording and reading-out apparatus can be manufactured which is high in SN ratio and reliability.

Furthermore, the focus functioning member in at least one part is characterize to be dielectric. Also, the focus functioning member is characterized to have a vertical surface to a light propagation direction having at least one part made in convex form. Furthermore, the focus functioning member is characterized to be spherical. Also, the focus functioning member in at least one part is characterized to have a refractive gradient having a refractivity different stepwise. Also, the focus functioning member in at least one part is characterized to have a grating structure.

Accordingly, the lens effect of them makes possible to produce a sufficiently high near field light from the aperture. Thus, an information recording and reading-out apparatus can be manufactured which is high in SN ratio and reliability. Also, even where the light amount of the laser light source is reduced, an increased amount of near field light can be produced from the aperture. Thus, an information recording and reading-out apparatus can be manufactured which is low in power consumption and voltage drive.

Also, in the near field optical head according to the invention, the very small aperture and the light reflection layer are characterized to be provided in proximity with. Otherwise, a distance between the very small aperture and the light reflection layer is characterized to be 20 μm or less.

Accordingly, even where the light reflected by the light reflection layer and propagated toward the aperture is scattering light, the aperture if provided nearby the light reflection layer making a spot size of light illuminated to the aperture to nearly a size of a spot size on the reflection surface. Thus, high energy density light is illuminated to the aperture. Accordingly, near field light can be produced greater than the aperture, enabling to form a reliable near field optical head.

Also, in the near field optical head according to the invention, an apertured substrate having the very small aperture is characterized to be provided on a surface opposed to the recording medium. On the apertured substrate, the light reflection layer is characterized to be laid and formed on an opposite surface forming the very small aperture of the apertured substrate. Otherwise, the light reflection layer is characterized to be bonded and formed on an opposite surface forming the very small aperture of the apertured substrate. Also, the light reflection layer is characterized to be laid and formed in a surface forming the very small aperture of the apertured substrate. Otherwise, the light introducing part is characterized to be laid and formed on an opposite surface forming the very small aperture of the apertured substrate. Also, the light introducing part is characterized to be bonded and formed on an opposite surface forming the very small aperture of the apertured substrate. Otherwise, the light introducing part is characterize to be laid and formed in a surface forming the very small aperture of the apertured substrate. Also, the light focus functioning member is characterized to be laid and formed on an opposite surface forming the very small aperture of the apertured substrate. Otherwise, the light focus functioning member is characterized to be bonded and formed on an opposite surface forming the very small aperture of the apertured substrate.

Accordingly, where forming devices having respective functions by laying or bonding on a top surface of the substrate, manufacture is possible with using micro-machining such as a silicon process. This allows for size reduction for the near field optical head and further the information recording and reading-out apparatus itself. Furthermore, the size reduction of the near field optical head enables further proximity to a recording medium. This allows for reading out and writing in of microscopic bits with utilization of the very small aperture put in proximity. Thus, a high density information recording and reading-out apparatus is made feasible to manufacture.

Also, in manufacturing a near field optical head having a very small aperture formed at an apex of a taper formed by a light propagation member sharpened at a tip toward a recording medium, a light introducing part for propagating light generally in a parallel direction with the recording medium, a light reflection layer for reflecting light propagated through the light introducing part toward the very small aperture, and a focus functioning member provided on an optical path between the light reflection layer and the taper and having a convex form in at least one part of a surface vertical to a direction of light propagation or a focus functioning member different stepwise in refractivity, a method for manufacturing a near field optical head according to the present invention is characterized in that:

the focus functioning member is formed by working a surface thereof by chemical etching.

Otherwise, the focus functioning member is characterized to be formed by exchanging ions from one part of a surface thereof.

Otherwise, the focus functioning member is characterized to be formed by exchanging ions from one part of a surface thereof.

Otherwise, the focus functioning member is characterized to be formed by setting with UV radiation a liquid having a curved surface due to a surface tension.

Otherwise, the focus functioning member is characterized to be formed by thermosetting a liquid having a curved surface due to a surface tension.

Also, in manufacturing a near field optical head having a very small aperture formed at an apex of a taper formed by a light propagation member sharpened at a tip toward a recording medium, a light introducing part for propagating light generally in a parallel direction with the recording medium, a light reflection layer for reflecting light propagated through the light introducing part toward the very small aperture, and a metal covering the taper, a method for manufacturing a near field optical head is characterized in that:

the taper is formed by conducting surface working using chemical reaction.

Otherwise, the very small aperture is characterized to be formed by plastically deforming the metal in a vicinity of an apex of the taper with using a material harder than the metal.

Also, a method for manufacturing a near field optical head according to the present invention is characterized by including: a process of forming in a surface opposed to a recording medium a taper of a dielectric sharpened at a tip toward the recording medium; a process of laying a metal film on a periphery of the taper; a process of working a metal film at a tip of the taper to thereby form a very small aperture; a process of working an opposite surface forming the very small aperture to thereby form a convex form or a process of performing ion exchange on an opposite surface forming the very small aperture to thereby form a convex form or a process of applying and UV-set a liquid to an opposite surface forming the very small aperture or a process of performing ion exchange on an opposite surface forming the very small aperture to thereby form a refractivity gradient different in refractivity; and a process of bonding onto the convex-worked surface or surface forming a refractive gradient a light introducing part for propagating light generally in a direction parallel with a recording medium and a light reflection layer for reflecting light propagated through the light introducing part toward the very small aperture.

Otherwise, characterized to be included are: a process of forming in a surface opposed to a recording medium a taper of a dielectric sharpened at a tip toward the recording medium; a process of laying a metal film on a periphery of the taper; a process of working a metal film at a tip of the taper to thereby form a very small aperture; a process of bonding a spherical lens on an opposite surface forming the very small aperture; and a process of bonding onto a surface of the spherical lens a light introducing part for propagating light generally in a direction parallel with a recording medium and a light reflection layer for reflecting light propagated through the light introducing part toward the very small aperture.

Also, a method for manufacturing a near field optical head according to the present invention is characterized by including: a process of forming in a surface opposed to a recording medium a taper of air sharpened at a tip toward the recording medium and a first very small aperture at an apex thereof; a process of laying a metal film on a periphery of the taper to form a second very small aperture; a process of bonding a dielectric having a surface vertical to a direction of light propagation having a part formed in a convex form or a dielectric having a refractivity gradient different in refractivity or a spherical lens onto an opposite surface forming the second very small aperture; and a process of bonding onto a surface of the dielectric a light introducing part for propagating light generally in a direction parallel with a recording medium and a light reflection layer for reflecting light propagated through the light introducing part toward the very small aperture.

Also, characterized to be included are: a process of forming in a surface opposed to a recording medium a taper of air sharpened at a tip toward the recording medium and a first very small aperture at an apex thereof; a process of laying a metal film on a periphery of the taper to form a second very small aperture; a process of applying and UV-set a liquid over an opposite surface forming the second very small aperture to thereby form a convex form; and a process of bonding onto a surface formed in the convex form a light introducing part for propagating light generally in a direction parallel with a recording medium and a light reflection layer for reflecting light propagated through the light introducing part toward the very small aperture.

Also, in manufacturing a near field optical head having a very small aperture formed at an apex of a taper formed by a light propagation member sharpened at a tip toward a recording medium, a light introducing part for propagating light generally in a parallel direction with the recording medium, a light reflection layer for reflecting light propagated through the light introducing part toward the very small aperture, and an apertured substrate having a very small aperture on a surface opposed to the recording medium, a method for manufacturing a near field optical head according to the present invention is characterized in that: the very small aperture, the light introducing part and the light reflection layer are formed by working a material laid on an opposed surface of the apertured substrate to the recording medium.

Also, characterized to be included are: a process of forming by using chemical reaction a slant surface having a constant angle defined by a planar orientation on a surface opposed to the recording medium; a process of forming a light reflection layer by laying a metal on the slant surface; a process of forming a light introducing part by laying a dielectric on a top surface of the light reflection layer; a process of planarize the dielectric layered; a process of working a part of the dielectric into a taper sharpened toward the recording medium by using chemical, reaction; a process of laying a metal film on a top surface of the taper; and a process of working the metal film at an apex of the taper to thereby form a very small aperture.

Accordingly, the adoption of these manufacturing method can cope with a micro-machining process such as a silicon process thus realizing small-sized and compact structure of a near field optical head. Also, the stable manufacture process allows for manufacturing of a precise focus functioning member and hence forming a near field optical head high in reliability and good in reproducibility. Also, because of processable in batch, a near field optical head can be manufactured at low cost by mass producibility. Also, by the use of such a manufacturing process, near field light can be stably produced from the very small aperture in a manner coping with high speed movement of a recording medium while being put proximity thereto with a distance to the recording medium kept constant at all times, thereby enabling supply of a near field optical head which can read-out or record, with high SN ratio, microscopic bit information at high speed.

Also, in the near field optical head according to the invention, the very small aperture is characterized by provided in plurality of number, and the light introducing part and the light reflection layer being formed to guide light emitted from at least one light source toward a direction of the plurality of very small apertures.

Accordingly, by two-dimensionally scanning the near field optical head and simultaneously processing a plurality of ones of microscopic bit information at a plurality of very small apertures, it is possible to implement processing entirely at high speed without the necessity of increasing the speed of rotation of the recording medium.

BRIEF DESCRIPTION OF THE DRAWINGS

FIG. 1 is a schematic view of an optical storing and reading-out apparatus according to Embodiment 1 of the present invention;

FIG. 2 is a media side schematic view of a near-field optical head according to Embodiment 1 of the invention;

FIG. 3 is a media-side schematic view of the near-field optical head according to Embodiment 1 of the invention;

FIG. 6 is an explanatory view showing a manufacturing process for the near-field optical head shown in FIG. 5;

FIG. 10 is an explanatory view showing a manufacturing process on a silicon substrate constituting for the near-field optical head shown in FIG. 9.

FIG. 11 is a sectional view showing one part of a silicon substrate constituting for a near-field optical head according to Embodiment 4 of the invention;

FIG. 19 is an explanatory view showing a manner of controlling the size or shape of a very small aperture formed in a planar substrate according to Embodiment 5 of the invention;

FIG. 20 is an explanatory view showing a manner of controlling the size or shape of a very small aperture formed in a planar substrate according to Embodiment 6 of the invention;

FIG. 37 is a side sectional view for explaining a manufacturing method for one part of the near-field optical head according to Embodiment 13 of the invention;

FIG. 41 is a side sectional view showing a structure of a near-field optical head according to Embodiment 15 of the invention;

DETAILED DESCRIPTION OF THE PREFERRED EMBODIMENTS

Hereunder, embodiments of near-field optical heads according to the present invention will be explained in detail with reference to the drawings. It should be noted that the invention is never limited to by the embodiments.
(Embodiment 1)

Figure 4:
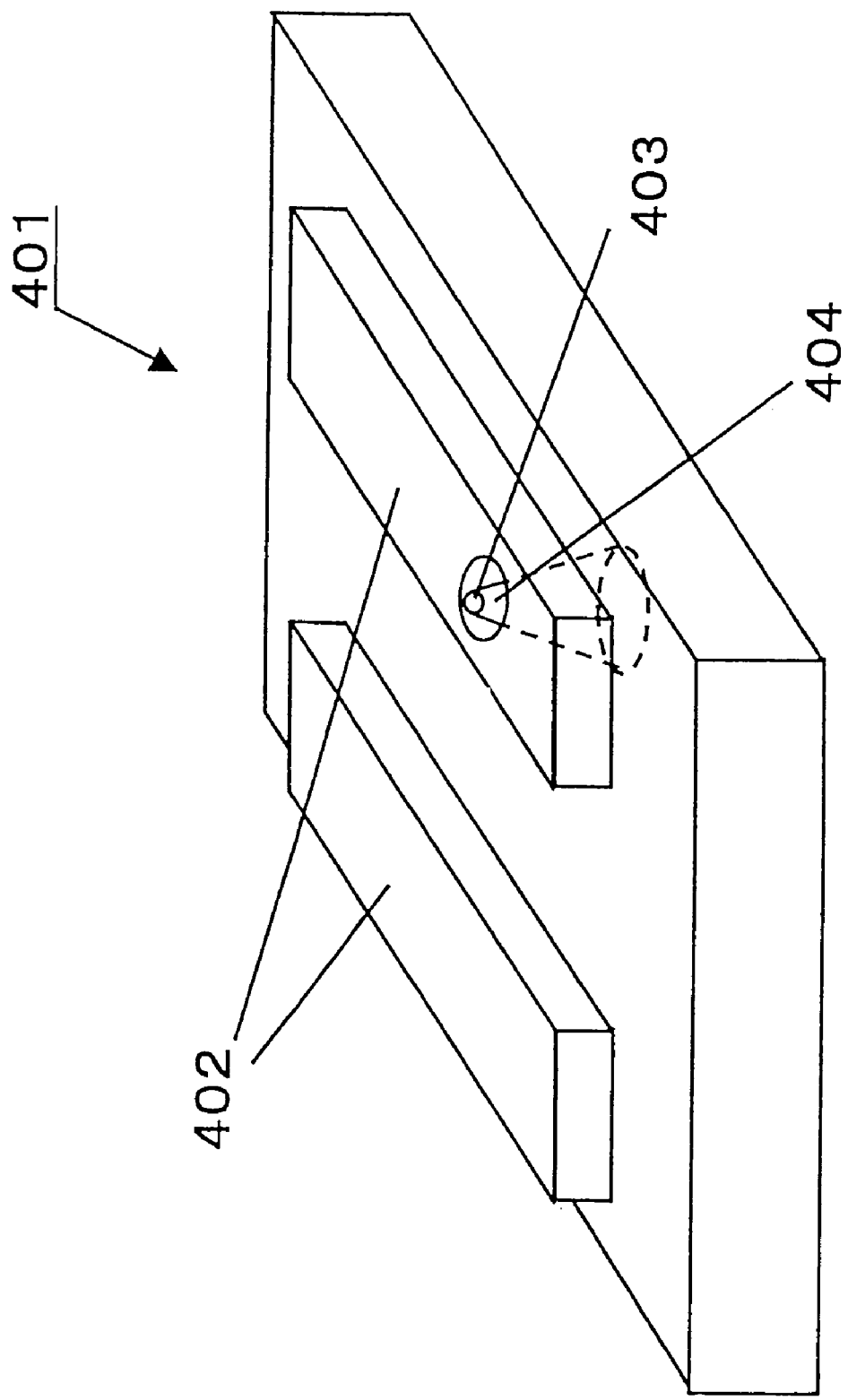
FIG. 4 is a media-side schematic view of the near-field optical head according to Embodiment 1 of the invention.

FIG. 1 illustrates a schematic view of an example of an optical storing and reading-out apparatus according to Embodiment 1 of the invention. A near-field optical head 102 is arranged over a disk 101 (media) rotating at high speed to keep a constant distance to the disk 101 due to a floating force undergone by fluid motion caused by the rotation and a load weight of an arm 103. The way of keeping the distance to the disk 101 may adopt a method to control the interaction, such as tunnel current or interatomic force, caused between the near-field optical head 102 and the media surface. The near-field optical head 102 is supported at a tip of the arm 103. By moving the arm 103 in a horizontal direction by a rotary shaft 104 having a motor, the near-field optical head 102 can be scanned to an arbitrary point on the disk 101. The light propagated through an optical waveguide (or may be an optical fiber) 105 connected to the arm 103 is introduced into an optical waveguide (light introducing part) provided inside the near-field optical head 102 for propagating light in a direction parallel to the media surface, without impeding a function of flexure (an optical fiber may be inserted directly in the head). The light passes through a reflection layer or focusing function formed in the near-field optical head 102 and converted by a very small aperture formed in a disk-side surface of the near-field optical head 102 into near-field light, thus illuminated to the disk 101. The scattering light caused by interaction of between the near-field light and a microscopic area on the disk 101 surface is converted into an electric signal by a light receiving element provided within the near-field optical head 102 or in the vicinity of the near-field optical head 102 or on a back side of the disk 101 and fed to a signal processing circuit, thus reading-out microscopic area information. The near-field optical head 102 has a surface on a media side which may be formed in a flat plate surface to allow air damping or in a convex-and-concave form arranged and connected with several parallelepiped plated (202, 302, 402) to provide an air stream passage as shown in FIG. 2 to FIG. 4. In the case of a planar surface, the very small aperture for producing near-field light will exist in the planar surface. For a convex-and-concave surface, the very small aperture 203 will exist in a plane on the media side of the joined parallelepiped plates 202 as shown in FIG. 2. Otherwise, as shown in FIG. 3 a conical or pyramidal protrusion 304 may be formed between the parallelepiped plates 302 or on a surface in a lateral recessed area to form a very small aperture 303 at a tip thereof. Also, it is of course possible to hollow out the joined parallelepiped plate 402 and provide therein a conical or pyramidal protrusion 404 having a very small aperture 403 formed at a tip thereof (FIG. 4).

Meanwhile, as a way to make the aperture and the media proximate in distance, a lubricant may be filled between the near-field light and the media. By making constant the thickness of the lubricant due to rotation of the media or so and forming the near-field optical head sufficiently thin, the distance between the near-field optical head and the media can be fully reduced by utilization of a surface tension of the lubricant. This enables to fully follow up deformation of the media and hence provides effective means.

Figure 5:
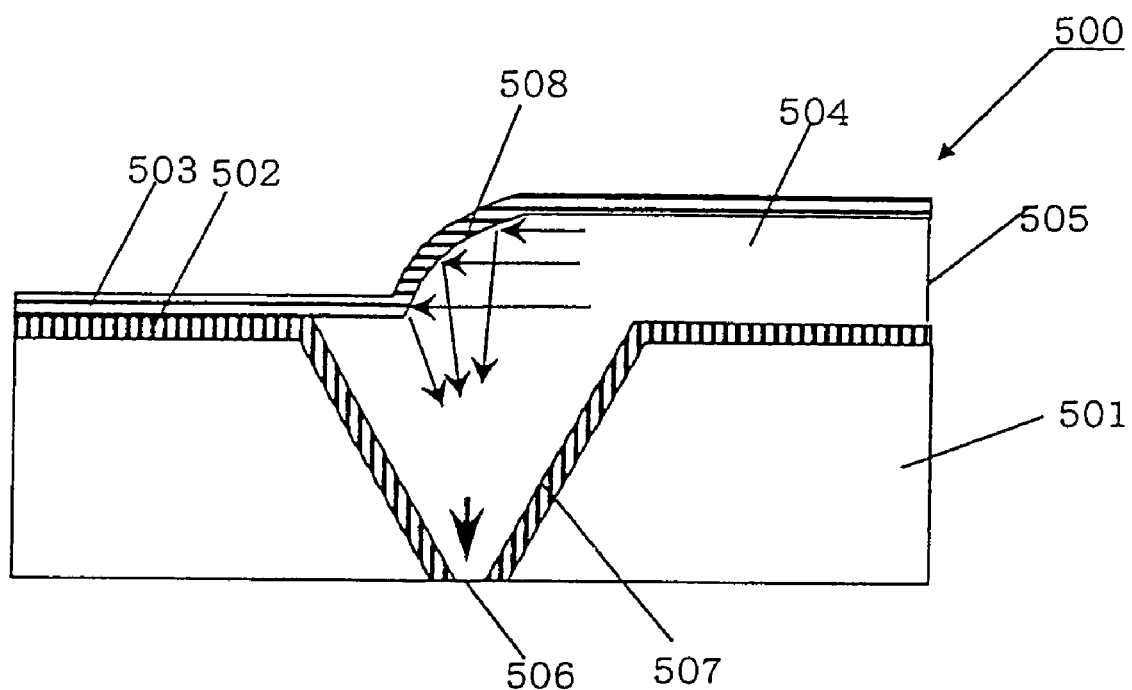
FIG. 5 is a sectional view showing one part of the near-field optical head according to Embodiment 1 of the invention.

Here, explanation is made on the structure of the near-field optical head. FIG. 5 shows a sectional view of part of a near-field optical head 500 according to Embodiment 1. In FIG. 5, on a silicon substrate 501 having an aperture 506, an optical waveguide 504 is provided through a light reflection film 502 and further a light reflection film 503 is provided thereon.

The silicon substrate 501 is forming a taper 507 in a manner penetrating through the same to have the very small aperture 506. The aperture 506 has a microscopic diameter of less than 200 nano-meters so as to produce near-field light due to the light induced through the taper 507. The taper 507 is formed by forming the silicon substrate 501 with using an anisotropic silicon etching technology. On the taper 507 the light reflection film 502 is formed to reflect the traveling light from the above and collect an increased amount of light to the aperture 506.

The optical waveguide layer 504 is formed on the inner side of the taper 507 and on the silicon 501. Also, on the optical waveguide layer 504 the light reflection film 503 is formed in order to improve the reflection efficiency of the mirror or the propagation efficiency through the optical waveguide 504. The light outputted from a laser source or through the optical fiber, although not shown, is incident at a light incident end 505 into the optical waveguide 504 and guided onto the aperture 506 by the optical waveguide 504. Above the aperture 506 a mirror 508 is provided to change the direction of light. The light propagated via the optical waveguide 504 is reflected by the mirror 508 and directed in traveling direction toward the aperture. The mirror 508 is in a convex surface form to collect the reflection light to a vicinity of the aperture 506.

Meanwhile, the mirror 508 may be formed with grating. Grooves are formed at nearly a pitch of a wavelength λ on the mirror 508. The light reflected there is focused to the vicinity of the aperture 506 by virtue of the effect of grating. The light reflected by the mirror 508 and propagating toward the aperture 506 is reflected by the light reflection film 502 formed inside the taper 507, further being collected toward the aperture 506. The focusing as above provides collection of light with locally high energy thus increasing the intensity of near-field light to be caused at the aperture 506.

FIG. 6(A) and FIG. 6(B) are an explanatory view showing one manufacturing process for a near field light head 500 shown in FIG. 5. FIG. 6(A) illustrates a shape as viewed from side while FIG. 6(B) a shape as viewed from top. First, in step S101 a taper 507 is formed in a silicon substrate 501 by an etching method having anisotropy for silicon. For example, on a top surface of a silicon substrate having a crystal orientation (100), a thermal oxide film or nitride film is formed as a mask against anisotropic etching. An opening window is formed in the mask by using a photolithography technique usable in a usual semiconductor process to expose a silicon surface by etching.

Subsequently, the surface forming the opening window is exposed to an etch solution to form a four-surfaced taper of an inverted pyramid structure in the silicon substrate 501. Then, the mask material formed on the silicon substrate 501 is removed thereby obtaining a silicon substrate 501 forming the taper 507. The etch solution uses, for example, a potassium hydroxide (KOH) solution or tetramethylammonium hydroxide (TMAH) solution that is different in etch rate depending upon a planar orientation thereby easily enabling to form a taper. Also, alternative to immersion in an etch solution the taper can be formed by using anisotropic etching, e.g. etching by an reactive ion etching (RIE) apparatus.

Subsequently, in step S102 the silicon substrate 501 is etched from the backside to reduce the thickness of the substrate thereby forming a very small aperture 506 in the silicon substrate 501. Note that this etching is ended at the formation of an aperture 506. As a result, an aperture 506 is formed in a bottom of the taper 507. The aperture 506 is formed in a size of approximately 50 nm to 3 μm. The etching may use wet etching or dry etching.

Meanwhile, the aperture 506 may be formed in the process of step S101 without performing the process of step S102. That is, the aperture 506 can be formed by etching from the surface and through the silicon substrate 1.

Subsequently, in step S103 a material high in optical reflectivity, such as aluminum (Al) or gold (Au), is laid inside the taper and on the top surface of the silicon substrate to form a light reflection film 502. The formation of the light reflection film 502 makes it possible to reflect the propagation light in the vicinity of the aperture and focus it to the aperture 506. This result in intensification of the light collected to the aperture 506, thus producing intensified near-field light.

Subsequently, in step S104 an optical waveguide 504 is laid over the light reflection film 502. The material for the optical waveguide 504 uses a dielectric material such as silicon oxide or silicon nitride, or a polymer material, such as polyimide or polymethacrylate. In the case of silicon oxide, formation is easy by a sputter technique, a CVD technique or an evaporation technique. The optical waveguide 504 may be formed by core and clad that are different in reflectivity. In this case, propagation loss can be reduced because light propagates through the core while being totally reflected.

Meanwhile, in step S104 an optical waveguide 504 previously fabricated may be bonded to and formed on the light reflection film 502. In this case, the optical waveguide may be arranged only on the top surface of the silicon substrate 501 without forming the optical waveguide inside the taper. The bonding method for the optical waveguide can use an anodic bonding technique, a metal bonding technique, and the like. Where using an anodic bonding technique, the light reflection film 502 on the silicon substrate 501 is partly removed, and then silicon oxide as an optical waveguide 504 is bonded to the silicon substrate surface. Where using a metal bonding technique, a material similar to the light reflection film 502 is formed on a bonding surface of the optical waveguide 504 thereby bonded to the light reflection film 502.

Subsequently, in step S105 an optical waveguide 504 is controlled in shape using photolithography technique and etching. Using a photolithography technique for use in usual semiconductor manufacturing processes, a mask material is laid and patterned on the optical waveguide 504 to protect against etching. Thereafter, the optical waveguide 504 is etched to remove the mask material, thereby patterning the optical waveguide 504. A mirror 508 is simultaneously formed upon patterning the optical waveguide 504.

The mirror 508 is formed to an angle so that the light traveling in a horizontal direction can be reflected toward the aperture 506. Furthermore, a convex surface is provided to focus the reflected light to a vicinity of the aperture 506. In order to form the mirror 508 in such a form, the etching for the optical waveguide 504 uses dry etching possesses anisotropy as represented by reactive ion etching.

Also, the mirror 508 may be fabricated in a grating form. In this case, grooves are made at a pitch of approximately a wavelength λ on the mirror 508. The fabrication of grating can use a micro-fabrication technique, such as electron beam forming, dry etch method or focused ion beam etching.

Finally, in step S106 a light reflection film 503 is formed on the optical waveguide 504. The light reflection film 503 is formed by a sputter technique or vacuum evaporation technique with using a high reflective metal material of Al or Au. Due to the light reflection film 503, the mirror 508 reflects light and enables to collect an increased amount of light to the vicinity of the aperture 506. This results in intensification of the light reaching the aperture 506 and hence makes possible to produce intensified near-field light. Furthermore, the provision of the light reflection film 503 removes optical noises from the above or side.

As described above, the near-field optical head of Embodiment 1 of the invention has a structure, in addition to the function of reflecting light serving for focusing light, wherein an increased amount of light can be illuminated to the vicinity of the aperture. Accordingly, intensive near-field light can be easily produced.

Also, because the very small aperture can be formed by a technology used in a semiconductor manufacturing process, a silicon substrate having such an aperture facilitates particularly arraying having a plurality of apertures formed on a same silicon substrate as a planar probe for producing near-field light. Also because fabrication is through a silicon process, batch processing is made possible thus suited for mass production. Also, fabrication can be a collective process on a wafer, there is less variation in the planar probes formed or the apertures formed, thus stabilizing product property. Also, the probes can be reduced in size and the number of them per wafer be increased thus reducing cost.

Figure 7:
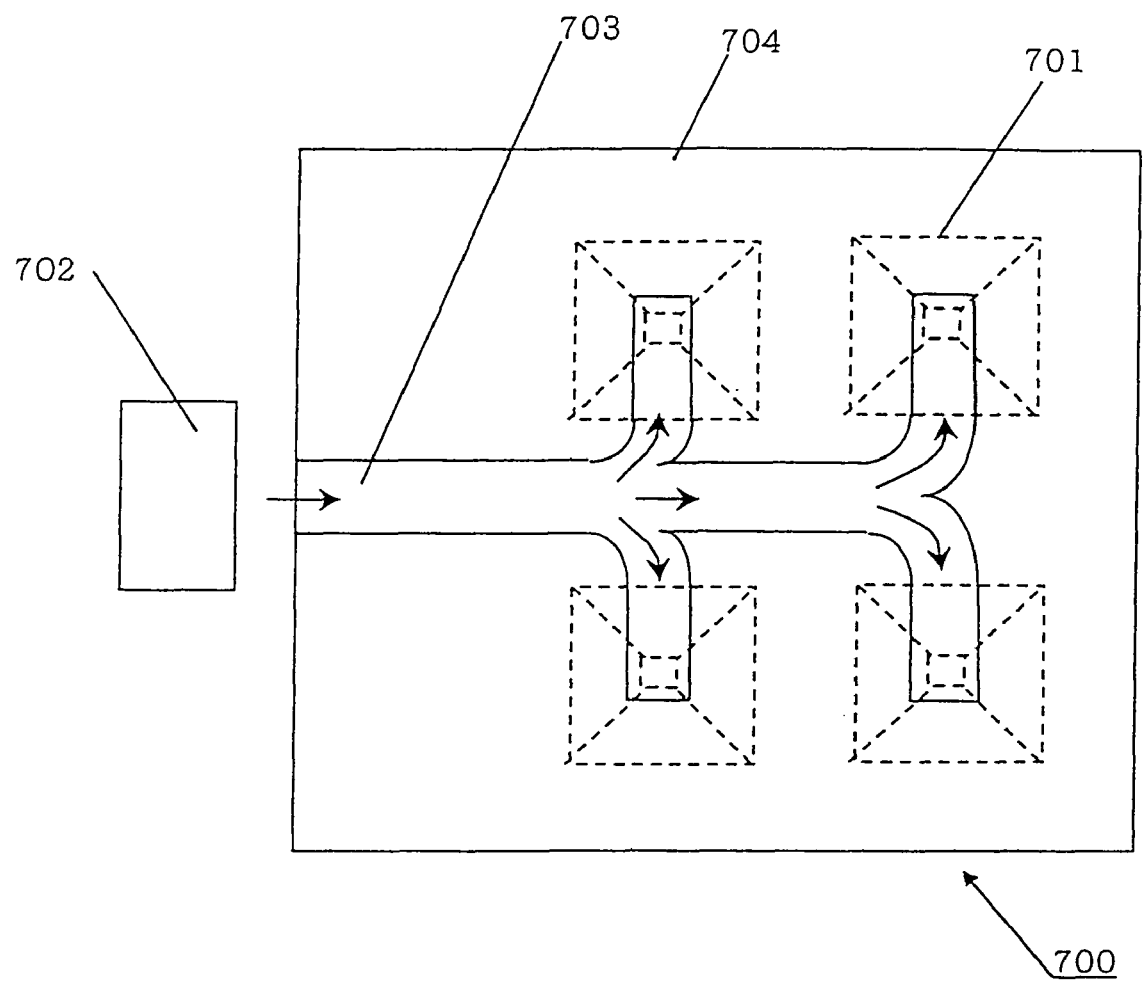
FIG. 7 is an explanatory view showing an array of the near-field optical heads according to Embodiment 1 of the invention.

Also, the near-field optical head according to Embodiment 1 is formed by the usual semiconductor process. Accordingly, a plurality of them can be easily arranged two-dimensionally on a common silicon substrate as described above. FIG. 7 shows a structure of a near-field optical head array 700 having near-field optical heads arranged in the form of a two-dimensional array on a common silicon substrate. An optical waveguide 703 is formed such that the light illuminated from one light source 702 is guided to aperture top planes of four near-field optical heads 701. The light illuminated by the light source 702 is illuminated to an incident end of the optical waveguide 703 existing in an end face of a silicon substrate 704 and then introduced into the optical waveguide 703. The introduced light passes through an inside of the optical waveguide 703 and efficiently guided to vicinities of apertures of the respective near-field optical heads 701 while being reflected by the light reflection films provided in tapers similarly to FIG. 5. Due to the guided light, near-field light is produced from each aperture. In the near-field optical head array 700 shown in FIG. 7 the four near-field optical heads 701 on one silicon substrate 704 are arranged for the one light source. However, a variety of combinations are feasible without limitation to this structure.

As described above, for the near-field optical head according to Embodiment 1, a two-dimensional arrangement in plurality is structurally possible on a common silicon substrate. Accordingly, head scanning is reduced to a minimum over a recording medium and optical recording and reading is possible at high speed. Furthermore, trackinglessness is realizable by adapting the interval of arrangement to an interval of information recording unit on the recording medium.

(Embodiment 2)

Figure 8:
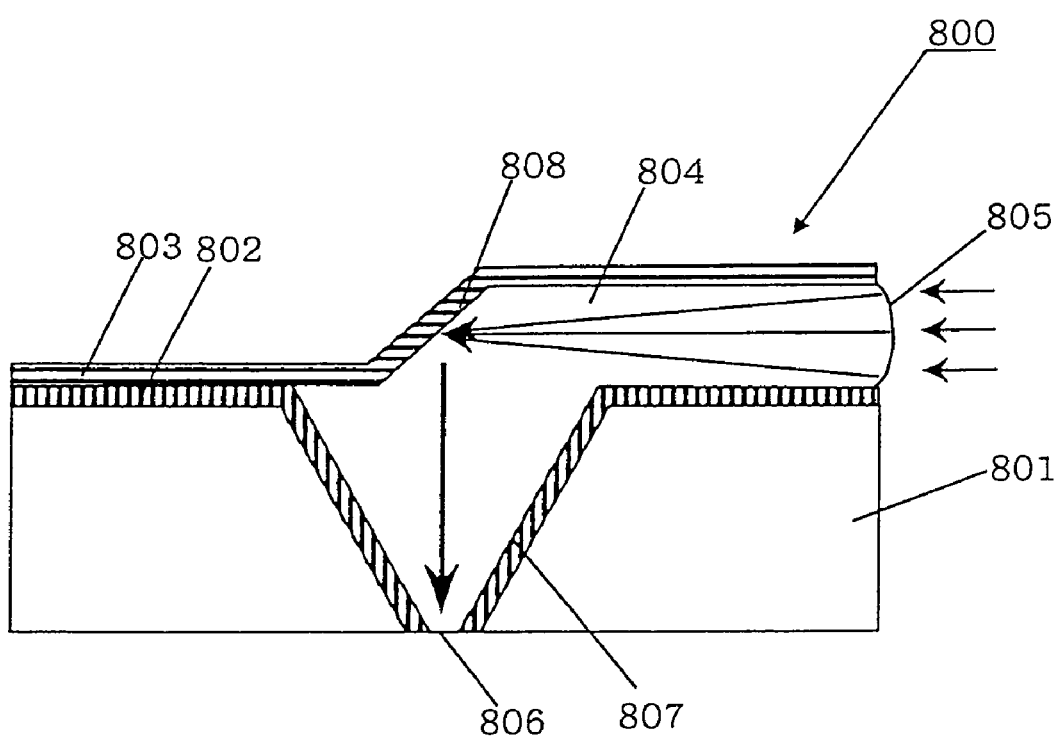
FIG. 8 is a sectional view showing one part of a near-field optical head according to Embodiment 2 of the invention.

FIG. 8 shows a sectional view of a part of a near-field optical head 800 according to Embodiment 2. In FIG. 8, an optical waveguide 804 is provided through a light reflection film 802 on a silicon substrate 801 having an aperture 806 and further a light reflection film 803 is provided thereon, similarly to the near-field optical head 500 according to Embodiment 1. The aperture 806 has a microscopic diameter of less than 200 nano-meters in order to produce near-field light due to light introduced through a taper 807.

The near-field optical head 800 according to Embodiment 2 is in a structure possessing a focusing function in the optical waveguide layer 804 to cause light to be incident on a light incident end 805 for light incidence. If as shown in FIG. 8 the light incident end 805 is made in shape in a convex surface form, the light emitted from a laser light source or optical fiber not shown in the figure is incident at the light incident end 805 into the optical waveguide layer 804 and focused by a lens effect of the light incident end 805. The focused light is reflected upon the mirror 808 toward a direction of the aperture 806 and illuminated to the vicinity of the aperture 806. The taper 807 in the vicinity of the aperture 806 is formed with a light reflection film 802 in order to reflect the light transmitted through an upper portion of the optical waveguide 804 and focus an increased amount of light to the aperture 806. The focusing in this manner collects locally high energy of light and increases the intensity of near-field light to be caused at the aperture 806.

Meanwhile, the light incident end 805 can be made in a grating form. In such a case, grooves are formed at a pitch of approximately a wavelength λ on the light incident end 805. Here, the light incident on the optical waveguide 804 is focused due to an effect of the grating and illuminated to a vicinity of the aperture 806 by reflection upon the mirror 808.

The near-field optical head 800 of Embodiment 2 can be manufactured by a manufacturing process similar to the near-field optical head of Embodiment 1. The convex surface form in the light incident end 805 is fabricated by anisotropic etching in a process of step S105 shown in FIG. 6. For example, the form for a convex surface is formed using reactive ion etching. Meanwhile, although a focusing function is provided for the light incident end 805, it is needless to say that it may be formed in the optical waveguide 804. Also, although in FIG. 8 the near-field optical head shows an illumination mode as called in the near-field optical microscope, it can also be utilized in a collection mode.

As described above, the near-field optical head of Embodiment 2 possesses a function of focusing light to a part of the optical waveguide, making possible to illuminate an increased amount of light to a vicinity of the aperture and hence easily produce intensive near-field light in the vicinity of the aperture.

Also, because the very small aperture can be formed by the technology for use in the semiconductor manufacture process, the silicon substrate having such an aperture can be utilized as a planar probe to produce near-field light. In particular, arraying is facilitated wherein a plurality of apertures are formed on a common silicon substrate. Because of fabrication through the silicon process, a batch process is feasible thus being adapted for mass production. Also, a collective process on a wafer reduces variation and stabilizes product characteristics. Because the probe can be reduced in size and the number thereof per wafer increases, cost can be lowered.

(Embodiment 3)

Figure 9:
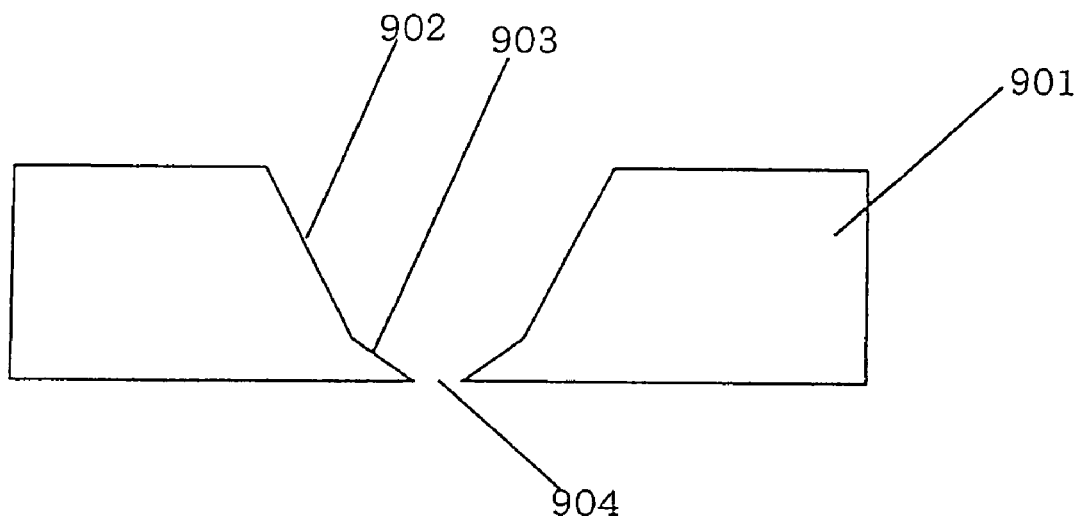
FIG. 9 is a sectional view showing one part of a silicon substrate constituting for a near-field optical head according to Embodiment 3 of the invention.

FIG. 9 shows a sectional view of part of a silicon substrate constituting for a near-field optical head according to Embodiment 3. In FIG. 9, a silicon substrate is illustrated wherein a taper is formed by two different slant surfaces.

The near-field optical head of Embodiment 3 is improved in optical efficiency in the vicinity of an aperture by making moderate the slant surface in the vicinity of the aperture, i.e. widening the taper angle in the vicinity of the aperture. For propagation light in general, propagation loss is greater in a region where the optical waveguide for light propagation is smaller in width than a wavelength λ. Accordingly, by widening the angle of the taper in the vicinity of the aperture, the region that the width is smaller than the wavelength λ is decreased thus making possible to increase the amount of light reaching the aperture. This results in increase in intensity of near-field light to be caused through the aperture.

The taper 507 in the silicon substrate 501 shown in FIG. 5 was fabricated using anisotropic etching on silicon thereby forming the slant surface on a (111) plane of the single crystal silicon. Due to this, the angle defined between the taper 507 slant surface and the silicon substrate 501 bottom surface is approximately 55 degrees.

Meanwhile, in the taper of the silicon substrate 901 shown in FIG. 9, the slant surface is formed by the two different crystal surfaces. An upper-staged taper 902 has a comparatively abrupt gradient slant surface formed on a plane (111) of the silicon substrate, while a lower-staged taper 903 has a comparatively moderate gradient slant surface formed, for example, on a plane (311) of the silicon substrate. The aperture 904 of the silicon substrate 901 thus structured has an angle of approximately 30 degrees given between the slant surface and the bottom surface of the silicon substrate. Thus, a wider-angled form is provided as compared to the taper in the vicinity of the aperture formed in the silicon substrate 501 shown in FIG. 5.

FIG. 10(A) and FIG. 10(B) are explanatory views showing one example of a manufacture process for the silicon substrate 901 shown in FIG. 9. FIG. 10(A) illustrates a shape as viewed from the side while FIG. 10(B) a shape as viewed from the above.

First, in step S201 a mask material 905 is laid on a silicon substrate 901 by using a photolithography technique for use in semiconductor manufacture, followed by being patterned. Note that the patterning should be in a step-like form with two or more steps in shape. The mask material 905 uses silicon oxide, silicon nitride, photoresist or the like.

Subsequently, in step S202 an anisotropic etch technique of silicon is used to form a taper in the silicon substrate. In this etch technique, if etching is conducted for example with a potassium hydroxide (KOH) solution, a taper is easily formed because of a difference in etch rate depending on a planar orientation of silicon.

Subsequently, in step S203 the mask material 905 is etched to form the two-staged mask material 905 into one-staged mask 906. Note that this forming is possible by isotropically etching the mask material 905. As a result, a top surface of the silicon substrate having a (100) planar orientation so far covered by the mask material 905 newly appear in a mask opening window.

Subsequently, in step S204 anisotropic etching of silicon is conducted to form a taper with two stages in the silicon substrate 901. Where the etching is made by a KOH solution with different etch rate depending on a planar orientation, the slant surface for the upper taper 902 is formed on a plane (111) of the single crystal silicon whereas the slant surface for the lower taper 903 is formed on a plane (311) of the single crystal silicon. Thus, the lower-staged taper 903 is in a slant surface that is moderate as compared to the upper-staged taper 902.

Subsequently, in step S205 the mask material 906 is removed away. Then, in step S206 the silicon substrate 901 is etched at a backside to reduce the thickness of the substrate thereby forming a very small aperture 904 in the silicon substrate. Note that this etching should be terminated at formation of an aperture 904. As a result, an aperture 904 is formed in a bottom surface of the silicon substrate 901. The aperture 904 is formed to a size of approximately from 50 nm to 3 μm. The etching may use either wet etching or dry etching.

Using the silicon substrate 901 fabricated through the above steps, the steps of S103 to S106 are carried out in order as was shown in FIG. 6 in Embodiment 1. Thus, a near-field optical head is obtained which is provided with an optical waveguide 504, a light reflection film 502, a light reflection film 503 and a mirror 508 in a concave surface form. Meanwhile, a light incident end 805 in a convex surface form can be also provided similarly to that as was shown in Embodiment 2.

Incidentally, in the explanation of the near-field optical head according to Embodiment 3, FIG. 9 and FIG. 10 exemplified the taper forming the upper and lower two staged slant surfaces different in angle. Alternatively, a silicon substrate formed by a plurality of slant surfaces, i.e. three or four stages, may be used without limited to the two-staged slant surfaces.

As described above, the near-field optical head of Embodiment 3 of the invention can be batch-processed and suited for mass production because of the fabrication through the silicon process as described above. Also, the capability of implementing the collective process on a wafer reduces variation and stabilizes product characteristics. Also, size reduction is possible for the probe and the number thereof per wafer increases thereby reducing cost.

Meanwhile, the structure with a very small aperture can be provided similarly to Embodiment 1 and utilized as a planar probe for producing near-field light. Particularly, the structure having a plurality of apertures on a common silicon substrate, i.e. arraying, is easy to implement. Where used as an optical memory head, high-speed light recording and reading-out is feasible.

Also, in the near-field optical head according to Embodiment 3, because the silicon substrate 901 was used which is widened in taper form in the vicinity of the aperture 904 as shown in FIG. 9, the region having a wavelength of λ or smaller is reduced in the optical waveguide at a position in the vicinity of the aperture. Thus, the light propagation loss can be reduced in this region. As a result, the light focused to the vicinity of the aperture can be efficiently converted into near-field light.

(Embodiment 4)

FIG. 11 shows a sectional view of part of a silicon substrate constituting for a near-field optical head according to Embodiment 4. This near-field optical head of Embodiment 4 is widened in taper angle in the vicinity of the aperture thereby reducing propagation loss in the region where the optical waveguide for propagating light is smaller in width than the wavelength λ. Thus, the efficiency of light conversion is improved for producing near-field light in the vicinity of the aperture.

In a silicon substrate 1101 shown in FIG. 11, a hole is formed penetrating through the silicon substrate thus forming a very small aperture 1103 in a bottom surface. A taper 1102 formed in the hole has its slant surface given moderate in angle in the vicinity of the aperture 1103. The hole has, at an upper portion, a taper 1102 formed at a slant angle of approximately 55 degrees relative to the bottom surface of the silicon substrate 1101 and, in the vicinity of the aperture, a taper 1103 formed at a slant angle of approximately from 10 degrees to 30 degrees.

Figure 12:
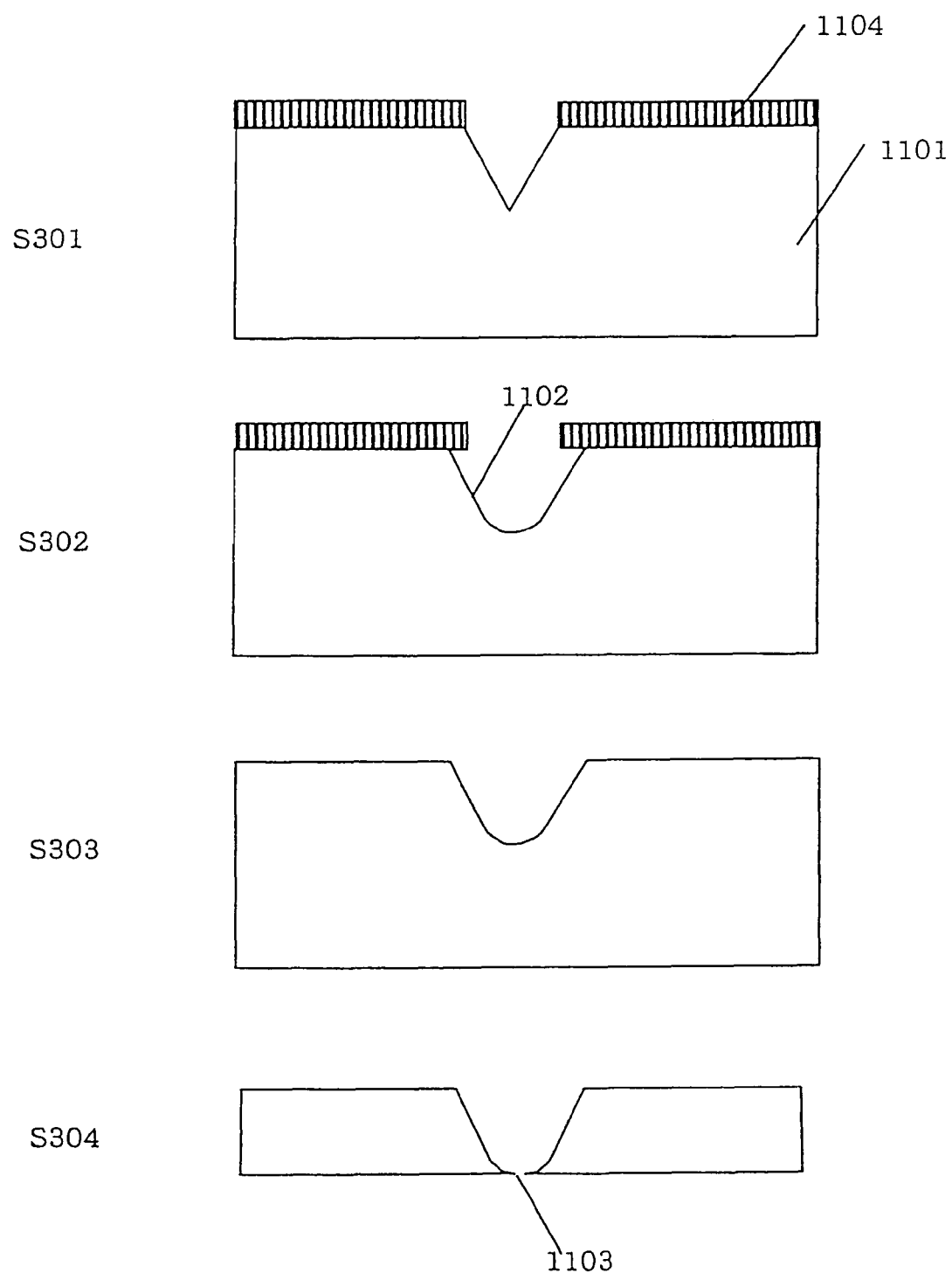
FIG. 12 is an explanatory view showing one example of a manufacturing process on a silicon substrate constituting for the near-field optical head shown in FIG. 11.

FIG. 12 is an explanatory view showing one example of a manufacturing process for the silicon substrate 1101 shown in FIG. 11. First, in step S301 a mask material 1104 is patterned over a silicon substrate 1101 by using a photolithography technique for use in semiconductor manufacture, and then a taper is formed in the silicon substrate 1101 by using an anisotropic etch technique of silicon. For example, if etching is conducted by a potassium hydroxide (KOH) solution, the etch rate is different depending on a planar orientation of silicon and hence a taper can be formed with a slant angle of approximately 55 degrees.

Subsequently, in step S302 isotropic etching of silicon is conducted. For example, the etching by $XeF_2$ isotropically etches the silicon. The isotropic etching turns a bottom of the taper 1102 from a sharp form into a round form. As a result, the slant surface of the taper 1102 in the vicinity of the bottom will be from 10 degrees to 30 degrees relative to the bottom surface of the silicon substrate 1101.

Subsequently, in step S303 the mask material 1104 is removed away. Subsequently, in step S304 the silicon substrate 1101 is etched at its backside to reduce the thickness of the substrate thereby forming a very small aperture 1103 in the silicon substrate. Note that this etching is terminated at the formation of an aperture 1103. As a result, an aperture 1103 is formed in the bottom surface of the silicon substrate 1101. The aperture 1103 is formed to a size of from 50 nm to 3 μm. Meanwhile, FIG. 13 is an explanatory view showing another example of a manufacturing process for the silicon substrate 1101 shown in FIG. 11.

Figure 13:
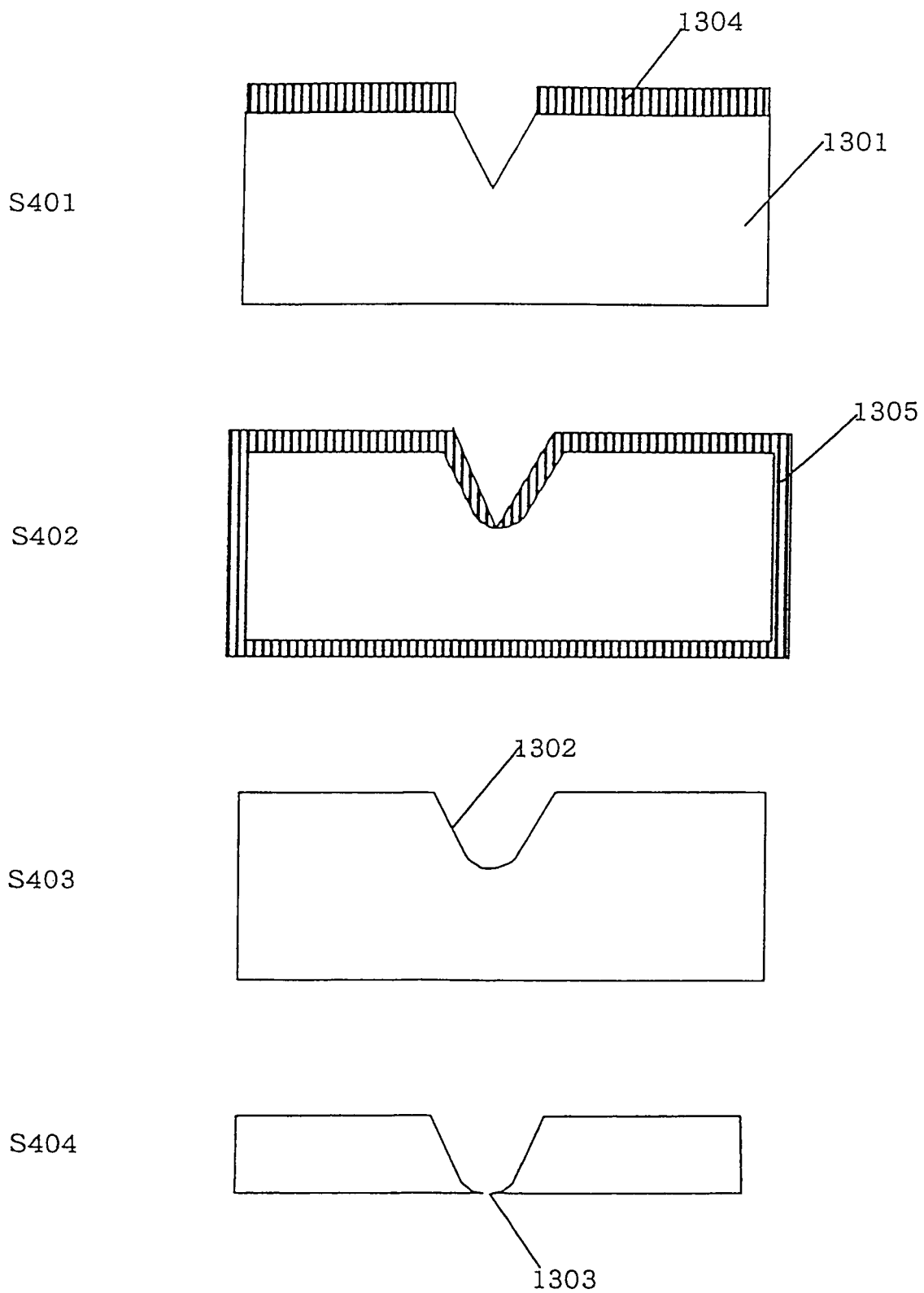
FIG. 13 is an explanatory view showing one example of a manufacturing process on a silicon substrate constituting for the near-field optical head shown in FIG. 11.

In FIG. 13, first in step S401 a mask material 1304 is patterned over a silicon substrate 1301 by using a photolithography technique for use in semiconductor manufacture similarly to the step S301 of FIG. 12, and then a taper is formed in the silicon substrate by using an anisotropic etching technique for silicon. The mask material 1304 in this case uses a silicon oxide film.

Subsequently, in step S402 a silicon oxide film 1305 is formed over the periphery of the silicon substrate 1301. The silicon oxide film 1305 is made by putting the silicon substrate 1301 in a hot thermal oxidation oven to cause oxidation on the surface of the silicon substrate 1301. The oxidation film tends to be less formed in the bottom of the taper. As a result, the silicon oxidation film 1305 at the taper bottom is smaller in thickness as compared to the thickness of the silicon oxide film 1305 at a taper slant surface.

Subsequently, in step S403 is removed the silicon oxide film 1305 formed on a periphery of the silicon substrate 1301. The thickness of the silicon oxide film 1305 in a taper bottom is smaller than the thickness of the silicon oxide film 1305 on the taper slant surface, consequently, the taper 1302 of the silicon substrate 1301 after removal of the silicon oxide film 1305 has a shape becoming moderate in slant surface angle and round as the bottom is approached. As a result, the slant surface at the bottom of the taper 1302 has an angle of from 10 degrees to 30 degrees relative to the bottom surface of the silicon substrate 1301.

Subsequently, in step S404 the silicon substrate 1301 is etched at a backside similarly to the step S304 of FIG. 12 to form a very small aperture 1303 of approximately from 50 nm to 3 μm in the silicon substrate 1301. In the manufacturing process for the near-field optical head according to Embodiment 4, the steps S103 to S106 of Embodiment 1 are carried out in order by using a silicon substrate 1301 fabricated through the processes as above or a silicon substrate 1101.

As described above, the near-field optical head of Embodiment 4 of the invention can be batch-processed and suited for mass production because of the fabrication through the silicon process as described above. Also, the structure with a very small aperture can be provided similarly to Embodiment 1 and utilized as a planar probe for producing near-field light. Particularly, the structure having a plurality of apertures on a common silicon substrate, i.e. arraying, is easy to implement. Where used as an optical memory head, high-speed light recording and reading-out is feasible.

Also, in the near-field optical head according to Embodiment 4, because the silicon substrate 1101 was used which is widened in taper form in the vicinity of the aperture 1103 as shown in FIG. 11, the region having a wavelength of $\lambda$ or smaller is reduced in the optical waveguide at a position in the vicinity of the aperture. Thus, the light propagation loss can be reduced in this region. As a result, the light focused to the vicinity of the aperture can be efficiently converted into near-field light.

It should be noted that the near-field optical head according to Embodiment 1-4 can be used as an optical probe for optical microscopes besides as a near-field optical head as an optical memory head.

(Embodiment 5)

Next, explanations will be made on a method of forming with accuracy and reproducibility the aperture thereof into a targeted size or shape in a planar probe as a near-field optical head according to Embodiment 1-4 explained above.

Usually, in a planar probe a light reflection film as explained in Embodiment 1 is formed on the taper in order to guide propagation light efficiently to the very small aperture. The light reflection film is provided to reflect thereon propagation light to be introduced to the aperture of the near-field optical head. The size and form of an aperture has been defined by an edge of a hole formed due to implementing an etch process as was shown in FIG. 6.

Accordingly, the thickness of the light reflection film has been selected in such a degree that has no effect upon the hole edge in the silicon substrate. However, as discussed in the "Problem that the Invention is to Solve", where a very small aperture is formed by an etch process, variations in the size and shape will frequently occur. Even if accurate control can be implemented in forming a light reflection film to a small thickness, it has been impossible to obtain intensive near-field light intended as a planar probe.

The manufacturing method for a near-field optical head according to Embodiment 5 is to form an aperture having a size greater than a target size or different in shape from a targeted shape by an etch process or the like on a silicon substrate and form an increased thickness of a light reflection film on a taper thereby defining a final size or shape of the very small aperture.

Figure 14:
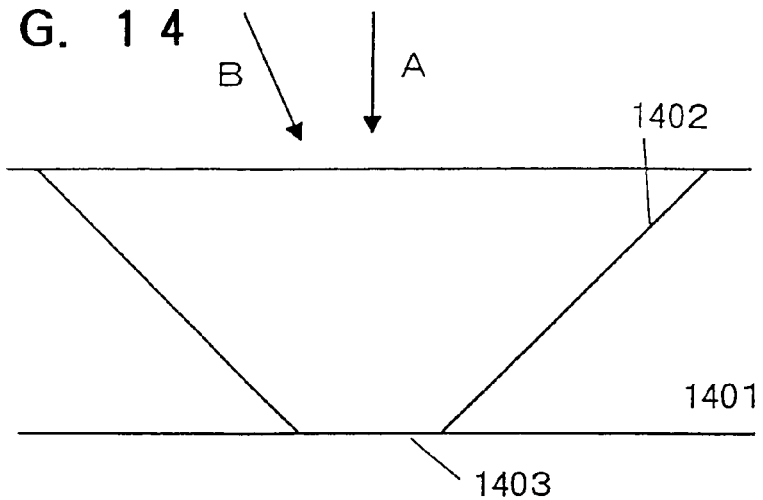
FIG. 14 is a sectional view of an aperture formed in a silicon substrate in a manufacturing method for a near-field optical head according to Embodiment 5 of the invention.

FIG. 14 is a sectional view of an aperture formed in a silicon substrate by a method of anisotropic etching, isotropic etching or the like. In FIG. 14, a very small aperture 1403 is provided by forming a taper 1402 in a silicon substrate 1401. However, this very small aperture 1403 is greater than a targeted size or in a shape different in shape from a targeted shape.

A light reflection film is formed on a surface of the silicon substrate 1401. The formation of such a light reflection film is usually implemented by using a sputter technique, a CVD method, an evaporation technique or the like, and achieved by gradually depositing (hereunder, referred to as film-forming) a particle matter of a material, such as aluminum (Al) or gold (Au), having a high reflectivity for a wavelength $\lambda$ of propagation light used for producing near-field light on an object (in this case, particularly on the taper 1402).

In FIG. 14, the arrow A and the arrow B represents a direction of film forming, i.e. an arriving direction of the particles mentioned above. Usually, film formation is in a vertical direction with respect to a silicon substrate 1401 as shown at the arrow A. It is however possible to form a film by shifting the film-forming angle, for example, as shown at the arrow B.

Figure 15:
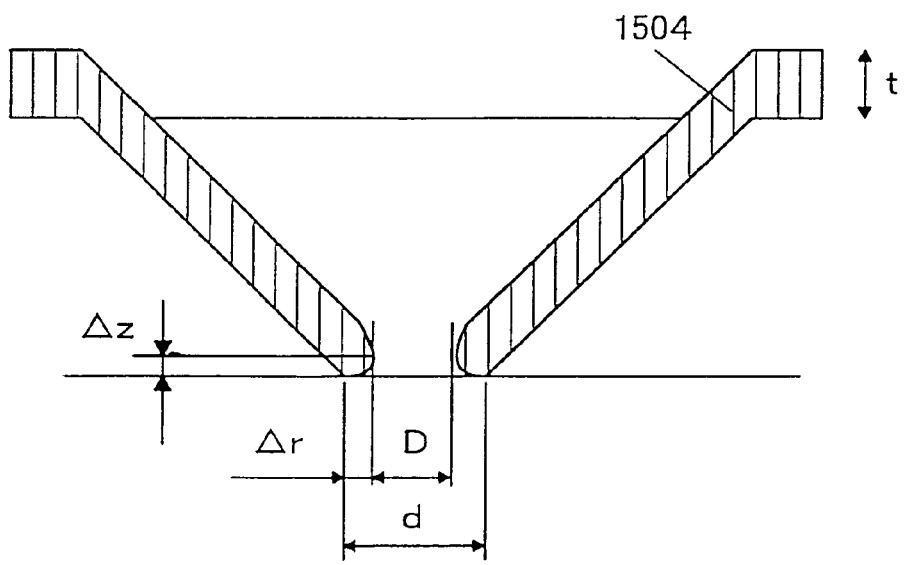
FIG. 15 is a sectional view of an aperture having a film formed on a taper in Embodiment 5 of the invention.

FIG. 15 is a sectional view of an aperture formed in the silicon substrate after film formation. In FIG. 15, a metal film 1504 is film-formed as a light reflection film in a film thickness of t. Here, the film thickness represents a thickness of the metal film 1504 from a top surface of the silicon substrate 1401 in a vertical direction to the top surface of the silicon substrate 1401 (the surface except for the taper 1402). By film-forming a metal film 1504 to a sufficient thickness on the taper 1402, in a periphery of the very small aperture 1403 the metal film 1504 protrudes by a protrusion amount $\Delta r$ toward a center of the very small aperture 1403 to form a very small aperture having a size D (hereafter, referred to as a very small aperture after correction) smaller than a size d of a former very small aperture (hereafter, referred to as a very small aperture before correction). That is, the intensity of near-field light to be produced is defined by the very small aperture after correction. Accordingly, a relationship $D=d-2\Delta r$ stands. Here, the protrusion amount $\Delta r$ denotes a length of from an edge of the very small aperture before correction to a protrusion of the metal film 1504 in a direction along a bottom surface of the silicon substrate 1401.

Also, as shown in FIG. 15 the size D of the very small aperture after correction is defined not by the metal film 1504 in a direction along a bottom surface of the silicon substrate 1401 but in a position deviated above by $\Delta z$ from the bottom surface of the silicon substrate 1401. That is, this $\Delta z$ represents a deviation in height between the aperture after correction and the aperture before correction. Here, it is satisfactory to meet a condition for producing near-field light if given $D<\lambda$. However, there is a need to satisfy a relationship of $D<\lambda/2$ because of necessity of an aperture size smaller than a diffraction limit.

Figure 16A:
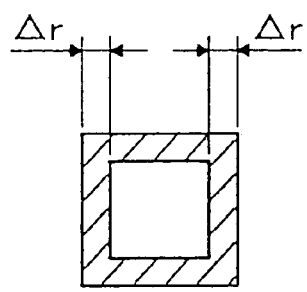
FIG. 16 is a top view of a very small aperture after modification in Embodiment 5.

Because the protrusion amount $\Delta r$ is proportional to a film thickness t, the size D of a very small aperture after correction can be controlled by the thickness t. FIG. 16($a$) is a top view of a very small aperture after correction where the direction of film forming is taken at the arrow A in FIG. 14. As shown in FIG. 16($a$), an aperture formed deviated inward by a protrusion amount $\Delta r$ from the very small aperture before correction 1403 provides a size and shape effective for producing near-field light.

Figure 17:
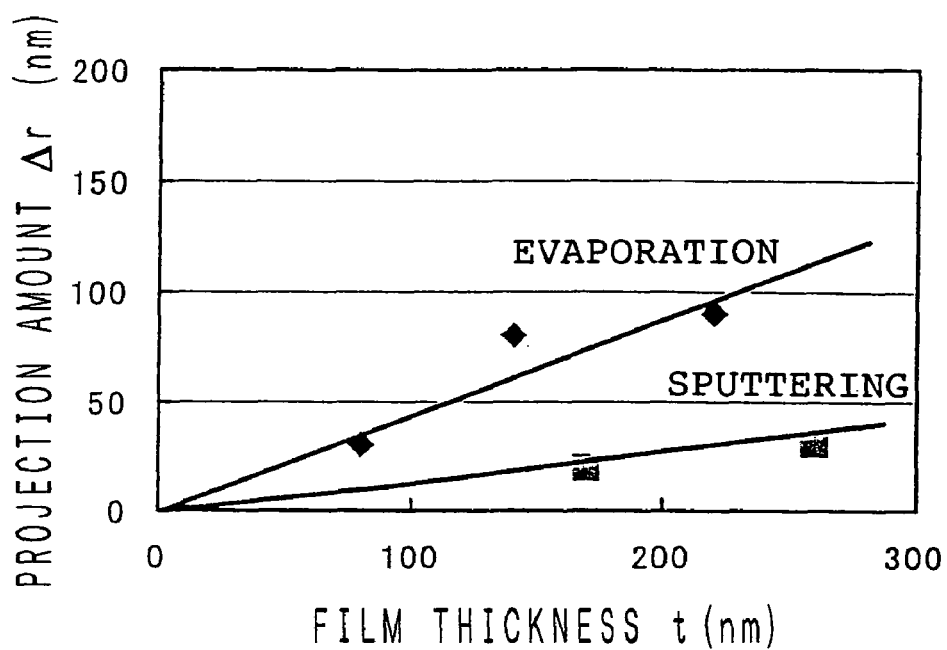
FIG. 17 is a figure showing a relationship between a film thickness t and a protrusion amount $\Delta r$ where a film is formed on the taper in Embodiment 5.

FIG. 17 is a figure showing a relationship of a film thickness t and a protrusion amount $\Delta r$ where Al is film-formed in the film forming direction A onto the taper. Particularly, FIG. 17 shows respective graphs for cases implementing as a film-forming method a vacuum evaporation method and a sputtering method. Incidentally, the film-forming condition in this case is taken a vacuum degree of $3\times10^{-6}$ torr and an evaporation rate of 700 angstroms/min. for the vacuum evaporation method. The grain size in evaporation is comparatively small to provide homogeneous film formation on the taper. Also, the sputter method uses a vacuum degree of $3\times10^{-3}$ torr and an evaporation rate of 200 angstroms/min. The grain size is comparatively small and the film thickness decreases as the bottom of the taper is neared. Consequently, the protrusion amount is smaller than the case with the vacuum evaporation method.

From FIG. 17 the relationship between a film thickness t and a protrusion amount $\Delta r$ is representable as $\Delta r > t/10$. That is, under the above film forming condition the protrusion amount $\Delta r$ will not be one-tenth of a film thickness t or less. In a case that the protrusion amount $\Delta r$ be assumingly in a relation of one-tenth of a film thickness t or less, a very thick film must be formed in order to control the size and shape of an aperture resulting in inefficiency. It is therefore preferred to forming a film nearly under the above film forming condition. Meanwhile, in the vacuum evaporation method the protrusion amount $\Delta r$ can be increased to nearly $\Delta r = t/2$ by decreasing the evaporation late slower than the above film forming condition and increasing the grain size.

Figure 18:
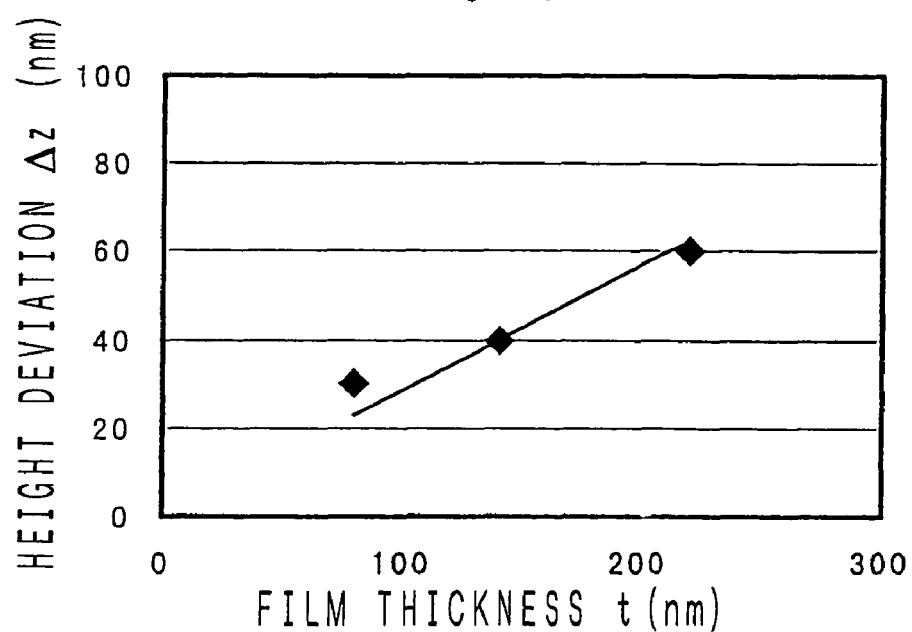
FIG. 18 is a figure showing a relationship between a film thickness t and a height deviation $\Delta z$ from a bottom of a maximum protruding point in Embodiment 5.

FIG. 18 is a figure showing a relationship between a film thickness t and a height deviation $\Delta z$ of a maximum protrusion from a bottom surface. In particular, FIG. 18 illustrates a graph for a case of implementing a vacuum evaporation method as a film forming method, wherein the film forming condition is as per the above. It is possible from FIG. 18 to express as $\Delta z \sim t/3$. That is, as the film thickness t increases, the height deviation $\Delta z$ also increases.

From FIG. 17 and FIG. 18, where the film thickness t is increased to increase the protrusion amount $\Delta r$, the size D of a very small aperture after correction decreases but the height deviation $\Delta z$ also increases with a result that the aperture position effective for producing near-field light will be distant from the bottom surface. This means that the intensity of near-field light decreases with increase in height deviation $\Delta z$, from a nature that near-field light exponentially attenuates as being distant from the aperture. Also at the same time, because near-field light spreads as being distant from the very small aperture, the reduction in resolving power is meant. For example, if the very small aperture and a recording medium is distant to nearly a size of the very small aperture, the resolving power is halved. Provided that this distance is a limit of resolving power, the size D of a very small aperture after correction can be expressed $\Delta z < D = d - 2\Delta r$. Therefore, $\Delta z$ is not preferred to increase but desirably held as small as possible.

Figure 16B:
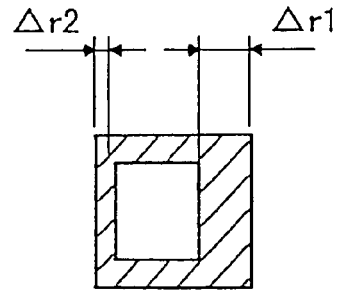

Meanwhile, in the vacuum evaporation method, the very small aperture after correction can be controlled in shape for example by tilting the film forming direction. FIG. 16(b) is a top view of a very small aperture after correction where the film forming direction is taken at the arrow B in FIG. 14. FIG. 16(b) shows a case that the arrow B is in a direction tilted by 20 degrees relative to a direction vertical to the silicon substrate 1401. As shown in FIG. 16(b), the metal film is formed thick on a surface facing the direction of evaporation. The metal film is formed thin on an opposite-side surface. It was confirmed that the increase/decrease amount of the protrusion amount was approximately 20% of the protrusion amount $\Delta r$ for the case of FIG. 16(a).

As an exemplification, in the case of film forming by a vacuum evaporation method, if a film thickness of Al is taken t=150 nano-meters, then $\Delta z = 40$-50 nano-meters and $\Delta r = 70$-80 nano-meters wherein the size (diameter) of a very small aperture before correction is d=250 nano-meters, whereas the size of a very small aperture after correction is D=100 nano-meters. This satisfies the above formula $\Delta z < D$. In the case of film forming by a sputter method, height deviation $\Delta z$ and protrusion amount $\Delta r$ are smaller than those in the vacuum evaporation method, which naturally satisfies $\Delta z < D$.

In the above, explanation was made for the case of forming a film on the taper 52. Alternatively, it is also possible to form a film on a backside of a silicon substrate 1401 and control the size and shape of a very small aperture. FIG. 19 is a sectional view of an aperture formed after forming a film on a silicon substrate backside. Note that, in the figure, the lengths common in meaning to those of FIG. 15 are denoted at the same reference numerals to omit explanations thereof.

In FIG. 19, where implementing a vacuum evaporation method as a film forming method, when the film is formed on the taper 1402 there is almost no difference in the relationship between a film thickness t and a protrusion amount $\Delta r$. However, where implementing a sputter method, the relationship between a film thickness t and a protrusion amount $\Delta r$ is that the protrusion amount $\Delta r$ with respect to the thickness t increases because an obstacle such as the taper 1402 does not exist.

Meanwhile, the relationship between a film thickness t and a height deviation $\Delta z$ is similar to the graph shown in FIG. 18 or in a tendency of further decrease in the height deviation $\Delta z$. However, in this case, the height deviation $\Delta z$ differs from a case of forming a film on the taper 1402 because, as it increases, the aperture effective for producing near-field light is provided closer to a recording medium. Accordingly, in FIG. 19 the size of a very small aperture after correction D can be expressed as $t - \Delta z < D = d - 2\Delta r$. Due to this, the film thickness t cannot be increased.

Also, where film forming is made on both the taper 1402 and the silicon substrate backside, basically the very small aperture effective for producing near-field light is defined by a smallest area. In such a case, near-field light can be efficiently produced by decreasing the distance between a smallest aperture and a bottom surface of a planar probe.

It should be noted that the film thickness t explained above may be greater than a light intrusion length (propagation light infiltration with respect to the metal film) wherein even if less than the intrusion length no especial problem occurs except for mere decrease in reflectivity. The protrusion amount $\Delta r$ and protrusion shape differ depending on the method and condition of film forming. In the case of evaporation, the protrusion amount is decreased because of well directionality. In the film forming inside the taper, however, the film is sufficiently formed even to the vicinity of the aperture. Meanwhile, in the sputter method the protrusion amount increases because of much occurrence of deep arrival. However, in film forming on the taper there is a tendency of less film forming in the vicinity of the aperture.

Also, the silicon substrate may be thin in a case of using SOI (silicon on insulator) or thick, e.g. approximately 500, as in a usual case. The taper form and manufacture method are not only by anisotropic etching but may be by isotropic etching to provide an arcuate form, thus not being especially limited. Also, a glass substrate can be employed instead of the silicon substrate, to form a taper by isotropic etching or the like.

In the above near-field optical head manufacturing method in Embodiment 5 of the invention, an aperture greater than a targeted size or shape is formed in a silicon substrate, and a light reflection film to be formed on a taper of the aperture and/or a silicon substrate backside is controlled in amount, thereby defining a size and shape of a very small aperture for producing near-field light. Accordingly, it is possible to solve the problem with deviation caused upon microscopically forming an aperture in the silicon substrate by an etch process or the like, by a film forming process comparatively easy to control. Thus, a planar probe can be obtained with yield.

(Embodiment 6)

Next, explanations will be made on another manufacturing method for a near-field optical head having a very small aperture controlled in size or shape. As was shown in Embodiment 5, a very small aperture is formed in a silicon substrate, followed by thermal oxidation. At this time, a thermal oxidation film being formed on a surface can be controlled in film thickness depending on a degree of oxidation. However, because volumetric change is occurring in the area being oxidized, the amount of this volumetric change also can be controlled. FIG. 20 is a sectional view illustrating a manner that volumetric change is caused and the very small aperture changes in size. As shown in FIG. 20, the formation of a thermal oxidation film 2005 changes the shape of a former taper and very small aperture (wave lines in the figure) into a shape shown by solid lines.

The oxidation of a silicon substrate (usually thermal oxidation) causes volumetric change depending upon a oxidation film thickness (usually approximately 1.2 microns at maximum). Although the former shape is shown by dotted lines, the volumetric change provides a solid-lined form. An oxidation film region is formed outward and inward in approximately 1:1. Because the thermal oxidation film thickness in usual is approximately 1.2 microns at maximum, the aperture can be made smaller by inwardly 600 nano-meters at maximum (approximately 1.2 microns in diameter). After ion implant or so, there is a possibility that the film thickness be further increases.

Controlling the oxidation film thickness enables control of volumetric change, i.e. protrusion amount. Note that, because the oxidation film is transmissive of usual light (visible light, etc.), usually a metal film is necessary in forming a very small aperture. However, such a metal film is satisfactory if can provide shading, and may not be so thick as was shown in Embodiment 5. The metal film may be either on an upper side or on a lower side, wherein merely changed is the emission efficiency of light through the very small aperture. Besides thermal oxidation, ion implanting can be utilized because ion implant changes silicon amorphous and causes volumetric change. With other methods of causing volumetric change, there is no limitation to thermal oxidation and ion implant.

In the above near-field optical head manufacturing method in Embodiment 6 of the invention, an aperture greater than a targeted size or shape is formed in a silicon substrate, and thermal oxidation or ion implant is made on or to a surface including a taper of the aperture, thereby defining a size and shape of a very small aperture for producing near-field light. Accordingly, it is possible to solve the problem with deviation caused upon microscopically forming an aperture in the silicon substrate by an etch process or the like, by a thermal oxidation or ion implant process comparatively easy to control. Thus, a planar probe can be obtained with yield.

(Embodiment 7)

Figure 21:
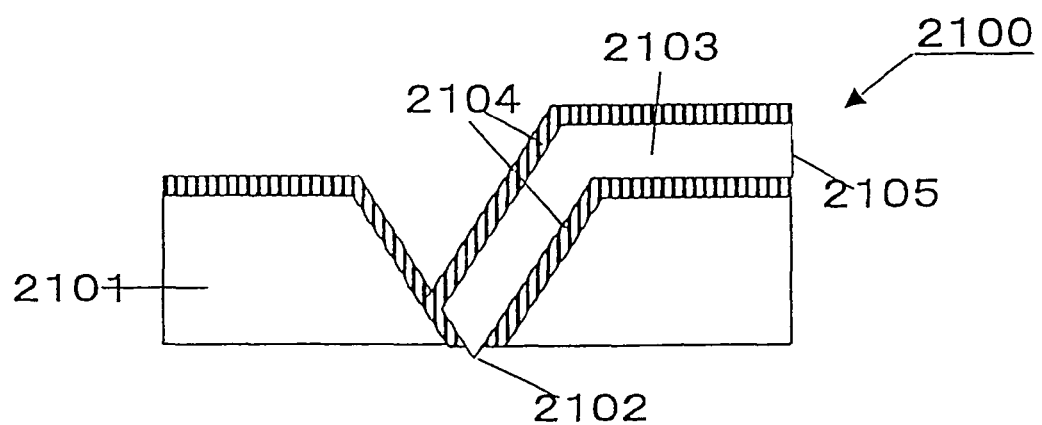
FIG. 21 is a sectional view showing one part of a near-field optical head according to Embodiment 7 of the invention.

FIG. 21 shows a sectional view of a part of a near-field optical head 2100 according to Embodiment 7. The near-field optical head 2100 according to the present embodiment is structured by a planar substrate 2101 having a hole in an inverted pyramid form having an apex forming a very small aperture, an optical waveguide 2103 for propagating light to the very small aperture, a protrusion 2102 structured by a part of the optical waveguide 2103 and having a pyramid form protruding from the very small aperture, and a light reflection layer 2104 formed on a periphery of the optical waveguide 2103 in an area except for the protrusion 2102 to reflect the light propagating through an inside of the optical waveguide 2103. The optical waveguide 2103 may be structured by a core for propagating light and a clad provided on an outer periphery thereof. The clad has a reflectivity relatively low as compared to a reflectivity of the core.

Although not shown in FIG. 1, the light outputted from a laser light source or through an optical fiber is incident on a light incident end 2105 to the optical waveguide 2103, and propagates toward a tip of the optical waveguide 2103 while being reflected by the light reflection layer 2104 formed on a periphery of the optical waveguide 2103. Owing to the reflection effect by the light reflection layer 2104, an increased amount of light can be supplied to the tip of the optical waveguide 2103. The planar substrate 2101 is formed with an optically very small aperture. The optical waveguide 2103 at its tip protrudes from the very small aperture and forms a protrusion 2102 in a pyramid form. The protrusion 2102 has a size having a height of less than 200 nm and a bottom-surface side length of less than 200 nm, wherein the light reflection layer 2104 is not formed thereon. This protrusion 2102 because of structured by one part of the optical waveguide 2103 propagates an increased amount of light to the protrusion 2102. As a result, an increased amount of near-field light converted from the propagation light can be produced in a periphery of the protrusion 2102 protruding from the very small aperture. Also, the tip (protrusion 2102) of the pyramid-formed optical waveguide 2103 protruding from the planar substrate 2101 has a ratio of height and bottom-surface one side of approximately $\sqrt{3}-2:2$, and is structured that a region the optical waveguide in width is smaller than a wavelength of light is very short. As a result, the attenuation of light intensity is reduced in the region the optical wavelength width is smaller than a light wavelength thus enabling supply of intensive near-field light through the protrusion 2102. By thus arrange in proximity the protrusion 2 where the greater part of near-field light is localized to a sample surface, near-field light can be scattered at a sample surface to derive optical information on a very small area of light (illumination mode).

Otherwise, the near-field light localized at a sample surface is scattered by the protrusion 2102 at the tip of the optical waveguide 2103 and derived as propagation light and then introduced at a rear of a light introducing end 2105 to a detector. This can also detect optical information on a very small area collection mode. In also this case, because the region that the optical waveguide width in the protrusion 2102 at the tip of the optical waveguide 2103 is smaller than a light wavelength of light is structured fully narrow, the greater part of near-field light can be scattered into propagation light and be guided with reduced propagation loss to the light introducing end by the light reflection layer 2104.

Meanwhile, where near-field light is produced at the very small aperture provided on the planar substrate as in a planar probe discussed in the conventional art, the resolution (resolving power) of an obtainable optical image is nearly in a same degree as the size of the aperture. However, in the near-field optical head 2100 shown in FIG. 21, near-field light is localized at around the protrusion 2102 as a part of the optical waveguide protruding from the very small aperture, which has a resolving power corresponding to a radius of curvature of the protrusion tip. Accordingly, it is possible to detect an optical image with resolution (resolving power) from the optical image obtained through the very small aperture.

Also, in the near-field optical head 2100 shown in FIG. 21, although the light reflection film 2104 is not formed on a periphery of the protrusion 2102 protruding from the very small aperture, a light reflection film 2104 may be structurally provided on a periphery of the protrusion 2102 and an optical aperture be formed at a tip of the protrusion 2102. In this case, an increased amount of light can be supplied to a vicinity of the protrusion 2102 tip by the effect of the light reflection film 2104 formed on a periphery of the protrusion 2102.

Figure 22:
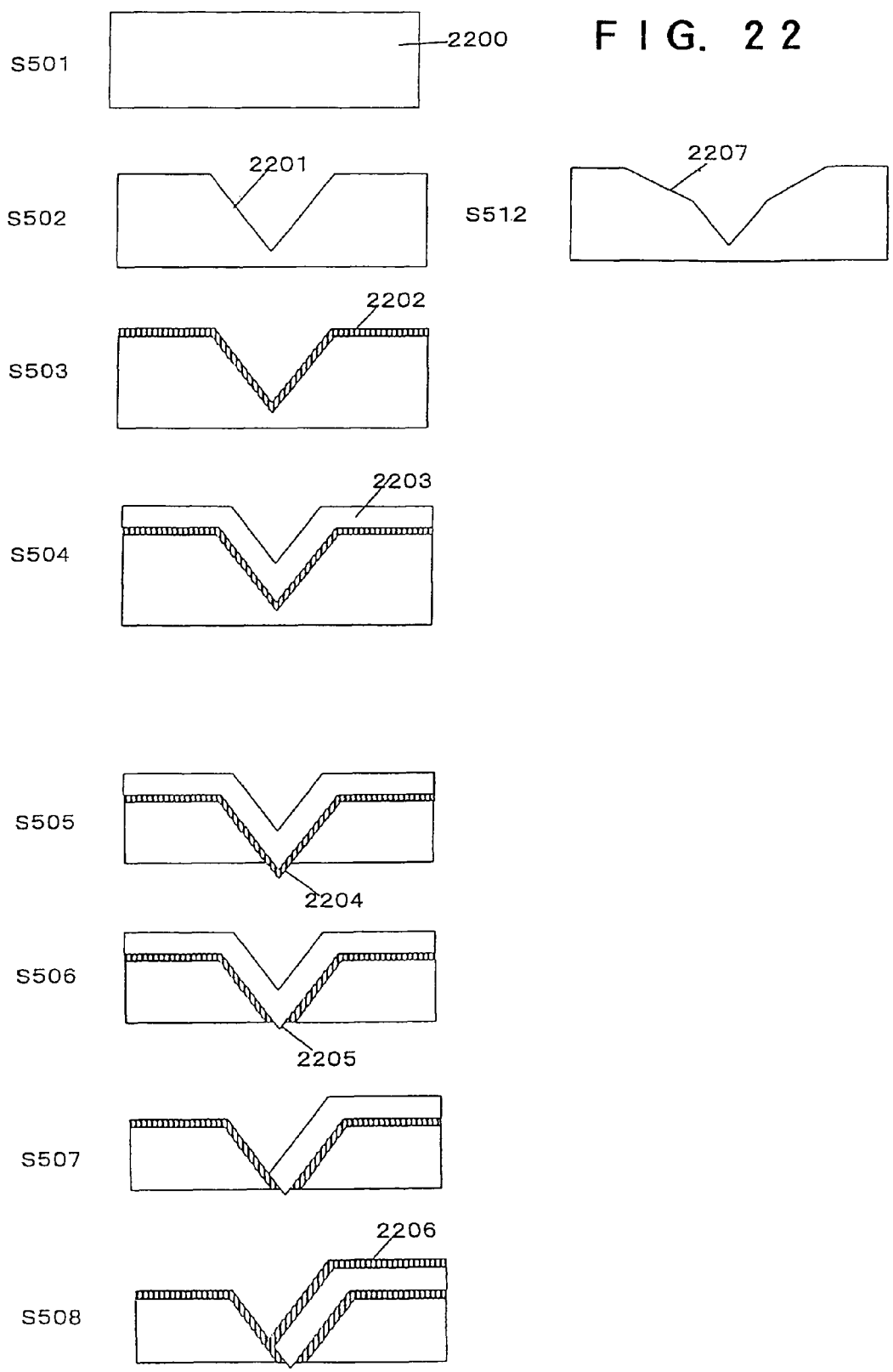
FIG. 22 is an explanatory view showing a manufacturing process for the near-field optical head shown in FIG. 21.

FIG. 22 is am explanatory view showing a manufacture process for the near-field optical head shown in FIG. 21.

First, in step S501 a substrate uses a silicon substrate 2200 that is a single crystal silicon having a (100) planar orientation. It is also possible to use a single crystal silicon with a planar orientation of (110) or (111), a dielectric crystal such as of glass and quartz, or a semiconductor crystal such as GaAs.

Next, in step S502 a recess 2201 in an inverted pyramid form is formed in the silicon substrate 2200 by an etch method with anisotropy for silicon. A thermal oxidation film as a mask material is formed on the substrate and patterned in desired areas by photolithography and etching thus exposing the silicon. Etching is made on the silicon in patterned areas by crystal-axis anisotropic etching with a potassium hydroxide solution or tetramethylammonium hydroxide solution. At this time, a recess 2201 in an inverted pyramid form is formed surrounded by four surfaces equivalent to the plane (111). Also, alternative to immersion in an etch solution, the recess 2201 can be formed by using anisotropic dry etching, e.g. by a reactive ion etching (RIE) apparatus. The mask material may use $SiO_2$ or a nitride film in place of the thermal oxide film. Thereafter, the thermal oxide film as a mask material is removed away by a mixture solution of hydrofluoric acid and ammonium fluoride.

Next, in step S503 a light reflection layer 2202 is formed. Film forming is made by a vacuum evaporation method such that a reflective metal film of Au, Al or the like is buried to a bottom of the recess 2201. The covering method may use a sputtering method or ion plating method. The provision of a light reflection film 2202 makes it possible to guide to the aperture the light propagating through the optical waveguide, also serving as a shade film against external light.

Next, in step S504 an dielectric as an optical waveguide 2203 is film-formed over a top surface of the light reflection film 2202. The material for the optical waveguide 2203 may use a dielectric material such as silicon oxide or silicon nitride or a polymer material such as polyimide or polymethacrylate. In the case of silicon oxide as a dielectric material, formation is easy by a sputter technique, a CVD technique or a vacuum evaporation technique. The optical waveguide 2203 may be formed by a core and a clad that are different in reflectivity. In this case, light propagates by total reflection through the core, thus reduced in propagation loss.

Next, in step S505 the substrate is etched at a backside to form in the substrate a microscopic protrusion 2204 in a pyramid form covered by a light reflection film 2202. The substrate is reduced in thickness by etching the silicon substrate 2200 at its backside. The etching is terminated at the formation of a pyramid-formed microscopic protrusion 2204 of the light reflection film 2202. The pyramid is formed to a size of one side of approximately 50 nm to 3 μm. The etching on the silicon substrate 2200 may use wet etching or dry etching.

Next, in step S506 the metal film as the light reflection film 2202 is etched from the backside of the substrate to form a very small aperture having a size of one side of 50-200 nm. Simultaneously, a protrusion 2205 is formed as a part of the optical waveguide removed of the light reflection film. The etch amount of the metal film is controlled to adjust for a size of the aperture in the metal film. This result in formation of a pyramid-formed microscopic protrusion 2205 of a dielectric material positioned at a tip of the optical waveguide 2203. Upon AFM operation, this protrusion 2205 at its apex serves a role of a probe. The etching on the metal film may use dry etching or wet etching.

Next, in step S507 the optical waveguide 2203 is made to a form by using a photolithography technology and etching. Using a photolithography technology for use in the usual semiconductor process, a mask material for protection against etching is laid on the optical waveguide 2203 and the mask material is patterned. Thereafter, the optical waveguide 2203 is etched and the mask material is removed away. Thus, the optical waveguide 2203 can be patterned. In order to reduce the roughness at an end surface of the optical waveguide 2203, the etching on the mask material and optical waveguide material uses anisotropic dry etching as represented by reactive ion etching or induction plasma etching. The mask material uses amorphous silicon, polysilicon, a metal film such as of Cr, Al, WSi, Ni and Au, or photoresist.

Next, in step S508 a light reflection film 2206 is film-formed on a top surface of the optical waveguide 2203. A metal film, such as of Au or Al, high in reflectivity is formed by a vacuum evaporation technique. The covering method may use film forming using a sputter technique or ion plating technique. The provision of a light reflection film 2206 makes it possible to focus to the aperture the light propagating through an inside of the optical waveguide 2203, also serving as a shade film against external light.

The near-field optical head 2100 shown in FIG. 21 can be fabricated by the procedure as shown above. However, the near-field optical head 2100 shown in FIG. 21 can be fabricated similarly if the processes of steps S507 and S508 are performed before the processes of steps S505 and S506.

As described above, the near-field optical head 2100 of Embodiment 7 of the invention is structured having a function of reflecting light. Also, in the vicinity of the aperture of the light reflection film 2104 positioned at a tip of the optical waveguide, the region the optical waveguide width is smaller than a light wavelength is in a narrow structure to reduce light loss at around the protrusion 2102. The protrusion 2102 not covered by the light reflection film 2104 can easily produce intensified near-field light. Also, it is possible to conduct optical image measurement or surface shape observation with resolution equivalent to a radius of curvature at the tip of the protrusion 2102.

Meanwhile, because the very small aperture and the protrusion for producing near-field light can be easily formed by the technology for use in the semiconductor manufacture process, arraying is facilitated to form a plurality of near-field optical heads on a common silicon substrate. Also, because of manufacture through the silicon process, batch process is possible to implement thus suited for mass production. Also, because of manufacture by the collective process on the silicon wafer, variation is reduced. Furthermore, product characteristics are stabilized. Also, the probe can be reduced in size and accordingly the number per wafer increases, thus reducing cost.

In the case that a material to which a phase change recording medium is applicable is used for a material of a recording medium, the increase of optical density is an important factor because recording thereof uses an optical energy heat mode. Accordingly, for optical memory utilizing near-field light, there is a desire of producing a sufficiently high intensity of near-field light. In the optical memory head of the invention, the increase in intensity of near-field light is achieved by the focusing action of the light reflection layer shown in FIG. 21 to a direction toward the aperture or the reduction in width of the optical waveguide to a wavelength or smaller by the pyramid form at the tip of the optical waveguide. Also, data reading and writing are possible at a bit interval corresponding to a tip diameter of the microscopic protrusion shown in FIG. 21, thereby realizing the density increase of optical memory storage bit. The above explanations are on an illumination mode in so-called a near-field optical microscope wherein near-field light is produced by focusing light to a protrusion of an optical memory head. However, the near-field optical head according to the invention is effective in so-called a collection mode wherein light is illuminated by another optical system to a recording medium surface so that a microscopic protrusion detects near-field light produced by a microscopic information recording structure on the recording medium surface. In such a case, the near-field light detected by the protrusion is converted into scattering light and propagates through the optical waveguide reaching the light incident end. Accordingly, a photodetector is arranged close to the light incident end.

Also, the near-field optical head for use as an optical memory head according to Embodiment 7 is formed by the usual semiconductor process and hence can be easily two-dimensionally arranged in plurality on a common silicon substrate.

Figure 23:
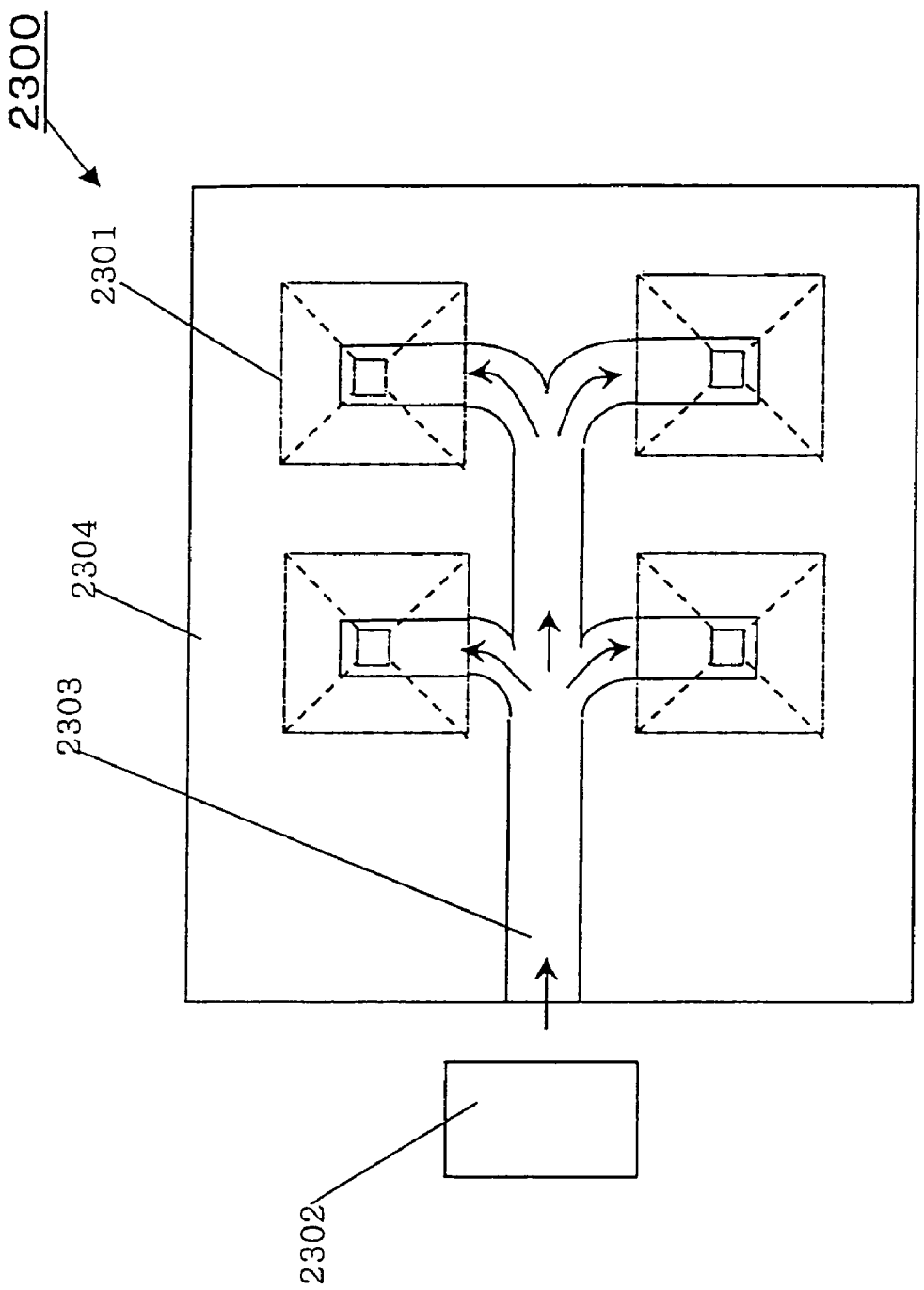
FIG. 23 is an explanatory view showing an array of the near-field optical heads having an optical waveguide according to Embodiment 7 of the invention.

FIG. 23 shows a structure of near-field optical head array 2300 two-dimensionally arrayed with the optical memory heads on a common silicon substrate. An optical waveguide 2303 is formed such that the light illuminated from one light source 2302 is guided to protrusion top surfaces of four near-field optical heads 2301. The light illuminated by the light source 2302 is illuminated to an incident end of the optical waveguide 2303 existing at an end face of the silicon substrate 2304 and incident to the optical waveguide 2303. The incident light passes through the optical waveguide 2303 and efficiently guided to vicinities of protrusions of the optical memory heads 2301 while being reflected by light reflection films provided in tapers similarly to FIG. 21. By the guided light, near-field light is produced at each protrusion. In the near-field optical head array 2300 shown in FIG. 23, for one light source the four near-field optical heads 2301 are described on one silicon substrate 2304. However, the invention is not limited to this but various combinations are possible to implement.

As described above, because the near-field optical heads for use as an optical head according to Embodiment 7 can be two-dimensionally arranged in plurality on a common silicon substrate, the head scanning is reduced to a minimum over a recording medium. Thus, high-speed optical storing and reading is possible. Furthermore, trackinglessness can be realized by adapting the interval of arrangement to an information recording unit interval on the recording medium.

(Embodiment 8)

Figure 24:
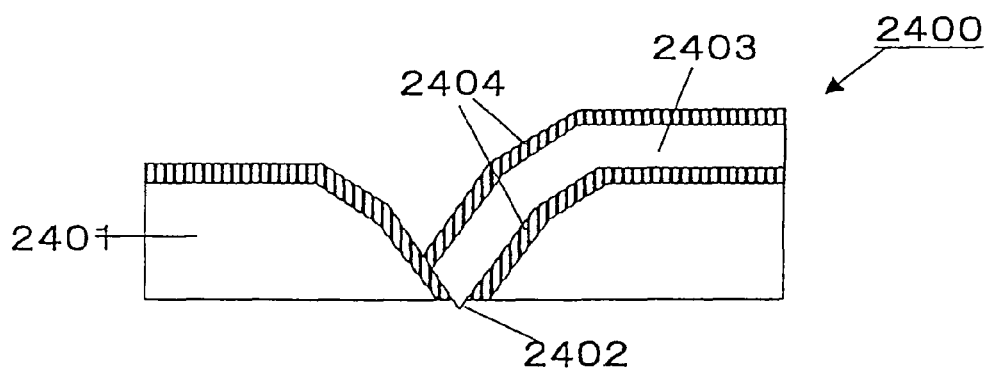
FIG. 24 is a sectional view showing one part of a near-field optical head according to Embodiment 8 of the invention.

FIG. 24 shows a sectional view of a part of a near-field optical head 2400 according to Embodiment 8.

In FIG. 24, the near-field optical head 2400 according to Embodiment 8 is structured, similarly to the near-field optical head 2100 according to Embodiment 7, by a planar substrate 2401 having a very small aperture, a pyramid-formed protrusion 2402 protruding from the very small aperture to detect and illuminate near-field light, an optical waveguide 2403 for propagating light to the protrusion, and a light reflection layer 2404 formed on a periphery of the optical waveguide to reflect the light propagating through the optical waveguide.

In the near-field optical head 2400 according to Embodiment 8, as shown in FIG. 24 a hole is formed in the planar substrate 2401 which is formed by two-staged slant surfaces different in angle. The slant surface close to an entrance of the hole is in a broader form. Consequently, the optical waveguide 2403 formed on the slant surfaces is bent in form at two points. In this case, the propagation light will have a refraction angle reduced at one bent point of the optical waveguide 2403 where light propagation loss is decreased. As a result, the light propagation loss is totally reduced at the two bent points formed in the optical waveguide 2403, thus enabling to illuminate an increased amount of light onto a sample.

Incidentally, FIG. 24 showed the planar substrate having the hole structured by two stages of slant surfaces different in angle. Alternatively, it is of course possible to use a planar substrate having a hole structured by three stages, four stages or a multiplicity of stages of slant surfaces without limited to two stages.

The near-field optical head of Embodiment 8 can be manufactured by a process similar to the fabricating method for the near-field optical head of Embodiment 7. Using a silicon substrate 2200 structured having an inverted pyramid recess in the substrate shown in step S501, in step S512 a thermal oxidation film as a mask material is again formed on the substrate. Patterning is made in desired positions by photolithography and etching to expose silicon, thereby etching the silicon in the patterning. In this case, in S111 silicon is exposed and etched over a broader range including the etched points. As a result, a surface occurs that is different in planar orientation from a tangential line of a (100) plane and a (111) plane of the silicon substrate. Thus, a silicon substrate is prepared which has a recess 2207 having two stages of slant surfaces different in angle shown in step S512.

Thereafter, the processes of from step S503 to step S508 are carried out similarly to the near-field optical head of Embodiment 7 shown in FIG. 22, thereby manufacturing a near-field optical head 2400 of Embodiment 8 shown in FIG. 24.

As described above, in the near-field optical head of Embodiment 8 of the invention, the optical waveguide is bent in multiple stages to reduce the refraction angle of propagation light at one bent point thereby totally reducing light propagation loss at the bent points, making possible to illuminate an increased amount of light to the protrusion for producing near-field light and hence easily produce intensified near-field light. Also, an optical image can be obtained with resolution equivalent to a tip diameter of the protrusion.

Meanwhile, similarly to Embodiment 7, because the very small aperture and the protrusion can be formed by the technology for use in the semiconductor manufacturing process, the silicon substrate having such a protrusion can be utilized as a planar probe for producing near-field light and compact in structure, particularly facilitating arraying to form a plurality of protrusions on a common substrate. Also, the manufacture through the silicon process enables batch processing thus suited for mass production. Also, the manufacture with collective processes on the wafer reduces variation and further stabilizes produce characteristics. Also, the probe can be reduced in size and the number per wafer increases hence reducing cost.

As described above, the near-field optical head according to Embodiment 7 and Embodiment 8 are usable as a near-field optical head for optical microscopes besides as a near-field optical head for recording and reading-out apparatuses. It is also possible, using the protrusion tip, to observe a surface shape or form a microscopic structure with utilizing an interaction such as of tunneling current or interatomic force. Otherwise, a magnetic film may be put on the tip to observe a magnetic field on a surface of a sample.

(Embodiment 9)

Figure 25:
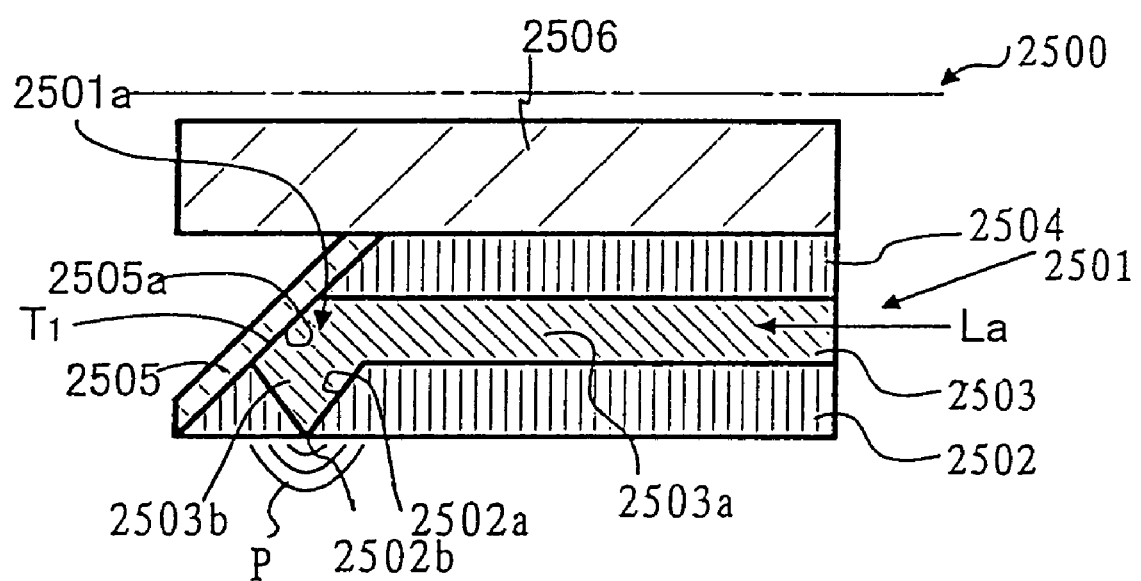
FIG. 25 is a side sectional view showing a structure of a near-field optical head according to Embodiment 9 of the invention.

Hereunder, embodiments of the invention will be explained with reference to the drawings. FIG. 25 is a side sectional view showing a structure of a near-field optical head 2500 according to Embodiment 9 of the invention. In the near-field optical head 2500 shown in FIG. 25, an optical waveguide 2501 is structured by a clad 2502, a core 2503 and a clad 2504, wherein the laser light La emitted from a laser light source (not shown) is propagated with low loss.

Also, the optical waveguide 2501 is formed of a dielectric material such as a quartz-based material or polymer, and structured by the clad 2502, the core 2503 and the clad 2504. Here, the optical waveguide 2501 is structured such that the core 2503 has a reflectivity greater than a reflectivity of the clad 2502 and clad 2504. The clad 2502 is formed by depositing a silicon dioxide film through a technique such as CVD (Chemical Vapor Deposition), sputtering or evaporation. At one end thereof, an inverted cone-formed taper hole 2502*a* is formed which is gradually reduced in diameter in a taper form in a direction from a surface toward a backside. This taper hole 2502*a* has an apex made as a very small aperture 2502*b* having a diameter of several tens of nano-meters. That is, the clad 2502 has the very small aperture 2502*b* formed at a backside thereof. Near-field light P is produced in the vicinity of the very small aperture 2502*b*.

The core 2503 is formed by depositing a silicon dioxide on a surface of the clad 2502 and along the taper hole 2502*a*, and structured by integrally forming a core straight portion 2503*a* in a straight form and a core tip portion 2503*b* closing the taper hole 2502*a*. The clad 2504 is also formed by depositing silicon dioxide on a surface of the core 2503.

Meanwhile, the optical waveguide 2501 has, at one end 2501*a*, a slant end T1 having a predetermined angle with respect to the core straight portion 2503*a* of the core 2503. On the one end T1, a reflection film 2505 is formed by a metal film of aluminum (Al), chromium (Cr), gold (Au) or the like or a dielectric multi-layered film. This reflection film 2505 serves to reflect by a reflection surface 2505*a* the laser light La propagating through the core straight portion 2503*a* of the core 2503 leftward in the figure toward the very small aperture 2502*b*.

The substrate 2506 is formed of silicon, glass and the like in a plate form, and bonded through an adhesive or the like on a surface of the clad 2504 (optical waveguide 2501). Incidentally, the substrate 2506 and the clad 2504 (optical waveguide 2501) may be bonded by anodic bonding. Here, the anodic bonding refers to bonding due to ionic bond caused in an boundary surface by applying high voltage to between the substrate 2506 and the clad 2504.

In the above structure, where the near-field optical head 2500 is applied in recording or reading-out by an optical memory, a not-shown recording medium is placed below the near-field optical head 2500. The recording medium is a planar substrate, for example, in a disk form and formed of a material applicable with optical recording/reading-out in a phase shift recording scheme, an magneto-optical recording scheme, a photo-chromic recording scheme or the like, so that information recording can be made thereon by locally illuminating light. Also, the recording medium is rotated at high speed during recording/reading-out by a not-shown drive mechanism.

Furthermore, because in this case the near-field light P produced in the vicinity of the very small aperture 2502*b* is acted onto the recording medium, there is a need of bring the distance between the very small aperture 2502*b* and the recording medium close to nearly a diameter of the very small aperture 2502*b*. Accordingly, in this example a lubricant is filled between the near-field optical head 2500 and the recording medium. By utilizing a surface tension of the lubricant, the distance between the near-field optical head 2500 and a recording surface of the recording medium is maintained sufficiently small. Also, the lubricant serves to cause the near-field optical head 2500 to follow up in position the deflection occurring in a rotary axis direction of the recording medium during high speed rotation. Also, the means of putting the distance between the very small aperture 2502*b* and the recording surface of the recording medium to nearly the diameter of the very small aperture 2502*b* can adopt a flying head scheme used in the conventional hard disk.

In such a state, the near-field optical head 2500 is controlled by a not-shown near-field optical head control mechanism such that the very small aperture 2502*b* of the near-field optical head 2500 is positioned to a desired position on a recording surface of the recording medium. Subsequently, when the laser light La emitted from a not-shown laser light source is incident on the incident end face of the core 2503 of the optical waveguide 2501, the laser light La propagates through the core straight portion 2503*a* leftward of the figure and then reflected toward the very small aperture 2502*b* by the reflection surface 2505*a* of the reflection film 2505. Due to this, near-field light P is produced in the vicinity of the very small aperture 2502*b*, or in other words in a microscopic space between the very small aperture 2502*b* and the recording surface of the recording medium.

The interaction of the near-field light P and the recording medium surface causes propagation light to be guided, involving properties of intensity, phase, etc. dependent upon a recording state on the recording surface, to a not-shown light receiving element where converted into an electric signal. This is sent via a not-shown signal line to a not-shown signal processing section where a determined of a recording state of an information recording point.

The information recording to the recording medium requires to illuminate near-field light P through the very small aperture 2502*b* as described above. However, for reading out information recorded on the recording medium, it is possible to provide a structure for detecting near-field light at the very small aperture 2502*b* or a structure for illuminating near-field light and detecting signal light with using a same very small aperture 2502*b*.

Next, a manufacturing method for a near-field optical head 2500 according to Embodiment 9 described above will be explained with reference to FIG. 26(*a*) to FIG. 26(*f*). First, in FIG. 26(*a*) a clad 2502 is deposited on a surface of a silicon substrate 10 by the technique of CVD, sputtering, evaporation or the like stated before such that a thin film of silicon dioxide becomes a thickness of 200 nm-50 μm. Then, a photolithography technique is used to form a taper hole 2502*a* in the clad 2502.

Specifically, a pin hole having a diameter of 100 nm-1 μm is formed in a resist part applied on a surface of the clad 2502 and then etching is made by an isotropic dry etch technique. This simultaneously etch the resist part and the clad 2502 in the vicinity of the pin hole at a same etch rate laterally and vertically. As a result, a taper hole 2502*a* in a taper form as shown in the figure is formed in the clad 2502. Here, the taper angle of the taper hole 2502*a* can be varied by adjusting an etch selective ratio of the clad 2502 and the resist agent. Also, anisotropic etching can be used to adjust the etch selective ratio of the clad 2502 and the resist thereby forming a desired form of a taper hole 2502*a*.

Then, a silicon dioxide thin film is deposited and formed to a thickness of 2 μm-10 μm by a technique similar to the technique of forming the clad 2502 such that it extends along a surface of the clad 2502 and closes the taper hole 2502*a*, thereby forming a core 2503. Next, by a similar technique a silicon dioxide thin film is deposited and formed to a thickness of 200 nm-50 μm on a surface of the core 2503, thereby forming a clad 2504. This forms an optical waveguide 2500 having the clad 2502, core 2503 and clad 2504 on the surface of the silicon substrate 2510.

Here, there are two techniques as a technique to make the refractivity of the core 2503 greater than the refractivity of the clad 2502, 2504. In the case of decreasing the refractivity of the clad 2502, 2504, fluorine (F) may be doped during film-forming the clad. On the other hand, in the case of increasing the refractivity of the core 2503, germanium (Ge) may be doped during film forming the core. Meanwhile, where a silicon dioxide film is deposited and formed, for example, by CVD or sputtering, the refractivity can be adjusted by adjusting the gas pressure or application voltage during film forming although dependent upon the method of film forming.

Figure 26:
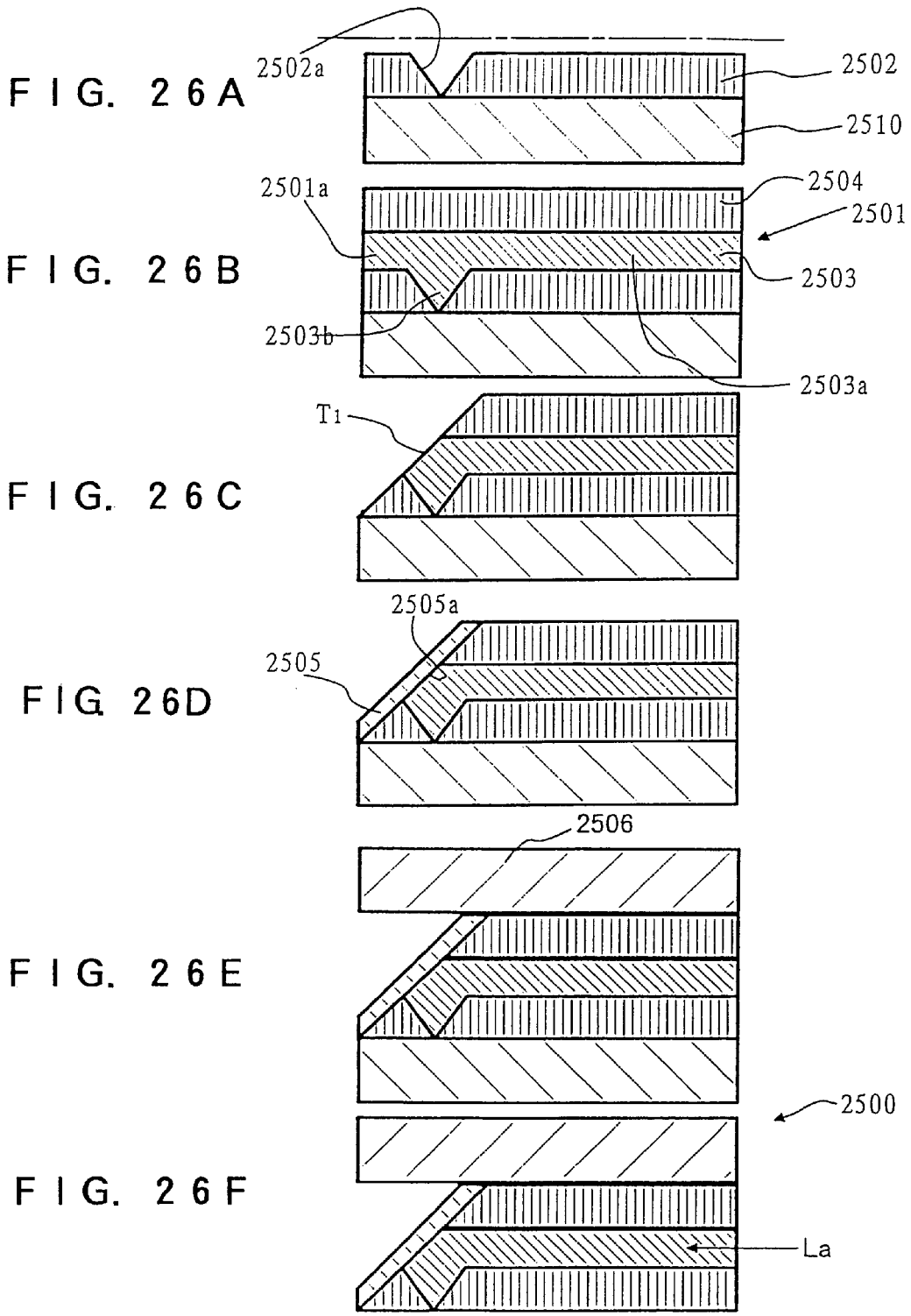
FIG. 26 is a side sectional view for explaining a manufacturing method for a near-field optical head according to Embodiment 9 of the invention.

Next, in FIG. 26(*c*), a resist pattern for forming one end surface T1 is formed on the optical waveguide 2501 by the photolithography technique, and then the optical waveguide 2501 in its entirety is taper-etched. For the technique of this taper etching, appropriate selection is made from the technique listed from item (1) to item (3) given below.

(1) Using a resist pattern as a mask, anisotropic or isotropic etching is conducted in a state that the etch rate is properly selected for the resist and the silicon dioxide as a structural material for the optical waveguide 2501. Due to this, an end surface T1 is formed to an angle dependent upon an etch rate difference between the resist material and the silicon dioxide such that the optical waveguide 2501 at one end 2501*a* is in a form as shown in the figure.

(2) A resist pattern is formed on a surface of the optical waveguide 2501 and then isotropic dry etching is conducted. Due to this, one end surface T1 is formed by undercut such that one end 2501*a* is made to a form as shown in the figure.

(3) A tapered resist pattern is formed on a surface of the optical waveguide 2501 in a manner corresponding to one end surface T1. Then, transfer-schemed etching is conducted that anisotropic etching is made in a state the etch rate is properly selected for the silicon dioxide as a structural material of the optical waveguide 2501 and the resist. This forms one end surface T1 having a shape of the one end 2501*a* as shown in the figure.

Then, in FIG. 26(*d*), a metal film, dielectric multi-layered film or the like is formed of aluminum (Al), chromium (Cr) or the like over an entire surface of the optical waveguide 2501 (silicon substrate 2510) as mentioned before by a technique of CVD, sputtering or the like. Next, the films other than the reflection film 2505 shown in the figure are removed by photolithography and etching. Incidentally, the reflection film 2505 may be deposited and formed in a direction of from left of the figure in a process to be hereinafter referred to in FIG. 26(*e*) or FIG. 26(*f*).

Next, in FIG. 26(*e*), a substrate 2506 is bonded on a surface of the optical waveguide 2501 (clad 2504) by anodic bonding or adhesive mentioned before. As a final process, in FIG. 26(*f*), wet etching is conducted on the silicon substrate 2510 shown in FIG. 26(*e*) by using potassium hydroxide (KOH) or tetramethylammonium hydroxide (TMAH) thereby removing the silicon substrate 2510. Meanwhile, the silicon substrate 2510 can be removed by high-speed dry etching. Due to this, a near-field optical head 2500 is manufactured.

As explained above, the near-field optical head according to Embodiment 9 uses the optical waveguide in place of a conventional optical fiber, thus being reduced in size and weight. Accordingly, it is possible to easily follow up a response speed of a feedback system requiring high-speed response and ultimately perform recording and reading-out with high density.

Also, the near-field optical head according to Embodiment 9 described above is structured to guide the laser light from a laser light source to a position immediately close to the very small aperture. Accordingly, the propagation loss of light can be drastically reduced as compared to the conventional.

Furthermore, because the near-field optical head according to Embodiment 9 as above is formed with the taper hole by isotropic or anisotropic dry etching, the taper hole can be adjusted in its taper angle. Eventually, the adjustment of this taper angle optimizes the efficiency of light transmission with a result that the propagation loss of light can be reduced.

Meanwhile, the manufacturing method for a near-field optical head according to Embodiment 9 use the technique explained with reference to FIG. 26(*a*)-FIG. 26(*f*), i.e. the technique that a clad, a core and a clad are formed in order over the surface of the silicon substrate and then a substrate is bonded to the optical waveguide. Accordingly, it is possible to easily form a shape of a protrusion on the optical waveguide core that has conventionally considered difficult in fabrication.

(Embodiment 10)

Figure 27:
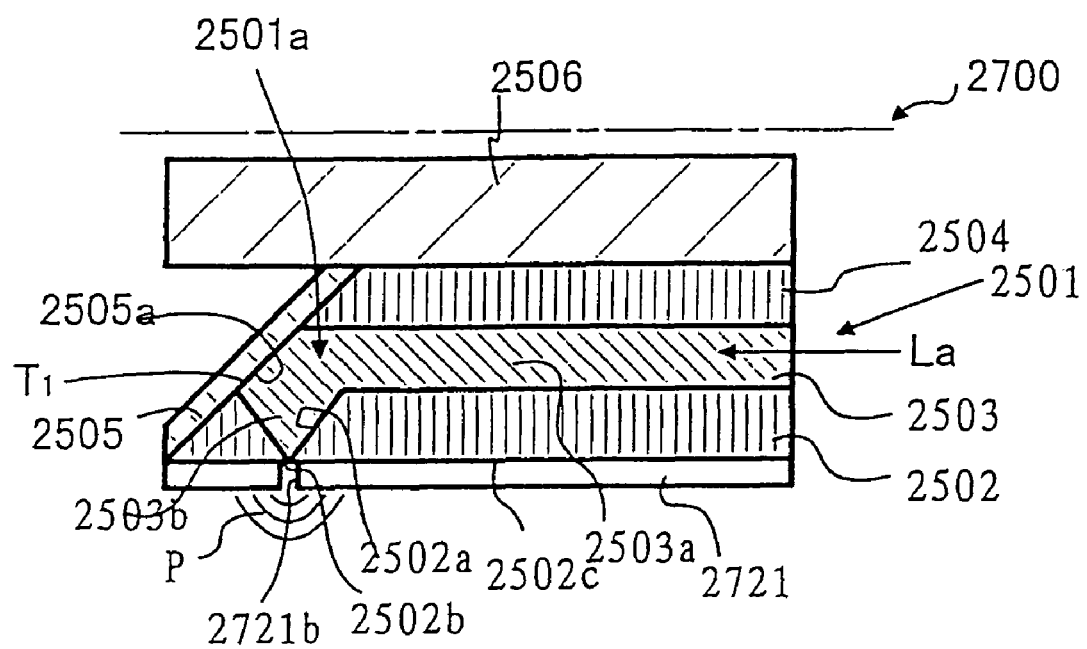
FIG. 27 is a side sectional view showing a structure of a near-field optical head according to Embodiment 10 of the invention.

FIG. 27 is a side sectional view showing a structure of a near-field optical head 2700 according to Embodiment 10 of the invention. In FIG. 27, the parts corresponding to those of FIG. 25 are put with the same reference numerals to omit explanations thereof. In FIG. 27, a reflection film 2721 is newly formed. This reflection film 2721 is formed on the backside 2502*c* of a clad 2502. A microscopic diameter hole 2721*a* is formed through the reflection film 2721 in a position corresponding to the very small aperture 2502*b*. This reflection film 2721 prevents light from leaking at around the very small aperture 2502*b* and also serves to prevent, when the light propagating through the core 2503 leaks as leakage light to the clad 2502, the light from being illuminated to a recording surface of an optical disk. Meanwhile, it also serves to reflect the propagation light obtained through scattering of near-field light P toward a not-shown light receiving element.

Also the reflection film 2721 is formed by a technique of CVD, sputtering, evaporation or the like as mentioned before such that a metal film or dielectric multi-layered film is formed of aluminum (Al), chromium (Cr), gold (Au) or the like to a thickness of 100 nm-1 μm on a backside 2502*c* of the clad 2502. Furthermore, the microscopic diameter hole 2721*a* in the reflection film 2721 is formed by the technique of lithography and etching.

The near-field optical head according to Embodiment 10 is formed with the reflection film to thereby prevent the core leakage light from leaking to an outside of the optical waveguide. Accordingly, it is possible to effectively narrow a light illumination range on a recording surface of a recording medium. Furthermore, the near-field optical head according to Embodiment 10 is formed with the reflection film and accordingly guide the propagation light obtained by scattering of near-field light P to the light receiving element, thus improving detection sensitivity.

(Embodiment 11)

Figure 28:
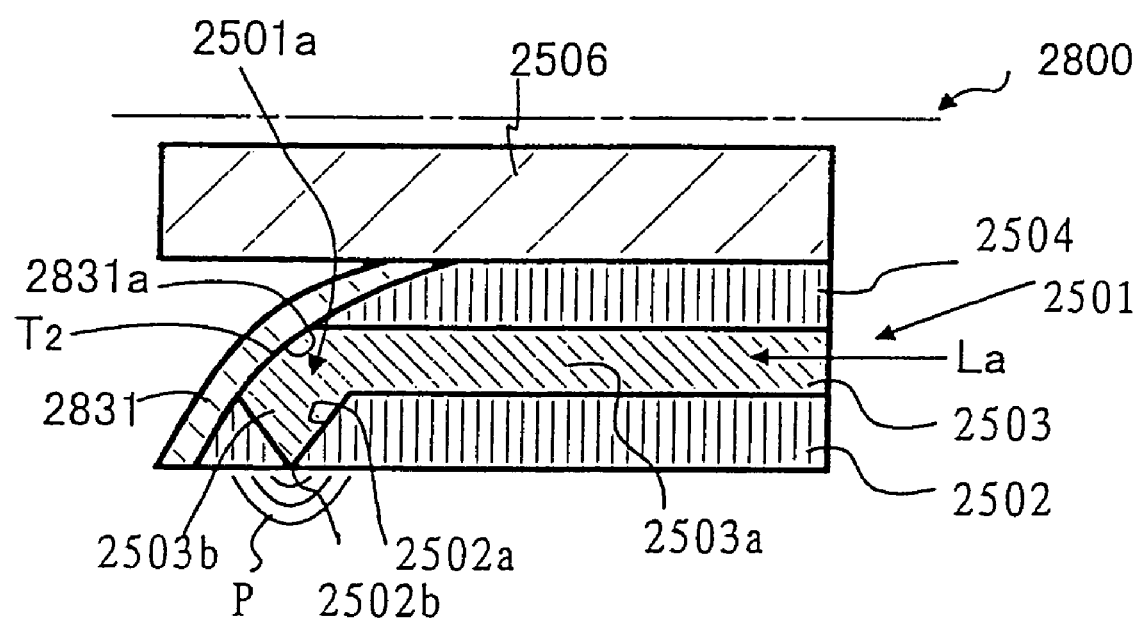
FIG. 28 is a side sectional view showing a structure of a near-field optical head according to Embodiment 11 of the invention.

FIG. 28 is a side sectional view showing a structure of a near-field optical head 2800 according to Embodiment 11 of the invention. In this figure, the corresponding parts to those of FIG. 25 are put with the same reference numerals. In this figure, the optical waveguide 2501 has at its one end 2501*a* one end surface T2 made in a curved surface. On the one end surface T2, a reflection film 2831 is formed of the material and by technique similar to the reflection film 2505 (see FIG. 25). That is, the reflection surface 2831*a* of the reflection film 2831 is in a curved surface at the one end surface T2 and hence serves as a concave mirror. That is, the laser light La propagated through the core straight portion 2503a of the core 2503 is focused by the reflection surface 2831a and reflected toward the very small aperture 2502b.

The near-field optical head according to Embodiment 11 has the reflection film made in a curved surface and hence can focus laser light and eventually increase the intensity of near-field light.

(Embodiment 12)

Figure 29:
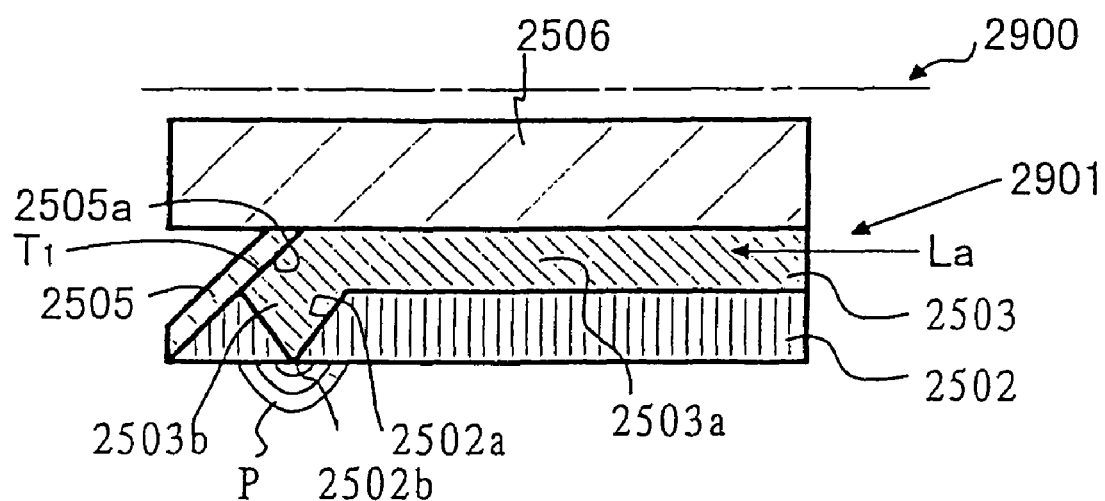
FIG. 29 is a side sectional view showing a structure of a near-field optical head according to Embodiment 12 of the invention.

FIG. 29 is a side sectional view showing a structure of a near-field optical head 2900 according to Embodiment 12 of the invention. In FIG. 29, the parts corresponding to those of FIG. 25 are put with the same reference numerals to omit explanation thereof. In FIG. 29, the structure is not formed with the clad 2504 shown in FIG. 25. That is, the core 2503 is bonded, at a surface, with a substrate 2506 having a refractivity lower than the refractivity of the core 2503 by the anodic bonding or the like mentioned before. The substrate 2506 serves as a clad 2504. Consequently, in FIG. 29 an optical waveguide 2901 is constituted by the clad 2502, the core 2503 and the substrate 2506.

Accordingly, the near-field optical head according to Embodiment 12 can be further reduced in size and weight by an amount corresponding to the absence of a clad as compared to the near-field optical head of Embodiment 9. Thus, recording/reading-out is possible with higher density.

Although Embodiments 9 to 12 of the invention were described in detail above, the concrete structure is not limited to those of Embodiments 9 to 12 wherein change of design within the range of not departing from the gist of the invention is included in the present invention. For example, although Embodiments 9 to 12 were explained on a plurality of structural examples, the structural examples if properly combined, besides individually practicing them, are also included in the invention.

Meanwhile, in Embodiments 9 to 12 the light introduced in the optical waveguide is not necessarily coherent light but may use light to be emitted as incoherent light from an LED or the like.

(Embodiment 13)

Figure 30:
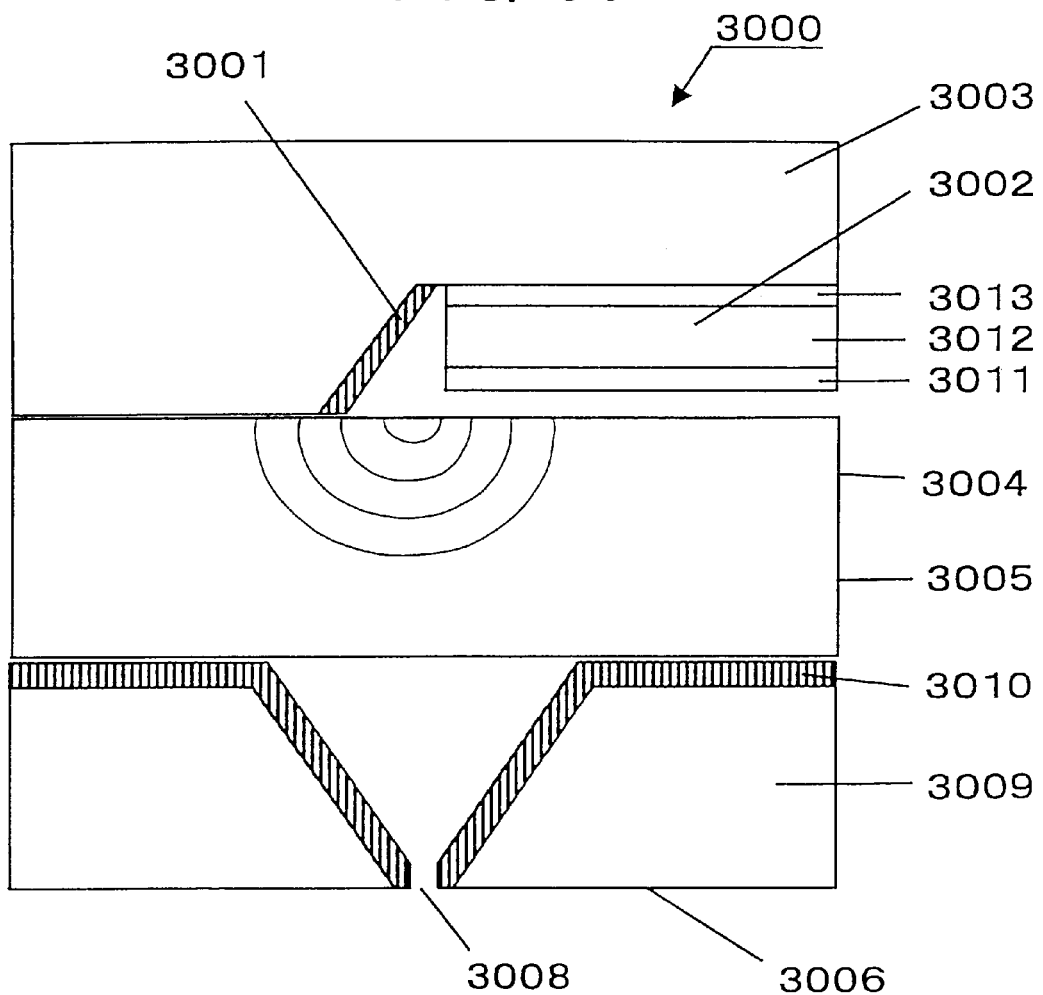
FIG. 30 is a side sectional view showing a structure of a near-field optical head according to Embodiment 13 of the invention.

FIG. 30 is a partial sectional view showing a structure of a near-field optical head according to Embodiment 13. A near-field optical head 3000 shown in FIG. 13 is structured by a first substrate 3003 having, in a light introducing portion to introduce laser light emitted from a laser light source into the near-field optical head 3000, an optical waveguide 3002 for propagation with low loss in a direction parallel to a media surface, and a light reflection layer 3001 for reflecting the light propagated with low loss through the optical waveguide 3002 and direct a propagation direction toward an aperture, a second substrate 3005 having a lens 3004 designed to focus the laser light directed toward the aperture by a lens effect and align a focused microscopic beam spot to the aperture, and a third substrate 3009 forming an inverted conical or pyramidal hole 3007 gradually reduced in diameter in a taper form toward a slider surface 3006 opposing to a media and forming a light reflection film 3010 to reflect light upward and increase illumination light to the aperture so that near-field light is produced by illuminating the propagation light to an apex thereof.

Figure 31:
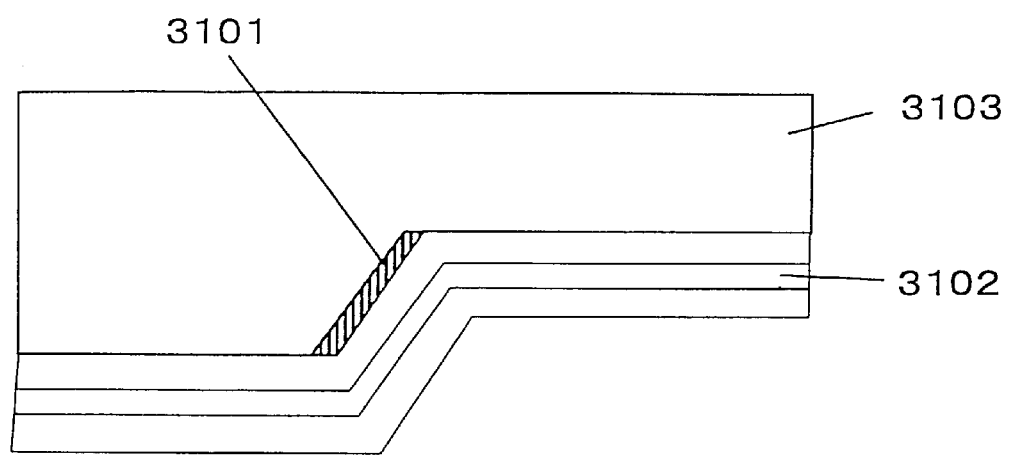
FIG. 31 is a side sectional view showing one part of a near-field optical head according to Embodiment 13 of the invention.
Figure 32:
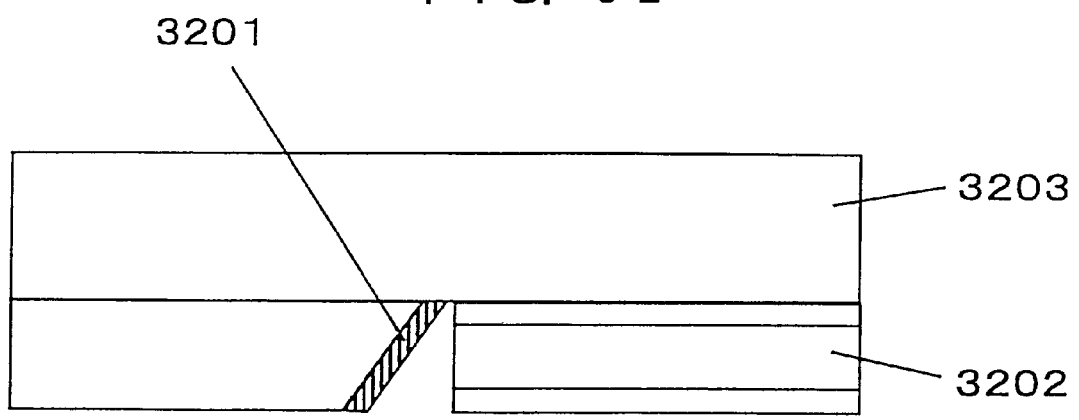
FIG. 32 is a side sectional view showing one part of the near-field optical head according to Embodiment 13 of the invention.
Figure 33:
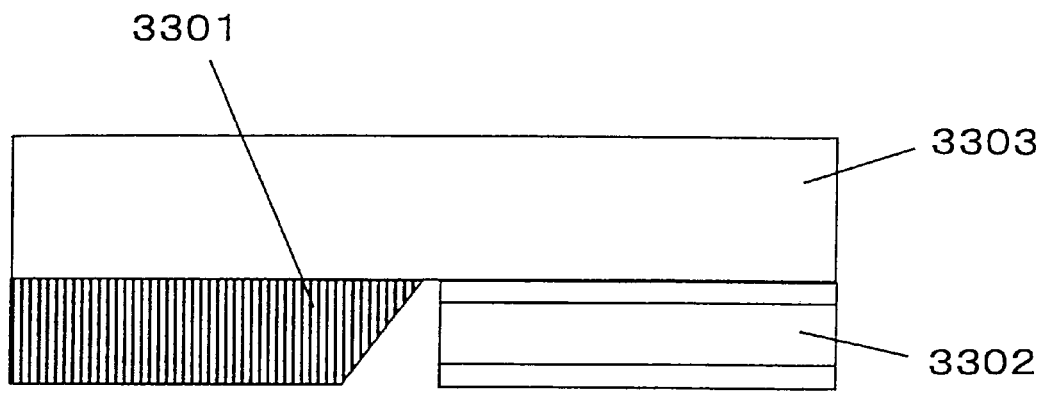
FIG. 33 is a side sectional view showing one part of the near-field optical head according to Embodiment 13 of the invention.
Figure 34:
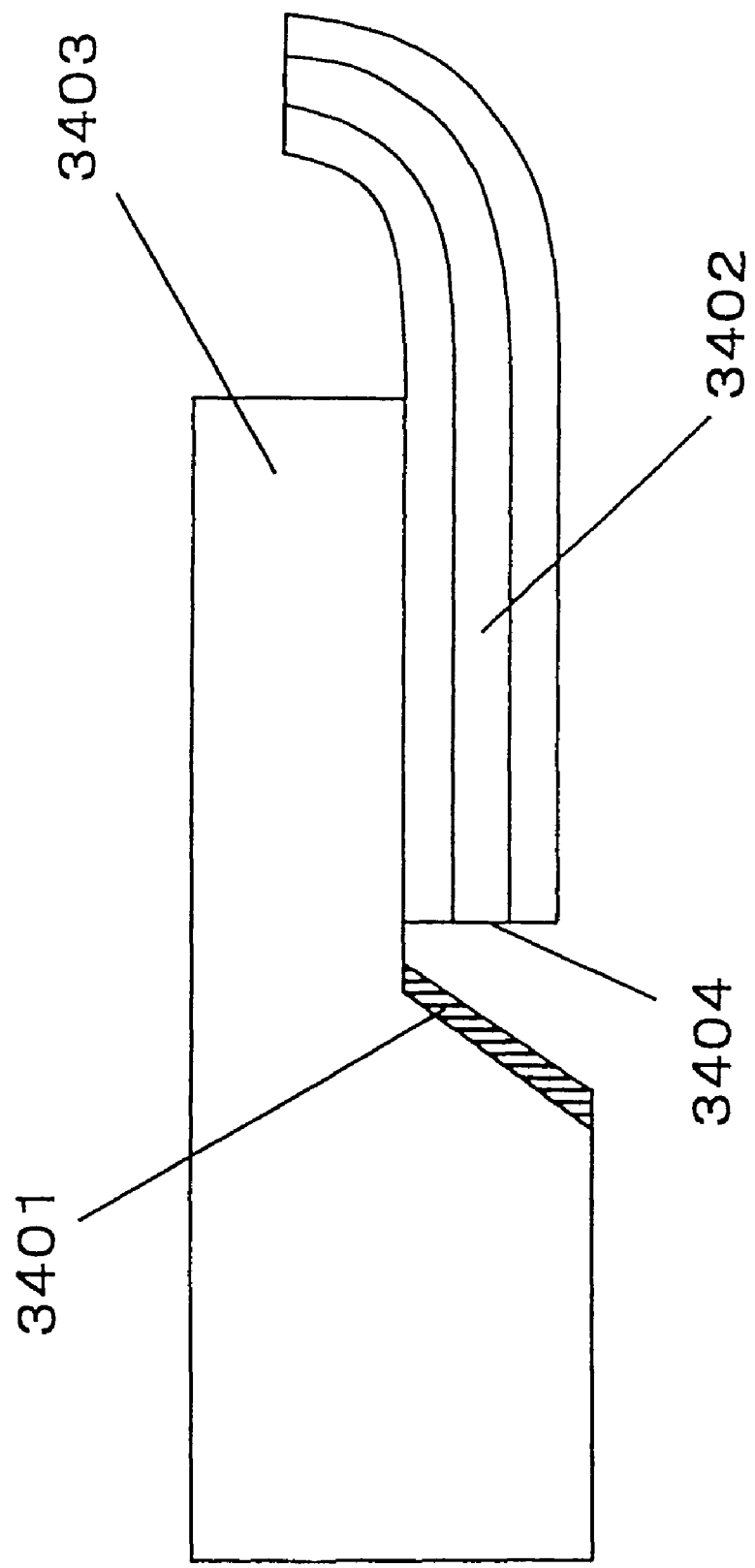
FIG. 34 is a side sectional view showing one part of the near-field optical head according to Embodiment 13 of the invention.

In the first substrate 3003, the optical waveguide 3002 is formed of quartz-based material or a dielectric material such as polymer, which may be structured by a clad 3011, a core 3012 and a clad 3013 as shown in FIG. 30. Here, the optical waveguide 3002 is structured such that the core 3012 has a refractivity greater than the refractivity of the clad 3011 and clad 3013. The core 3012 and the clads 3011, 3013 are formed by depositing a silicon dioxide film through the technique of CVD (Chemical Vapor Deposition), sputtering or evaporation, thereby enabling to reduce the size of the first substrate 3003. The emission light from this optical waveguide 3002 is illuminated to the light reflection layer 3001 formed on a slant surface having a predetermined angle so that the light reflection layer 3001 changes a propagation direction of the light. In the case that the first substrate 3003 uses a silicon (100) substrate, anisotropic etching forms, due to (111), a slant surface having a slant degree of 54.7 degrees on a top surface thereof a light reflection layer 3001 is formed of a metal film such as of aluminum, chromium or gold or a dielectric multi-layered film. Due to the light reflection layer 3001, the light illuminated from a semiconductor laser in a direction parallel to a media surface can be illuminated from above to the very small aperture formed in a plane of a slider. Thus, a near-field optical head 3000 is feasible with efficiency of light propagation. Meanwhile, even where as another first substrate 3103 a pattern of an optical waveguide 3102 is formed to a further upper stage of a slant surface as shown in FIG. 31, the light propagating in a direction parallel to the media surface will propagate toward the very small aperture by the light reflection layer 3101 formed on the slant surface. Alternatively, as another first substrate 3203 a quartz material may be formed on a planar substrate to conduct etching on the quartz material in a form of transferring a mask form thereby forming a slant surface having a given taper angle on which a metal film or the like is laid thereby forming a light reflection layer 3201 (FIG. 32). Alternatively, as another first substrate 3301 a metal film such as of aluminum, gold, silver, copper, titanium or chromium may be laid on a planar substrate by the technique of evaporation, sputtering or plating so that a light reflection layer 3301 is formed with a taper angle by wet etching great in undercut beneath a mask or dry etching capable of transferring a mask shape (FIG. 33). Alternatively, as shown in FIG. 34 a substrate having an optical fiber 3402 inserted in a V-shaved groove in the vicinity of a light reflection layer 3401 may be used as a first substrate 3403. In this case, the light emitted from a laser light source is incident on a core as a part high in refractivity formed inside the fiber 3402. The light propagated through the core is illuminated to the light reflection layer 3401 through an end face 3404 of the optical fiber inserted in the substrate. Where the first substrate uses a silicon (100) substrate as mentioned before, a desired depth of a groove is formed structured by three slant surfaces with a slant degree of 54.7 degrees by utilizing a (111) plane on which the etch rate is slow. By arranging a circular optical fiber 3402 in the groove, alignment and positioning is possible with accuracy. In the first substrate thus structured (3003, 3103, 3203, 3303, 3403), a focusing function may be provided by a concave-formed reflection surface of the light reflection layer. Also, the optical waveguide for propagation in a direction parallel to the media surface at an incident end surface or emission end surface may have a convex surface, or the optical waveguide in part have a grating function. The focusing function allows for design to match a light spot to the very small aperture. By this effect, an increased amount of light can be illuminated to the very small aperture thus realizing high-speed reading-out or recording of information.

The second substrate 3005 uses a substrate having a refractive distribution different in part thereof. This substrate has a refractivity continuously varying from one surface to the other surface of the substrate to have a lens function capable of focusing or collimating the light incident on the one surface to the other surface. The substrate as this is fabricated by a selective ion exchange method described later. Alternatively, a substrate having a lens effect due to a lens shape may be used. The lens in form is fabricated by selecting large-radius ions in ion exchange to utilize phenomenon that a circular swell is given by the difference in ion radius. Meanwhile, as another making method for a lens form, the resist as a mask for dry etching is formed to a lens shape by a photolithography technique using gray scale mask or immersion mask. The substrate and the resist are simultaneously etched under an etch condition that a selective ratio is taken constant for a dielectric material as a substrate material and the resist, thereby making a desired lens form. The second substrate 3005 having a lens function thus properly optically designed is arranged between the first substrate 3003 and the third substrate 3009. This makes it possible to supply an increased amount of light to the very small aperture 3008 formed in the third substrate 3009. Meanwhile, the second substrate 3005 may use a substrate having in part a grating function or a Fresnel zone plate or a holographic lens. The second substrate 3005 thus structured uses a material of dielectric, particularly an $SiO_2$-based material such as quartz or glass.

The third substrate 3009 uses a silicon substrate. The silicon substrate is formed with a tapered hole 3007 in a manner penetrating through to have a very small aperture 3008 in a surface on a media side. The hole diameter decreases in a direction toward the slider. The propagation light illuminated from above to the hole travels toward the aperture while being reflected at an inside of the taper. This is converted into near-field light by the very small aperture 3008 formed in the surface on the media side and having a microscopic diameter of less than 200 nano-meters. The taper is formed by working the silicon substrate through an anisotropic silicon etching technology. The taper has a light reflection layer 3010 formed on a surface thereof so that the light propagated from above can be reflected to focus an increased amount of light to the very small aperture. The light reflection film 3010 laid on the surface of the penetration hole in a manner filling the hole has a hole having a size providing for a size of the very small aperture 3008. In the third substrate 3009, the taper may be structured in a curved surface or by multi-staged slant surfaces different in slant degree. Also, the hole may have a part on an inside thereof a material having a refractivity of n=1 or higher or a refractivity distribution or a curved surface.

The near-field optical head 3000 according to Embodiment 13 is formed by integrally bonding the first to third substrates. In bonding, the respective substrates are aligned in position such that an increased amount of near-field light can be produced by focusing the laser light reflected by the light reflection layer 3001 formed in the first substrate 3003 by a lens function existing in the second substrate 3005 and illuminating the focused light to the very small aperture 3008 provided in the third substrate 3009. Also, in order to obtain a desired intensity of near-field light, optical design is made particularly for the size or NA of the lens 3004 provided in the second substrate 3005. The bonding between the substrates is made by applying an adhesive between the substrates and curing it. Otherwise, direct bonding is made between the substrates by an anodic bonding method because the substrate material uses silicon or glass. Here, anodic bonding refers to bonding due to ionic bond caused in an interface by inducing high electric field between silicon and glass or between glasses.

Figure 35:
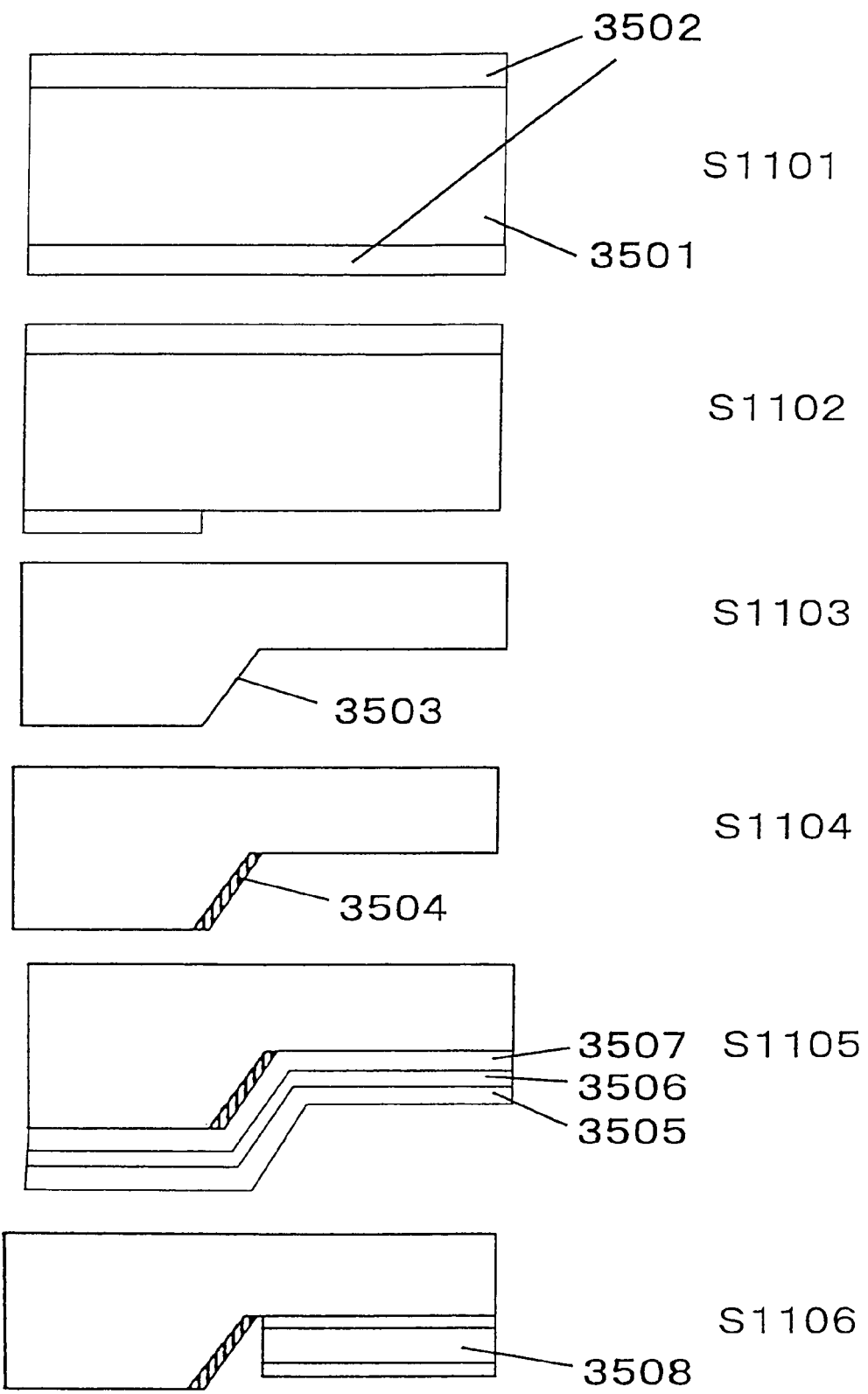
FIG. 35 is a side sectional view for explaining a manufacturing method for one part of the near-field optical head according to Embodiment 13 of the invention.

Next, FIG. 35 is an explanatory view showing a manufacturing process for a near-field optical head 3000 of Embodiment 13 shown in FIG. 30.

First, explained is a fabrication method for a first substrate 3003. First, in step S1101 the substrate uses a single crystal silicon substrate 3501 having a (100) planar orientation. On this substrate, a masking thermal oxide film 3502 or silicon oxide film is laid by a CVD technique or sputtering technique. The mask material may use, besides this, silicon nitride or non-alkaline dissolved metal. Next, in step S1102 a lithography technique is used to open a desired size of a window in the mask material to expose Si in position to be etched. Thereafter in step S1103 wet etching is made on the silicon substrate 3501 by using potassium hydroxide (KOH) or tetramethylammonium hydroxide (TMAH) thereby providing a step. Thus, a slant surface 3503 (111) was formed having an angle of 54.7 degrees with respect to (100). Subsequently, in step S1104 on a top surface of this slant surface 3503 a light reflection layer 3504 is formed by a metal film such as of aluminum, silver or gold or a dielectric multi-layered film so that the light laterally propagated can be supplied toward the aperture. Furthermore, in step S1105 a material of an optical waveguide is made in a bottom of the step by depositing a quartz-based material such as silicon oxide or silicon nitride and a dielectric material such as polymer of polyimide or polymethacrylate that are turned thereafter into a material for light propagation. In the case of silicon oxide as a dielectric material, forming is easy by a sputtering technique, CVD technique or evaporation technique. The optical waveguide may be formed by a core 3506 and clads 3505, 3507 different in refractivity. To make the refractivity of the core higher than the refractivity of the clad, germanium may be doped during film-forming a core. To make the refractivity of the clad lower than the refractivity of the core, fluorine may be doped during film-forming a clad. In such a case, light propagates while being totally reflected in the core, thus reducing propagation loss. Subsequently, in step S1106 the optical waveguide 3508 is adjusted in shape by using a photolithography technique and etching. The photolithography technology for use in usual semiconductor manufacturing process is used to lay a mask material for protection against etching on the optical waveguide and patterned. Thereafter, the optical waveguide material is etched to remove the mask material thereby patterning the optical waveguide 3508. In this manner, a first substrate 3003 is fabricated. Alternatively, an optical fiber may be inserted in the bottom of the step instead of forming the optical waveguide (FIG. 34). In this case, the substrate is fabricated using the process similar to that of step S1101 to step S1104 and the fiber is inserted in a V-formed groove formed by two of (111) having an angle of 54.7 degrees with respect to (100). Because the angle of the V-groove slant surfaces is constant, the V-groove can be formed to a desired size by setting a desired size when forming an etch mask shape. As a result, a circular optical fiber put on the V-groove is determined in position. As a result, the accuracy in position of light is improved that is be illuminated to the light reflection layer. The fiber is fixed by using bonding through adhesive or anodic bonding after aligning the fiber in position.

Meanwhile, in the first substrate shown in FIG. 32 and FIG. 33, light reflection is done by a slant surface formed by etching to a taper form a dielectric material of metal or silicon oxide or silicon nitride laid on the substrate.

Figure 36:
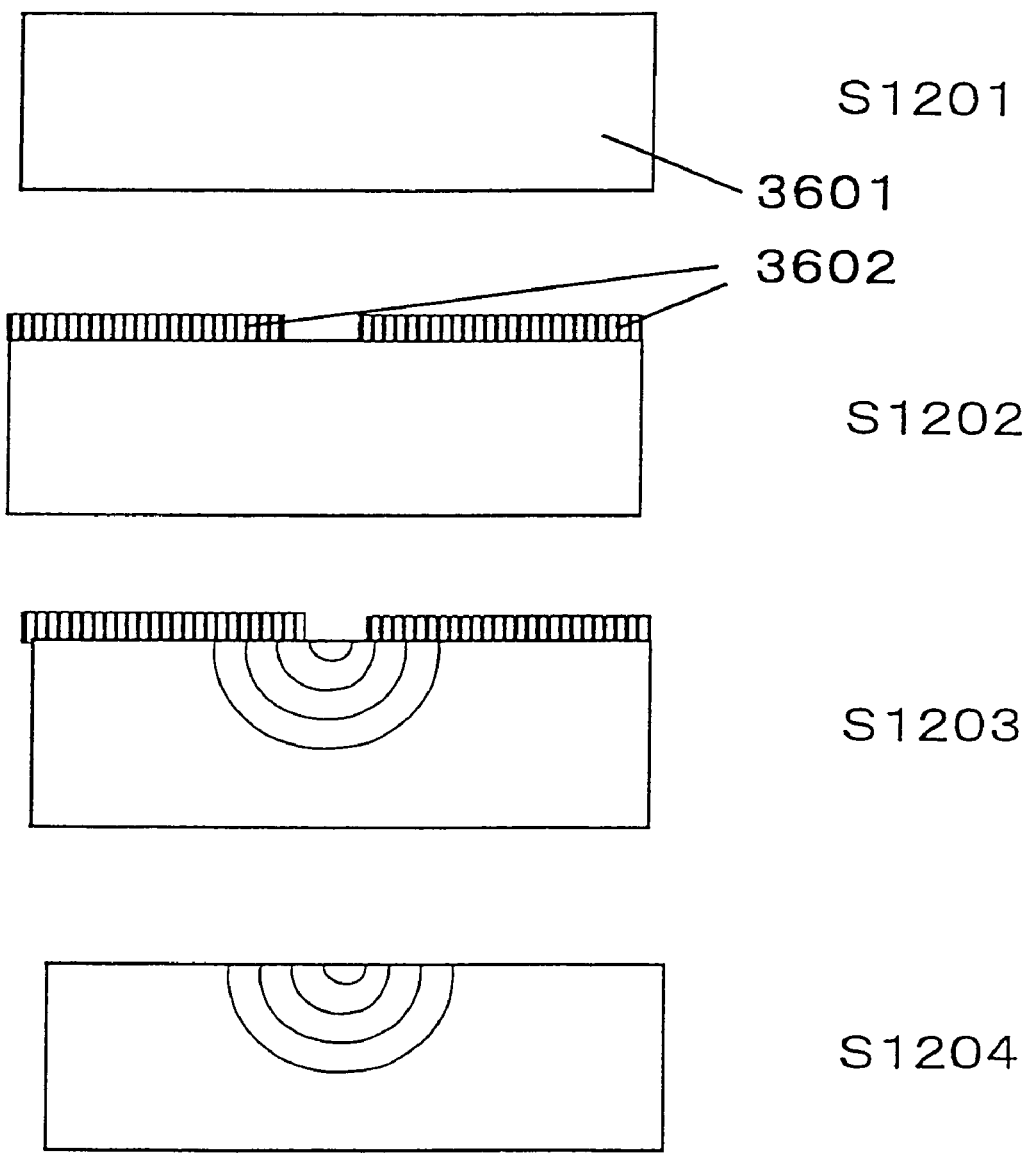
FIG. 36 is a side sectional view for explaining a manufacturing method for one part of the near-field optical head according to Embodiment 13 of the invention.

Next, a manufacturing method for a second substrate 3005 will be explained with FIG. 36. First, in step S1201 a metal film 3602 as a mask material is laid on a glass substrate 3601. Forming is made by vacuum evaporation or sputtering.

Next, in step S1202 a photolithography technique is used to open a circular hole in the metal film 3602 to expose the glass substrate 3601 in a position for forming a lens function.

Next, in step S1203 the glass substrate is immersed in a dissolution salt to conduct selective ion exchange. The ions to diffuse into the glass substrate intrude in a concentric form through an opening of the mask, to have a three-dimensional distribution of concentration. As a result, the substrate is given a gradient of reflectivity in proportion to the distribution.

Finally, in step S1204 the mask material is stripped off thus forming a micro-lens substrate.

Meanwhile, explanation will be made with FIG. 37 on a manufacturing process for a substrate having a lens form formed by using subsequent dry etching.

First, in step S1211 resist 3702 is applied over a glass substrate 3701.

Next, in step S1212 a lens formed resist is made through exposure and development by lithography using gray scale mask or immersion mask having gradation.

Next, in step S1213 the glass substrate is etched under a condition that the selective ratio is given constant for the glass and the resist, thereby transferring a resist form onto the glass substrate. When the resist is completely etched on the glass substrate, the substrate is completed having the lens form.

Figure 38:
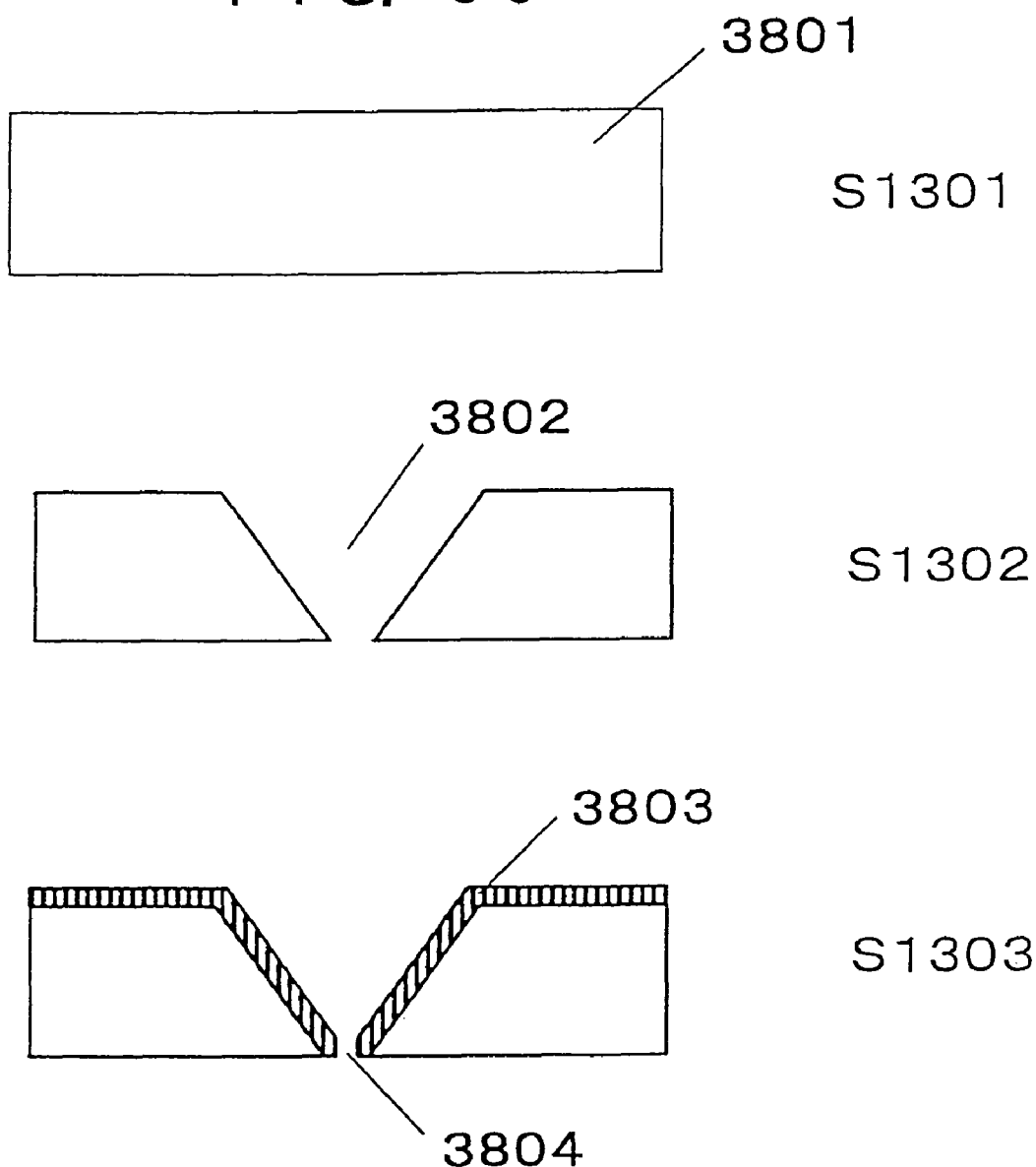
FIG. 38 is a side sectional view for explaining a manufacturing method for one part of the near-field optical head according to Embodiment 13 of the invention.

Subsequently, explanation will be made with FIG. 38 on a manufacturing method for a third substrate 3009. First, in step S1301 the substrate uses a single crystal silicon substrate 3801 having a (100) planar orientation. It is possible to use single crystal silicon with a (110), (111) planar orientation, a dielectric crystal of glass or quartz or a semiconductor crystal such as of GaAs.

Next, in step S1302 a penetration hole 3802 in an inverted pyramid form is formed in the silicon substrate by utilizing anisotropic etching having an etch rate difference depending on a planar orientation of the single crystal silicon to provide an aperture at an apex thereof. A thermal oxide film as a mask material is formed on the substrate and patterned in desired positions by photolithography and etching to expose silicon. Etching is conducted on the silicon in patterned areas by crystal axis anisotropic etching with a potassium hydroxide solution or a tetramethylammonium hydroxide solution. At this time, a hole 3802 is formed penetrating through the substrate which is in an inverted pyramid form having a taper surrounded by four surfaces equivalent to the plane (111). The taper angle is given 54.7 degrees to be determined by (111) and (100). The hole diameter decreases as a slider surface is approached. In a slider surface, a very small aperture is provided having one side of 1 µm or smaller. Alternative to immersion in an etch solution, an inverted conical or pyramidal hole can be formed by using anisotropic etching, for example, with a reactive ion etching (RIE) apparatus. The mask material may use silicon oxide film or a silicon nitride film in place of the thermal oxide film. Thereafter, the thermal oxide film as a mask material is removed using a mixture solution of a hydrofluoric acid solution and an ammonium fluoride solution.

Next, in step S1303 a light reflection film 3803 is laid on a top surface of the inverted conical or pyramidal hole. A metal film high in optical reflectivity such as gold, silver or aluminum is formed on an inside of the hole by vacuum evaporation. The covering method may be by film forming using a sputtering technique or an ion plating technique. The provision of the light reflection film 3803, even if the light illuminated from above hits the slant surface, can guide an increased amount of light to the aperture by reflection that light. As a result, an increased amount of light can be produced at the aperture. Also, it serves as a shade film against external disturbance light. Also, the laying of the light reflection film determines a size of the very small aperture 3804. The aperture formed by etching in the step S1302 is decreased in size by laying the light reflection film at the inside of the hole. Thus, the aperture given by the light reflection film provides a very small aperture 3804 for producing near-field light.

Accordingly, the near-field optical head according to Embodiment 13 can propagate the light emitted from the laser light source to the aperture with less loss. Particularly, the effect of a lens or a reflection effect of the taper near the aperture can supply an increased amount of light to the very small aperture. Meanwhile, the structure of causing light to be incident on the head in a direction parallel to a media can keep a constant distance while approaching a moving media at high speed. As a result, realized is high density of information recording and reading-out at high speed. Also, the reduction in size and price for the head is realized by the manufacture through a mass-producible micro-fabrication process.

(Embodiment 14)

Figure 39:
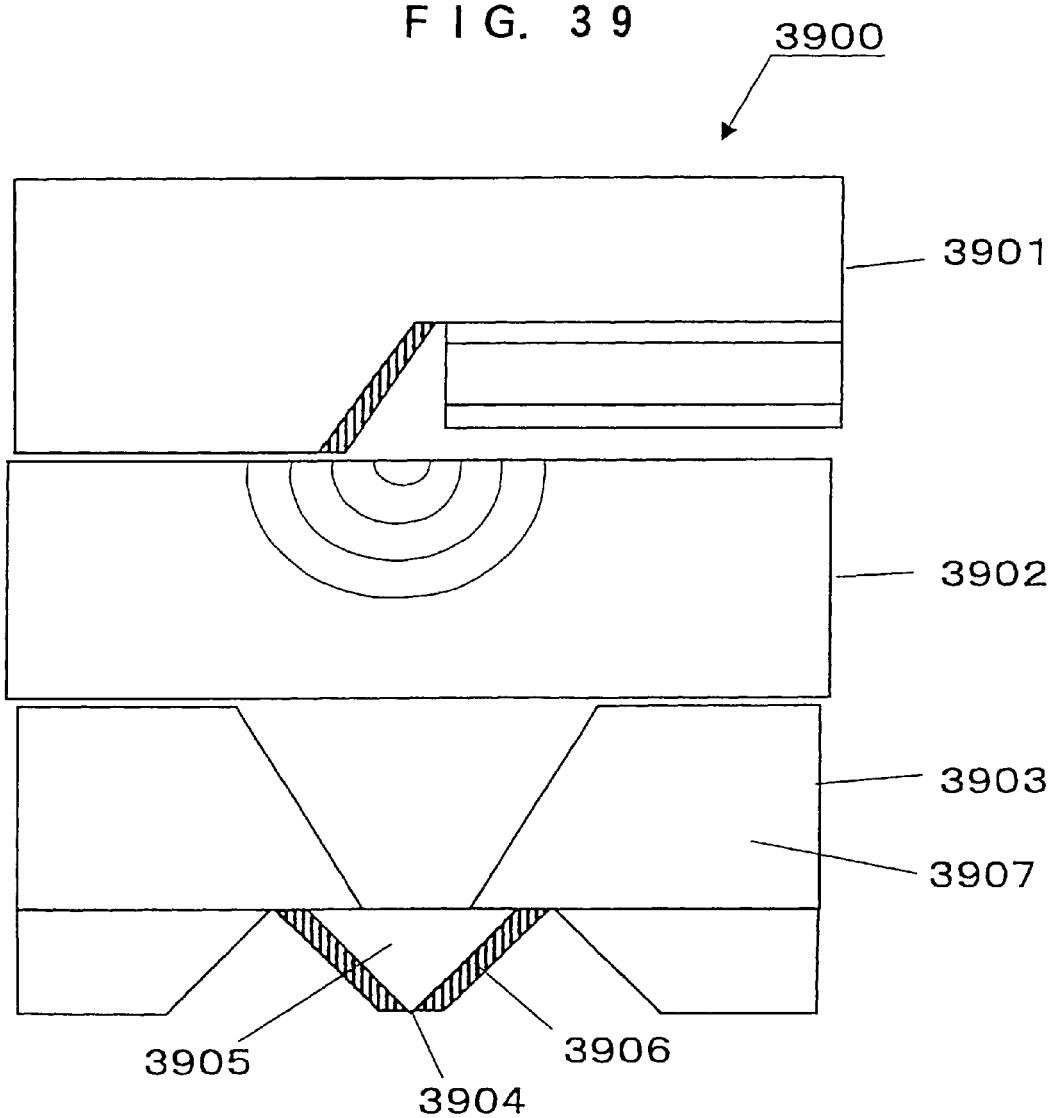
FIG. 39 is a side sectional view showing a structure of a near-field optical head according to Embodiment 14 of the invention.

FIG. 39 is a sectional view showing a structure of a near-field optical head 3900 according to Embodiment 14. The near-field optical head 3900 of Embodiment 14 has a first substrate 3901 and second substrate 3902 similar to the first substrate 3003 and second substrate 3005 shown in Embodiment 13. However, a third substrate 3903 having a very small aperture 3904 for producing near-field light is structured having an aperture of a metal film 3906 at a tip of a dielectric conical or pyramidal protrusion 3905 shown in FIG. 39. The conical or pyramidal protrusion 3905 is formed by forming part of a quartz-based material laid on a silicon substrate 3907. However, at this time the height is provided equivalent, in a surface on a media side of a near-field optical head, for a thickness of a quartz-based material not etched and a tip of the protrusion 3905 formed of the same material. Furthermore this surface if accessed to a media makes it possible to reduce the distance between the media and the very small aperture 3904 existing at the tip of the protrusion 3905, thus illuminating an increased amount of light produced by the very small aperture 3904 to the media. Also, by adopting a high reflective material such as aluminum, gold or silver for a metal film 3906 formed in the periphery of the protrusion 3905, the light illuminated from above can be reflected to thereby collect an increased amount of light to the very small aperture. Incidentally, a large hole is formed in the silicon substrate 3907 which is directed toward a bottom of the protrusion 3905 so that light can be incident on the light-transmissive protrusion 3904. Also, the protrusion 3905 in shape may be in a circular cone or a polygonal pyramid. Alternatively, it may have a slant surface of a protrusion not having a constant angle as in a bell shape.

Meanwhile, a dielectric material high in light transmissivity may be used as another third substrate in Embodiment 14. For example, in the case of using a substrate of quartz or glass, the substrate is directly formed without laying a quartz-based material to make a bell-shaped protrusion similarly to FIG. 39. Then, a metal film or a very small aperture is formed in a similar fabrication method. When using the substrate, the light illuminated to the aperture propagates through an inside of the substrate. Hence, there is no necessity of forming a large hole in the silicon substrate 3907.

The near-field optical head 3900 according to Embodiment 14 is also formed by integrally bonding the first to third substrates similarly to Embodiment 13. In order to obtain a desired magnitude of near-field light, the respective substrates are formed to meet the optical design considering a thickness of the third substrate 3903, a NA, size or thickness of the lens. After properly aligned, bonding is carried out. The method of bonding is similar to Embodiment 13.

Next, an explanatory view showing a manufacturing process for a near-field optical head 3900 of Embodiment 14.

The manufacturing method for a first substrate and second substrate is similar to the manufacturing method for a near-field optical head of Embodiment 13, thus omitting explanation thereof.

Figure 40:
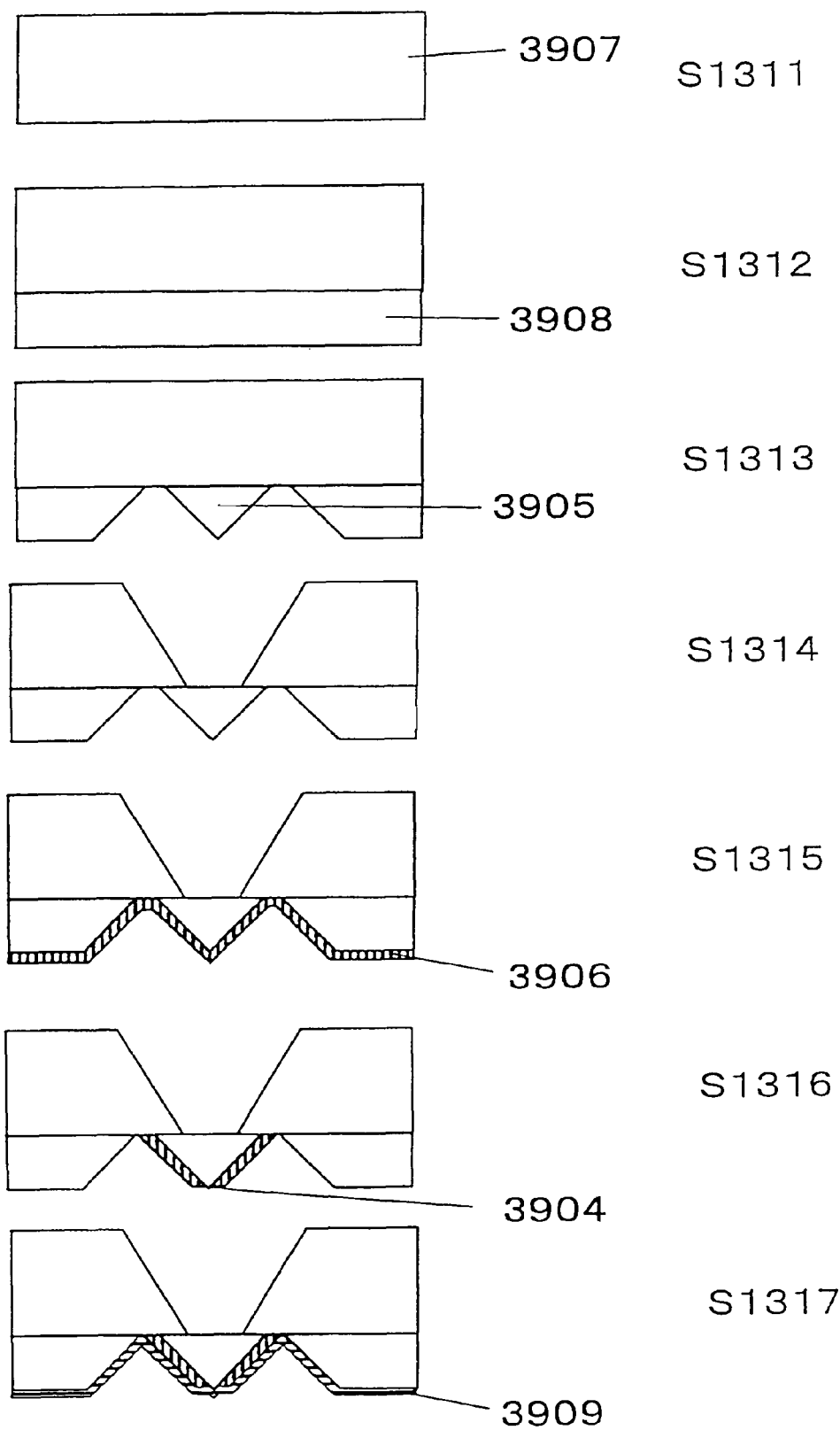
FIG. 40 is a side sectional view for explaining a manufacturing method for one part of a near-field optical head according to Embodiment 14 of the invention.

The manufacturing method for a third substrate 3903 will be explained with FIG. 40. In step S1311 the substrate uses a single crystal silicon substrate 3907 with a (100) planar orientation similarly to Embodiment 13. It is possible to use a single crystal silicon with a (110), (111) planar orientation, a dielectric crystal of glass or quartz or a semiconductor crystal of GaAs or the like.

Next, in step S1312 a TEOS film 3908 as one kind of silicon oxide is laid by a CVD technique. A dielectric material may be used as other materials such as a quartz-based material such as silicon oxide or silicon nitride high in light transmissivity or a dielectric material of polymer such as polyimide or polymethacrylate.

Next, in step S1313 a photolithography technique and chemical etching are used to form part of the TEOS film 3908 into a conical or pyramidal form. This form will turn into a protrusion 3905 in FIG. 39. An etch mask is formed in a form matched to an etch property using photolithography. However, where using dry etching, etching on the TEOS film 3908 proceeds while transferring the etch mask pattern. Accordingly, there is a necessity of previously providing a protrusion 3905 form in the mask itself. When forming such an etch mask form, an optical mask having a gradation alike an gray scale mask or immersion mask is used in exposure to the photoresist. The etch mask form featured by such an optical mask makes possible to form the TEOS film 3908 into an arbitrary form. Meanwhile, where using a sputtering etch method despite in dry etching, the making process is different. The TEOS film 3908 is formed beforehand to a columnar or trapezoidal form. Thereafter, by conducting sputter etching, the column or trapezoid is gradually cut at a corner into a tip-sharpened protrusion form. Different from dry etching as above, the use of wet etching if adjusting an etch rate for the etch mask form and under-etch beneath the mask allows for fabrication of an arbitrary form of a TEOS protrusion. Where the etch mask in form is made in circular, triangular or square, a tip-sharpened circular cone, triangular pyramid or square pyramid will be formed. This utilizes isotropy in wet etching. The circular, triangular or square in mask form can be easily made by exposure to and development of resist using a photomask. Also, the under-etch rate if adjusted enables to form a protrusion with an arbitrary taper angle. Where using photoresist as a mask, adjustment is made for TEOS film surface roughness, resist kind coat method or baking temperature to optimize the adherence between the TEOS film and the resist thereby making an arbitrary taper angle. A mixture solution of hydroxide fluoride and ammonium fluoride is used as a wet etchant.

Meanwhile, an FIB (Focused Ion Beam) forming technology may be used to form into a conical or pyramid form that allows for local etching using sputter principle.

Next, in step S1314 the silicon substrate 3907 at its backside is etched to form a large hole so that light can be incident to the protrusion 3905. A thermal oxide film as an etch mask is patterned by a photolithography technique to expose silicon. A hole is formed by using an wet etchant having anisotropy with respect to a silicon crystal axis (potassium hydroxide solution or tetramethylammonium hydroxide solution). In this case, the etch rate is slow on a plane (111) to provide an inverted conical or pyramidal hole surrounded by four 54.7 degrees slant surfaces. This hole penetrates through the silicon with a result that the light illuminated at the backside of the silicon can reach a tip of the protrusion 3905.

Next, in step S1315 a metal film 3906 is laid on a surface of the formed TEOS film 3908. A metal film 3906, such as gold, silver or aluminum, high in light reflectivity is formed by vacuum evaporation. The high deposition rate evaporation condition makes possible to form a film with reduced grain size. The coating method may use a sputter technique or an ion plating method in forming a film. By providing a metal film 3906, the illuminated light from above if hits on the protrusion 3905 slant surface is reflected thereby guiding an increased amount of light to the tip.

Next, in step S1316 the metal film 3906 at the tip of the protrusion 3905 is formed into a very small aperture 3904. In the film forming of the metal film 3906 in step S1315, the deposition in an oblique direction of the substrate under a film forming condition high in directional dependency tends to reduce the thickness at the tip with respect to the thickness on the protrusion slant surface. The etching the metal film 3906 having such a distribution of thickness allows for forming a very small aperture at the tip thereof. Meanwhile, it is possible as another method to form a mask material having a hole corresponding to a size of a very small aperture at a tip and selectively etch the metal film only in the tip to thereby make a very small aperture 3904. In this case, the etch mask can use photoresist formed by spin coating in a state not applied at the tip to expose the metal film. Otherwise, an dielectric material formed by a CVD technique thin only in the tip may be etched to form a hole in a size corresponding to a very small aperture.

Meanwhile, as another forming method a very small aperture may be formed by pressing a smooth-surfaced flat plate formed of a material harder than a metal film from above the protrusion tip down onto the metal film to apply a constant load thereby changing the form of the metal film tip into a flat shape matched to a plate form and exposing the underlying TEOS film. In this case, the very small aperture can be formed by pressing a tip-sharpened form or spherical form instead of pressing with a flat plate thereby forming the metal film into a form of fit in a shape thereof.

Finally, in step S1317 a dielectric film for a protection film 3909 is formed at a top surface of the metal film 3904. The protection film 3909 is formed to a thickness of less than 30 nm. The formation of the dielectric film can suppress the metal film from being decreased in reflectivity by oxidization due to aging or the light reflection film from being stripped off and hence light leak due to contact with a medium. Incidentally, the step S1317 is to be omitted as the case may be.

Accordingly, the near-field optical head of Embodiment has the aperture-forming material having a reflectivity greater than air in addition to the effect of Embodiment 13. Thus, light propagation loss is reduced in the vicinity of the aperture and hence the energy density increases at the aperture, thereby producing an increased amount of near-field light. Meanwhile, the slant surface in the vicinity of the aperture can be set to an arbitrary form to allow for selection to an object.

(Embodiment 15)

FIG. 41 is a fragmentary sectional view showing a structure of a near-field optical head according to Embodiment 15. The near-field optical head 4100 of Embodiment 15 has a first substrate 4101 and third substrate 4103 similar to Embodiment 13 but a second substrate using a ball lens 4102. The ball lens 4102 is put at an inside of an inverted conical or pyramidal hole of the third substrate 4103. The light propagated through an optical waveguide or light reflection layer formed in the first substrate 4101 is illuminated as converging light to a very small aperture formed in the third substrate 4103 by a lens effect corresponding to a form or reflectivity thereof. The ball lens 4102 in its positioning accuracy is determined by an angle of a slant surface and a radius of the sphere. However, because a hole in the third substrate 4103 is in an inverted square pyramid form having a constant slant degree of 54.7 degrees formed by the plane (111), alignment is possible with accuracy. Also, the adjustment of the reflectivity of the ball lens 4102 and the size of a radius of curvature at the surface provides for illumination of an arbitrary NA of light to the very small aperture. The material of the ball lens 4102 uses a dielectric material such as a quartz-based material or a polymer material.

Meanwhile, although in the above explanation the third substrate 4103 used the substrate as shown in Embodiment 13, the third substrate 3903 shown in Embodiment 14 may be used similarly. Also, the first substrate may use a substrate as shown in FIG. 31 to FIG. 33 or a substrate having an optical fiber inserted in a V-groove as shown in FIG. 34.

The near-field optical head 4100 of Embodiment 15 is formed by bonding the first substrate 4101 to the third substrate 4103 similarly to the near-field optical head 3000 of Embodiment 13. The bonding method uses a technique of bonding through an adhesive or anodic bonding, similarly to Embodiment 13.

The manufacturing method for a near-field optical head 4100 of Embodiment 15 was already explained in Embodiment 13 and Embodiment 14. The method for fabricating a ball lens is omitted herein.

Accordingly, the near-field optical head of Embodiment 15 can obtain high positional accuracy by inserting a ball lens in a given-angled slant surface without requiring precise alignment, in addition to the effects of Embodiment 13 and Embodiment 14. As a result, the process for positioning the lens can be omitted and the improvement of production efficiency be desired. Also, the amount of near-field light needed for a purpose is dependent greatly upon a lens NA and thus can be easily solved by ball lens selection.

(Embodiment 16)

Figure 42:
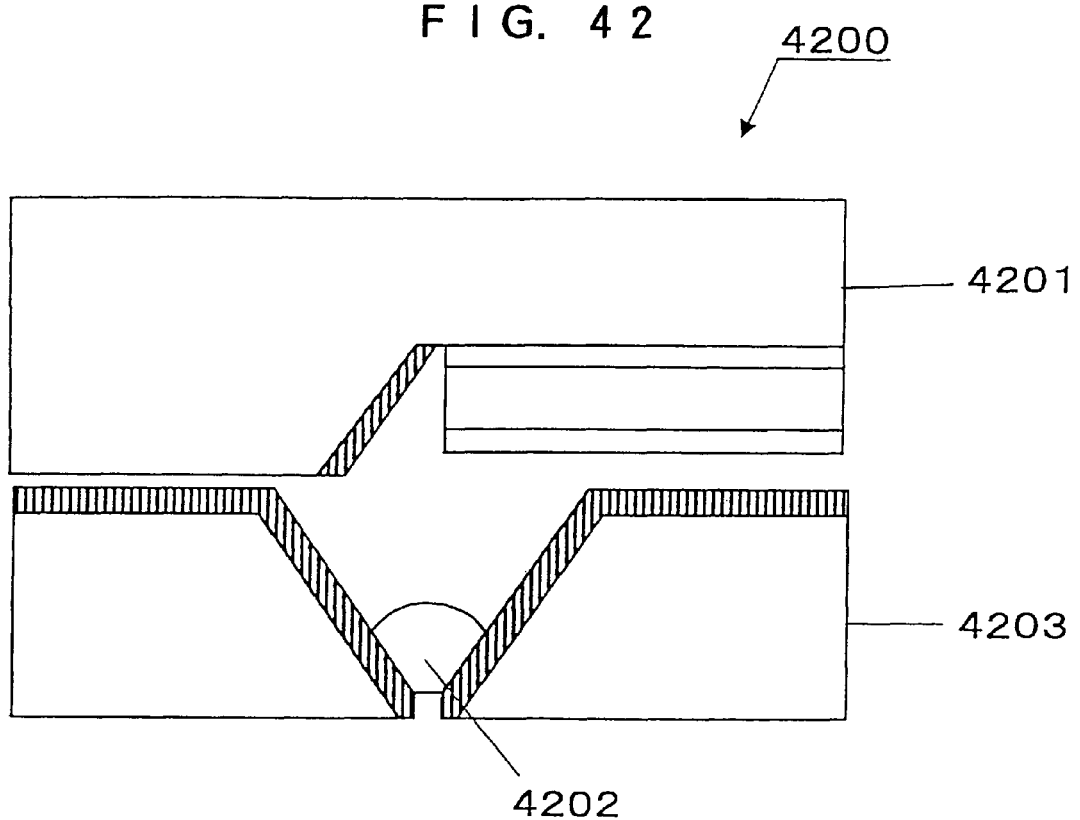
FIG. 42 is a side sectional view showing a structure of a near-field optical head according to Embodiment 16 of the invention.

FIG. 42 is a fragmentary sectional view of showing a structure of a near-field optical head 4200 according to Embodiment 16. The near-field optical head 4200 of Embodiment 16 has a first substrate 4201 and third substrate 4203 similar to Embodiment 13. However, a second substrate having a lens function is used and a liquid resin to be set by radiation of a ultraviolet ray is sprayed in spherical fine particles to a vicinity of a very small aperture in the third substrate 4203 thus forming into a semi-spherical form to be set by radiating a ultraviolet ray and making a small-sized lens 4202 having a curved surface to exhibit a lens effect.

Figure 43:
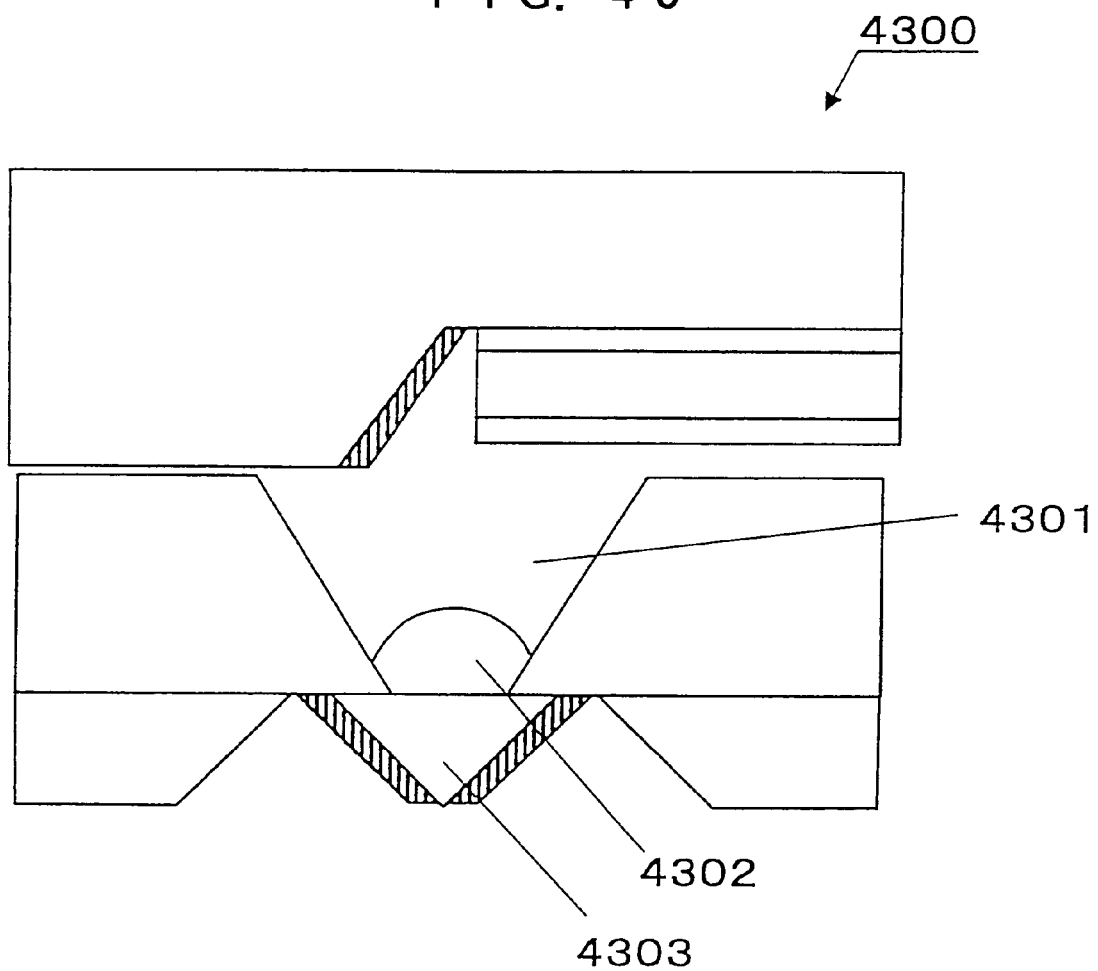
FIG. 43 is a side sectional view showing a structure of a near-field optical head according to Embodiment 16 of the invention.

Also, although in the above explanation the third substrate 4203 used a substrate as shown in Embodiment 13, a third substrate 3903 as shown in embodiment 14 may be used in the similar manner. The near-field optical head 4300 in this case is shown in FIG. 43. The fine particles to be turned into a lens are sprayed from a hole 4301 formed in a backside of the silicon substrate to form a small-sized lens 4302 on a TEOS film 4303 existing deep of the hole. Alternatively, where a quartz-based substrate is selected instead of a silicon substrate for a third substrate, spraying is made to an opposite surface to a surface forming a bell-shaped protrusion to thereby form a small-sized lens. Meanwhile, the first substrate may use a substrate as was shown in FIG. 31 to FIG. 33 or a substrate having an optical fiber inserted in a V-groove as was shown in FIG. 34.

The near-field optical head of Embodiment 16 is formed by bonding the first substrate and the third substrate. The bonding method uses a technology of bonding through an adhesive or anodic bonding similarly to the bonding method as was explained in Embodiment 13.

The manufacturing method for a near-field optical head of Embodiment 16 was already explained in Embodiment 13 and Embodiment 14.

Accordingly, the near-field optical head of Embodiment 16 can form an arbitrary lens by spraying and setting fine particles and hence be manufactured by a process suited for mass production, in addition to the effects of Embodiment 13 and Embodiment 14.

(Embodiment 17)

Figure 44:
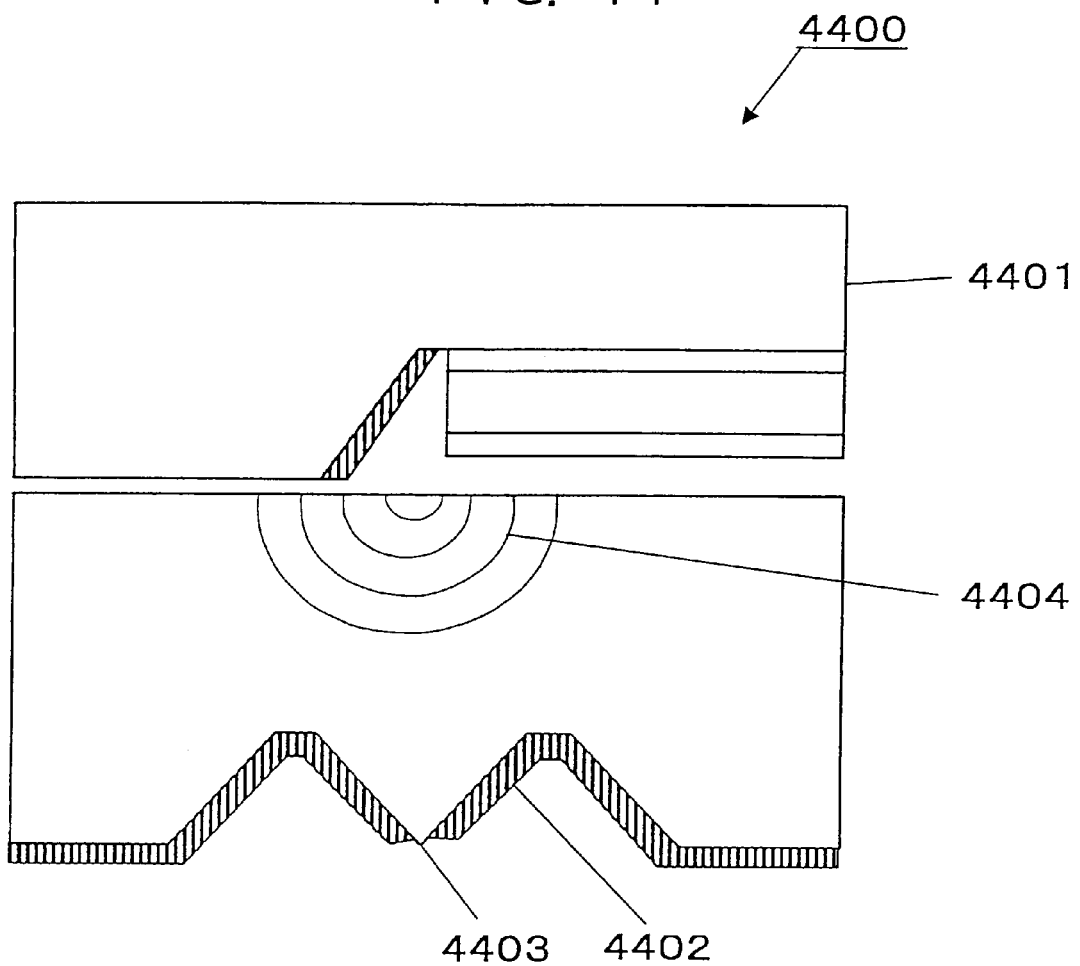
FIG. 44 is a side sectional view showing a structure of a near-field optical head according to Embodiment 17 of the invention.

FIG. 44 is a fragmentary sectional view showing a structure of a near-field optical head 4400 according to Embodiment 17. The near-field optical head 4400 of Embodiment has a first substrate 4401 similar to Embodiment 13. However, a second substrate and a third substrate are made as a same substrate wherein on a media-side surface a protrusion 4402 and very small aperture 4403 are formed as were formed in the third substrate of Embodiment 14 and on the opposite surface a glass substrate high in light transmissivity formed with a refractivity distribution 4404, lens form, Fresnel zone plate or holographic lens as were used in the second substrate of Embodiment 14. A high-transmissive quartz-based dielectric substrate may be used without limited to the glass substrate.

The lens function, bell-formed protrusion and very small aperture if formed on one substrate using a series of photolithographic processes eliminates the bonding between the second substrate and the third substrate as was required in the near-field optical head manufacture described in Embodiment 14. This can avoid a problem with reduction in amount of illumination light from the very small aperture caused due to positional deviation upon boding.

Alternatively, a refractivity distribution is formed in a media-side surface of the glass substrate to form a protrusion 4402 and very small aperture 4403 in the refractivity distribution so that the light focused by the refractivity distribution can be illuminated to the aperture. In this case, a protrusion 4402 is formed having a refractivity distribution. The near-field optical head having a refractivity distribution in the protrusion is provided with a lens function in the vicinity of the aperture and can be manufactured by a micro-fabrication process using photolithography, improving the accuracy of positioning, exhibiting stable characteristics and being made in a structure suited for mass production. Furthermore, a lens function as shown in FIG. 44 may be provided in a surface on a first substrate side of the glass substrate to provide a structure having a lens function on the respective surfaces of the glass substrate. The glass substrate thus having a lens function on the opposite surfaces may be formed by performing a same process on the respective surfaces, Otherwise may be formed by bonding together two glass substrates having a lens function on one surface. The near-field optical head thus structured with a lens function on the opposite surfaces is improved in focusing action owing to a focusing function at two points thereby producing an increased amount of near-field light through the very small aperture. Furthermore, this can provide focusing by the combination of two lens as compared to the case that light collection is by one lens for focusing to the very small aperture. Thus, manufacture is comparatively easy because of unnecessity of strict accuracy of positioning between the lenses.

(Embodiment 18)

Figure 45:
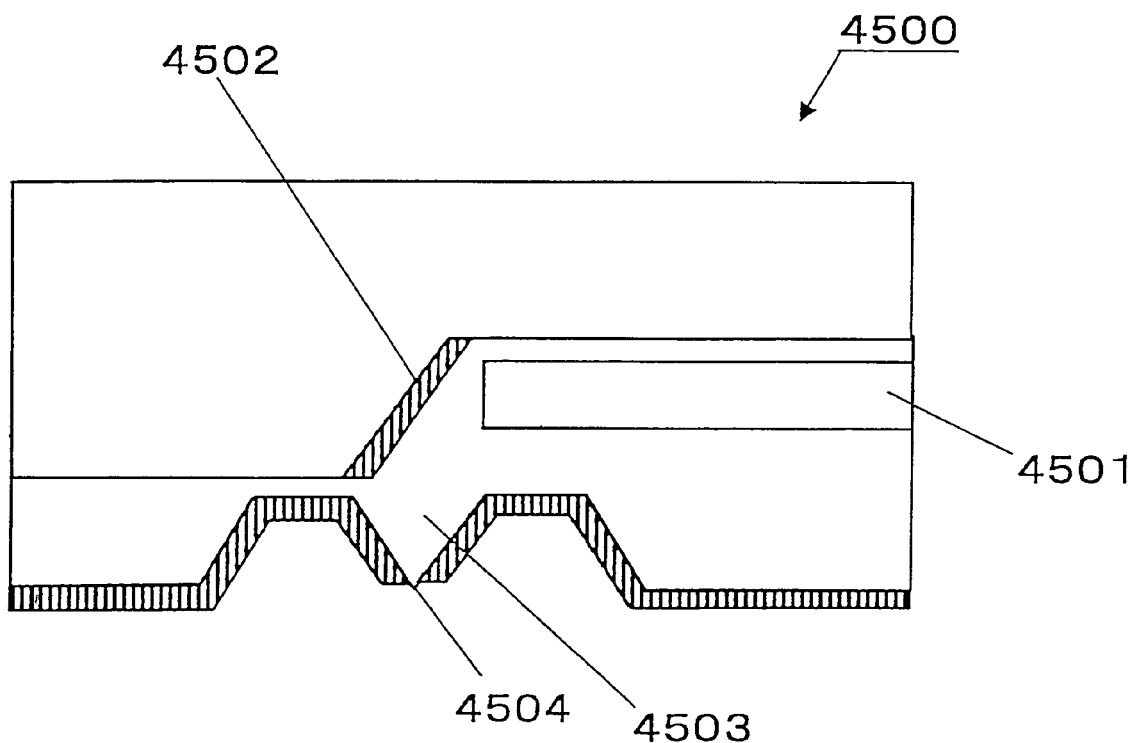
FIG. 45 is a side sectional view showing a structure of a near-field optical head according to Embodiment 18 of the invention.

FIG. 45 is a fragmentary sectional view showing a structure of a near-field optical head 4500 according to Embodiment 18. The near-field optical head 4500 of Embodiment 18 has, as shown in FIG. 45, optical elements (optical waveguide 4501, light reflection layer 4502, protrusion 4503, very small aperture 4504) contained in a first substrate, second substrate and third substrate all formed in a surface on a media side of a same substrate.

Figure 46:
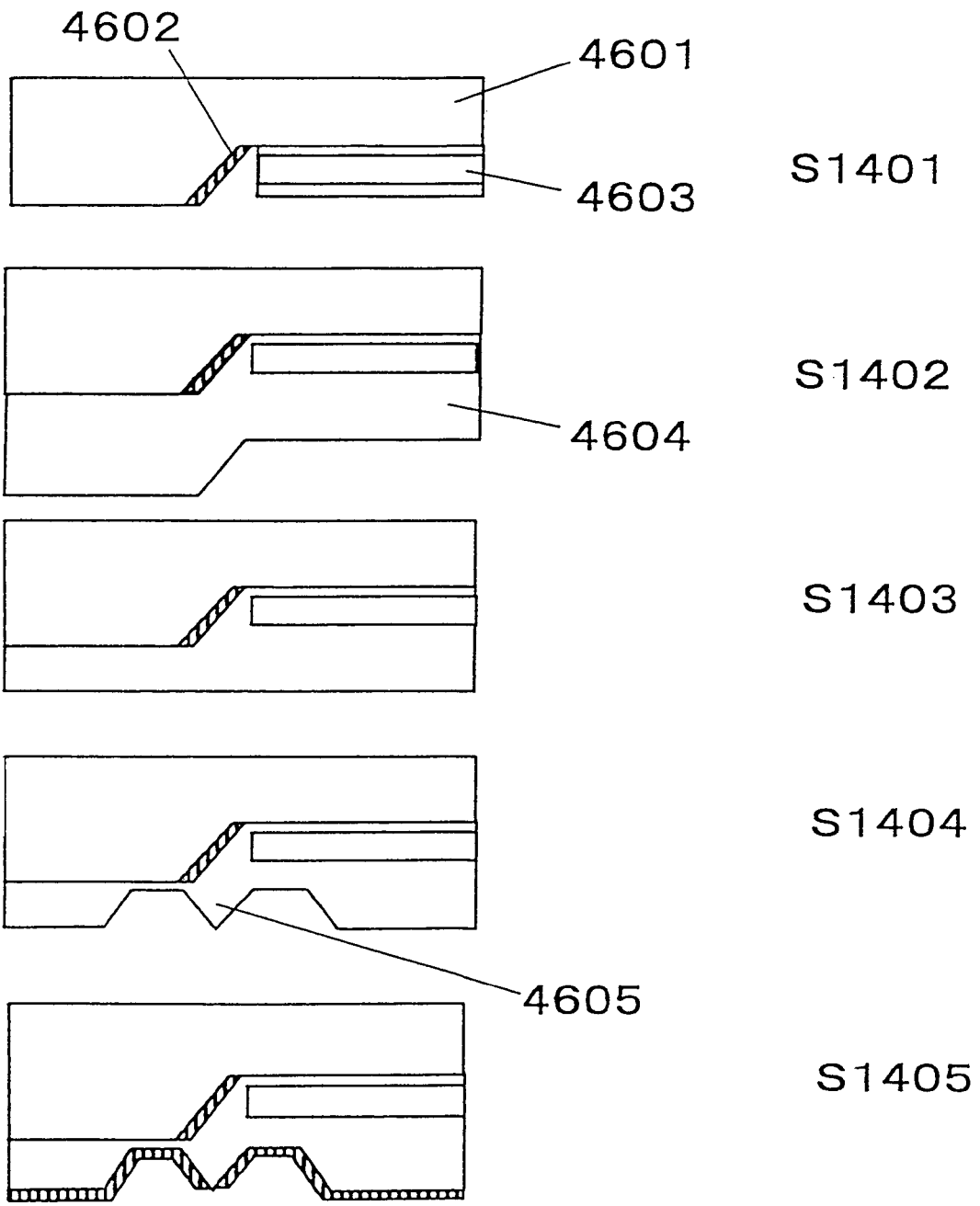
FIG. 46 is an explanatory view showing a manufacturing process for a near-field optical head in Embodiment 18 shown in FIG. 45.

FIG. 46 is an explanatory view showing a manufacturing process for a near-field optical head 4500 in Embodiment 18 shown in FIG. 45.

First, in step S1401, similarly to the first substrate of Embodiment 13, a step is provided in a silicon substrate 4601 to form a light reflection layer 4602 in the slant surface and in a lower stage an optical waveguide 4603 for illuminating light to the light reflection layer 4602. In also Embodiment 18, a first substrate as shown in FIG. 31 to FIG. 33 may be used.

Next, in step S1402 a TEOS film 4604 is laid on a top surface of the light reflection layer 4602 and optical waveguide 4603 by a CVD technique. There is no problem if another dielectric material is used.

Next, in step S1403 the TEOS film having the step in a top surface is polished and planarized.

Next, in step S1404 a process is conducted that is similar to the manufacturing step S1313 for a near-field optical head of Embodiment 14, to form a conical or pyramidal protrusion 4605 in the TEOS film 4604.

Finally, in step S1405 a process is conducted that is similar to the manufacturing process steps S1315, S1316 for a near-field optical head to thereby form a near-field optical head 4500 of Embodiment 18, shown in FIG. 45, formed with a protrusion 4503 including a very small aperture 4504, a light reflection layer 4502 and an optical waveguide 4501 on a slider-side surface The near-field optical head thus structured can shorten the optical path distance between an emission end of the optical waveguide 4501 and the very small aperture 4504. For example, by making, approximately 10 μm the thickness of a silicon oxide film to be laid, the distance can be set to 10 μm or less. As a result, the beam spot of propagation light whose diameter increases as the emission end is distant farther can be illuminated as kept small to the very small aperture, thus producing an increased amount of near-field light. Further, this near-field optical head is manufactured by forming a film on a same surface and working the thin film using photolithography without including a bonding process. Accordingly, the positional deviation caused due to bonding, as raising a problem in Embodiments 13 to 17, is reduced. Thus, it is to be expected to increase in amount of near-field light produced through the very small aperture.

Industrial Applicability

As explained above, the near-field optical head of the present invention can kept constant at all times a spacing to a media being accessed without hindrance to a flexture function of the near-field optical head. While the distance between the very small aperture and the media put in proximity, the surface opposed to the media is a smooth planar surface hence providing a structure to reduce damage due to contact with the recording medium. Thus, a near-field optical head can be manufactured which is hardly broken and strong, reliable, and high in signal SN ratio.

Furthermore, the head is formed therein with an optical waveguide to propagate light in a direction parallel with a media, a function for reflecting the light toward the aperture, a lens function for converging scattering light, and further a structure for suppressing light propagation loss such as a taper shape to focus light to a vicinity of the aperture. Accordingly, the focused light with energy density can be propagated with less loss to the aperture. This produces an increased amount of stable near-field light from the aperture at all times. Thus, a high density recording and reading-out method is made feasible using light which is high in SN ratio and excellent in reliability.

Furthermore, although the intensity of light greatly attenuates in a region the light propagation member in width is smaller than a wavelength, the structure obtained narrowed in this region makes it possible to produce an increased amount of near-field light from the very small aperture. As a result of this, a reliable near-field optical head can be supplied because of handling signals high in SN ratio in recording and reading-out information of a recording medium.

Furthermore, even where the amount of light is low at the laser light source, the high efficiency of conversion to near-field light enables supply of near-field light required for the recording medium. Consequently, the power is saved at the laser light source thus supplying an information reading-out and recording apparatus to be driven with low power consumption but on low voltage.

Furthermore, against the problem with size increase of an apparatus structure in light incidence on the near-field optical head from above, the introduction of light to the near-field optical head in a direction parallel with a recording medium reduces the size and thickness of the overall apparatus. It is possible to follow up winding on a recording medium in movement at high speed and hence keep always a constant relative position to the recording medium. Accordingly, stable near-field light is to be supplied at all times to the recording medium, enabling supply of a reliable near-field optical head.

Also, the structure having a protrusion protruded from an aperture makes it possible to recording and reading-out information to and from microscopic bits with resolution corresponding to a radius of curvature at a tip of the projection. Also, a spatial distribution of near-field light occurs unique to a protrusion shape. Utilizing this, an illumination range can be determined effectively.

Also, the optical head of the present structure can be manufactured through a micro-machining process using silicon or the like. Also, the incidence of light on the head in a direction parallel with a media allows for reduction in size and thickness of the apparatus overall. Simultaneously, realized is cost reduction, product stability and high reliability due to application to a mass production process capable of batch processing.

Also, according to a manufacturing method for a near-field optical head of the invention, a very small aperture for producing near-field light is defined in size and shape by metal film forming, thermal oxidation or ion implant on a silicon substrate formed with an aperture greater than a target size. It is therefore possible to manufacture a near-field optical head with higher accuracy and yield as compared to defining a size and shape of a very small aperture by etching or the like.

The invention claimed is:

1. A near-field optical head comprising:
    a planar substrate having a first surface, a second surface disposed opposite to the first surface, and an inverted pyramidal hole extending through the first and second surfaces, the inverted pyramidal hole having a plurality of curved slant surfaces and at least one near-field light producing fine aperture disposed in the first surface and formed at an apex of the inverted pyramidal hole for producing near-field light;
    an optical waveguide extending into the inverted pyramidal hole of the planar substrate for propagating light along an optical path; and
    a mirror disposed in the optical waveguide for bending in the direction of the fine aperture the optical path of the light propagated through the optical waveguide.

2. A near-field optical head according to claim 1; wherein the plurality of curved slant surfaces decrease in slant degree toward the fine aperture.

3. A near-field optical head according to claim 2; wherein the mirror in the optical waveguide focuses light to the fine aperture or collimates light from the fine aperture.

4. A near-field optical head according to claim 3; wherein the optical waveguide comprises a core and a clad disposed over the core.

5. A near-field optical head according to claim 1; wherein the optical waveguide is integrally connected to the second surface of the planar substrate.

6. A near-field optical head according to claim 1; wherein the near-field optical head is an air floating-type optical head.

7. A near-field optical head according to claim 1; wherein the optical waveguide is bonded to the second surface of the planar substrate.

8. A near-field optical head comprising:
- a substrate having an inverted pyramidal hole penetrating therethrough, the hole being formed by a plurality of curved slant surfaces and having at least one near-field light producing fine aperture formed at an apex of the hole for producing near-field light;
- an optical waveguide extending into the inverted pyramidal hole of the substrate for propagating light along an optical path; and
- a mirror disposed in the optical waveguide for bending in the direction of the fine aperture the optical path of the light propagated through the optical waveguide.

9. A near-field optical head according to claim 8; wherein the plurality of curved slant surfaces decrease in slant degree toward the fine aperture.

10. A near-field optical head according to claim 9; wherein the optical waveguide focuses light to the fine aperture or collimates light from the fine aperture.

11. A near-field optical head according to claim 10; wherein the optical waveguide comprises a core and a clad disposed over the core.

12. A near-field optical head according to claim 8; wherein the optical waveguide is integrally connected to the surface of the substrate.

13. A near-field optical head according to claim 8; wherein the near-field optical head is an air floating-type optical head.

14. A near-field optical head according to claim 8; wherein the optical waveguide is bonded to the surface of the substrate.

15. A near-field optical head according to claim 1; wherein the plurality of curved slant surfaces comprises four curved slant surfaces.

16. A near-field optical head according to claim 8; wherein the plurality of curved slant surfaces comprises four curved slant surfaces.

* * * * *